United States Patent [19]

Ishida et al.

[11] Patent Number: 5,363,169
[45] Date of Patent: Nov. 8, 1994

[54] CAMERA OPERATED IN ONE OF A PLURALITY OF PHOTOGRAPHING MODES

[75] Inventors: Tokuji Ishida, Daito; Masataka Hamada, Osakasayama; Hiroshi Ootsuka, Sakai; Hiroshi Ueda, Habikino, all of Japan

[73] Assignee: Minolta Camera Kabushiki Kaisha, Osaka, Japan

[21] Appl. No.: 992,895

[22] Filed: Dec. 15, 1992

Related U.S. Application Data

[62] Division of Ser. No. 789,022, Nov. 7, 1991, Pat. No. 5,227,833, which is a division of Ser. No. 686,150, Apr. 16, 1991, Pat. No. 5,264,889.

[30] Foreign Application Priority Data

| Apr. 17, 1990 | [JP] | Japan | 2-101392 |
| Apr. 17, 1990 | [JP] | Japan | 2-101393 |
| Apr. 17, 1990 | [JP] | Japan | 2-101394 |
| Apr. 17, 1990 | [JP] | Japan | 2-101395 |
| Apr. 26, 1990 | [JP] | Japan | 2-111920 |
| Apr. 27, 1990 | [JP] | Japan | 2-113639 |
| Apr. 27, 1990 | [JP] | Japan | 2-113640 |
| Apr. 27, 1990 | [JP] | Japan | 2-113641 |
| Aug. 29, 1990 | [JP] | Japan | 2-230880 |
| Aug. 29, 1990 | [JP] | Japan | 2-230881 |

[51] Int. Cl.$^5$ ............................ G03B 7/08
[52] U.S. Cl. ................... 354/442; 354/289.1; 354/432; 354/474
[58] Field of Search ........... 354/442, 474, 475, 173.1, 354/289.1, 443, 432

[56] References Cited

U.S. PATENT DOCUMENTS

| 4,322,142 | 3/1982 | Kawamura et al. | 354/432 |
| 4,344,681 | 8/1982 | Yamada | 354/475 |
| 4,354,754 | 10/1982 | Takahashi et al. | 354/289 |
| 4,475,800 | 10/1984 | Kinoshita et al. | 354/406 |
| 4,483,601 | 11/1984 | Sekida et al. | 354/289.1 |
| 4,525,054 | 6/1985 | Someya et al. | 354/289.1 |
| 4,529,291 | 7/1985 | Mizogui | 354/443 |
| 4,534,639 | 8/1985 | Konishi et al. | 354/432 |
| 4,538,891 | 9/1985 | Matsuyama et al. | 354/289.1 |
| 4,576,458 | 3/1986 | Cho et al. | 354/199 |
| 4,597,659 | 7/1986 | Suda et al. | 354/409 |
| 4,609,274 | 9/1986 | Iwashita et al. | 354/442 |
| 4,614,975 | 9/1986 | Kaite | 358/227 |
| 4,616,916 | 10/1986 | Someya et al. | 354/442 |

(List continued on next page.)

FOREIGN PATENT DOCUMENTS

| 58-85426 | 5/1983 | Japan . |
| 60-120675 | 6/1985 | Japan . |
| 1-198715 | 8/1989 | Japan . |
| 1-288845 | 11/1989 | Japan . |
| 1-309013 | 12/1989 | Japan . |

OTHER PUBLICATIONS

Photo Journal Asahi Camera, Jun. 1990 with Partial English Translation.

*Primary Examiner*—Russell E. Adams
*Attorney, Agent, or Firm*—Burns, Doane, Swecker & Mathis

[57] ABSTRACT

A camera is operable in one among a first photographing mode, a second photographing mode and a third photographing mode, and is further selectively operable in one of a plurality of photographing states when the camera operates in the first mode. The camera includes a first manual operation member, a first element responsive to an operation of the first manual operation member for cyclically selecting one of the first, second and third photographing modes in this order, a second manual operation member, and a second element responsive to an operation of the second manual operation member for selecting one of the plurality of photographing states in the first photographing mode. The camera further includes an element that is responsive to the operation of the first manual operation member for changing a photographing mode of the camera from the first photographing mode to the third photographing mode without passing through the second photographing mode when the camera operates in the selected state in the first mode.

4 Claims, 51 Drawing Sheets

U.S. PATENT DOCUMENTS

| | | | |
|---|---|---|---|
| 4,629,305 | 12/1986 | Sato et al. | 354/442 |
| 4,647,176 | 3/1987 | Shimizu et al. | 354/475 |
| 4,681,441 | 7/1987 | Uchidoi et al. | 354/432 |
| 4,699,492 | 10/1987 | Iwashita et al. | 354/289.1 |
| 4,710,008 | 12/1987 | Tosaka et al. | 354/475 |
| 4,769,668 | 9/1988 | Ishikawa et al. | 354/442 |
| 4,774,540 | 9/1988 | Taniguchi et al. | 354/402 |
| 4,812,912 | 3/1989 | Iida et al. | 358/227 |
| 4,827,303 | 5/1989 | Tsuboi | 354/403 |
| 4,837,596 | 6/1989 | Kawamura | 354/442 |
| 4,849,783 | 7/1989 | Kiyohara et al. | 354/442 |
| 4,956,656 | 9/1990 | Yamamoto et al. | 354/173.1 |
| 4,972,222 | 11/1990 | Sato et al. | 354/432 |
| 4,994,843 | 2/1991 | Kitazawa | 354/409 |
| 5,001,507 | 3/1991 | Iida et al. | 354/402 |
| 5,049,731 | 9/1991 | Ishida et al. | 250/201.2 |
| 5,051,767 | 9/1991 | Honma et al. | 354/406 |
| 5,053,801 | 10/1991 | Ishida et al. | 354/402 |
| 5,128,704 | 7/1992 | Hayashi et al. | 354/486 |
| 5,140,361 | 8/1992 | Ishikawa et al. | 354/442 |
| 5,146,258 | 9/1992 | Bell et al. | 354/432 |

VERTICAL/
HORIZONTAL SWITCH SW: Sb ON

VERTICAL/HORIZONTAL SW: Sa ON

VERTICAL/HORIZONTAL SW: Sc ON

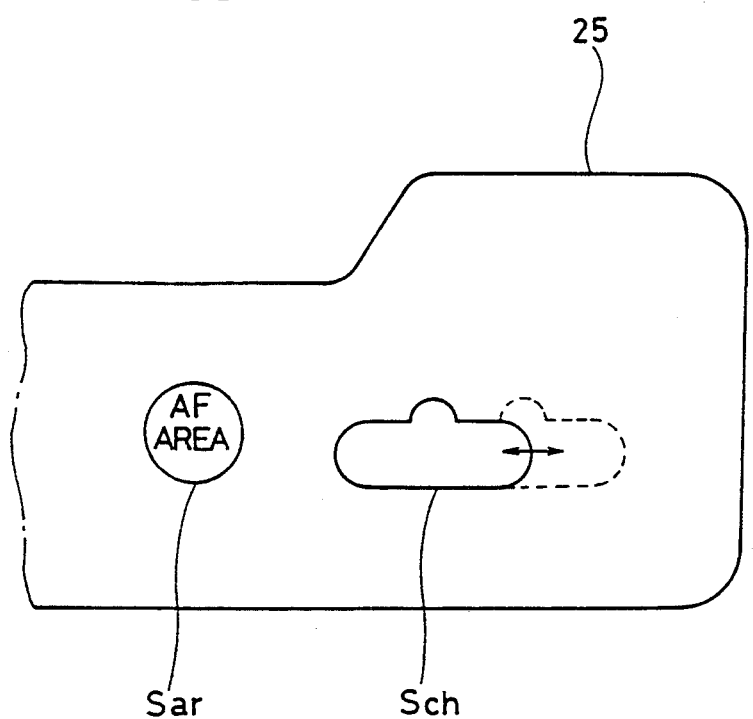

FIG.17A
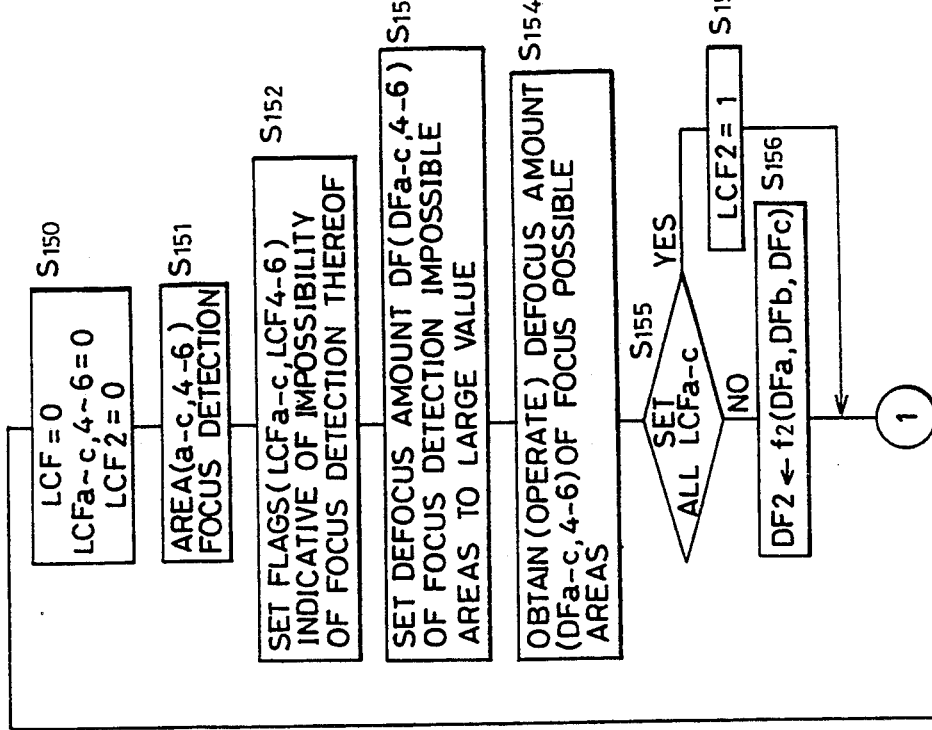
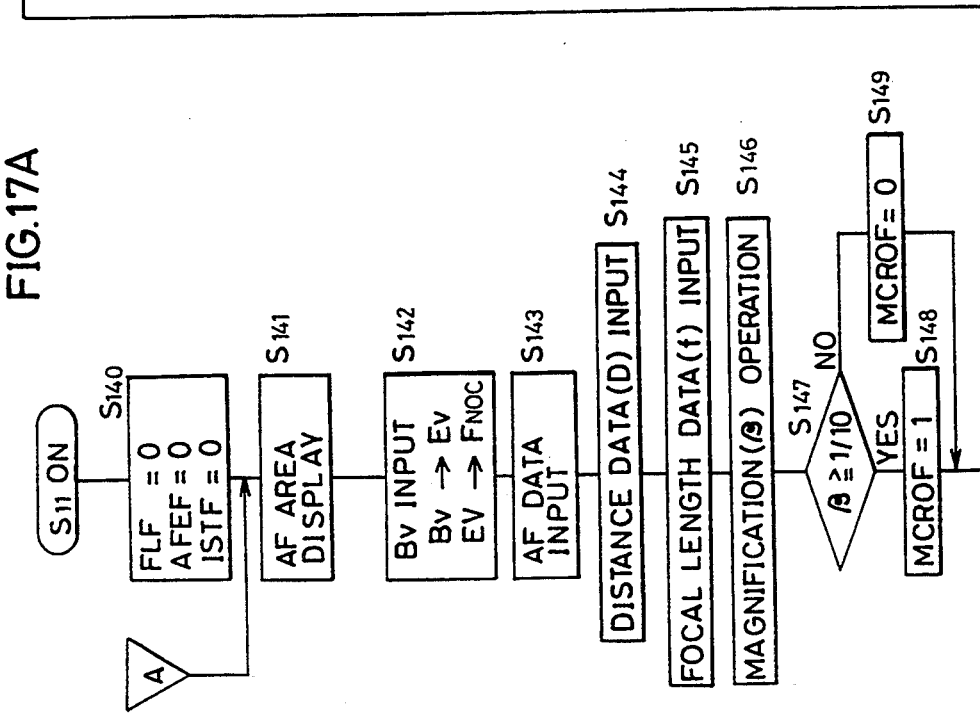

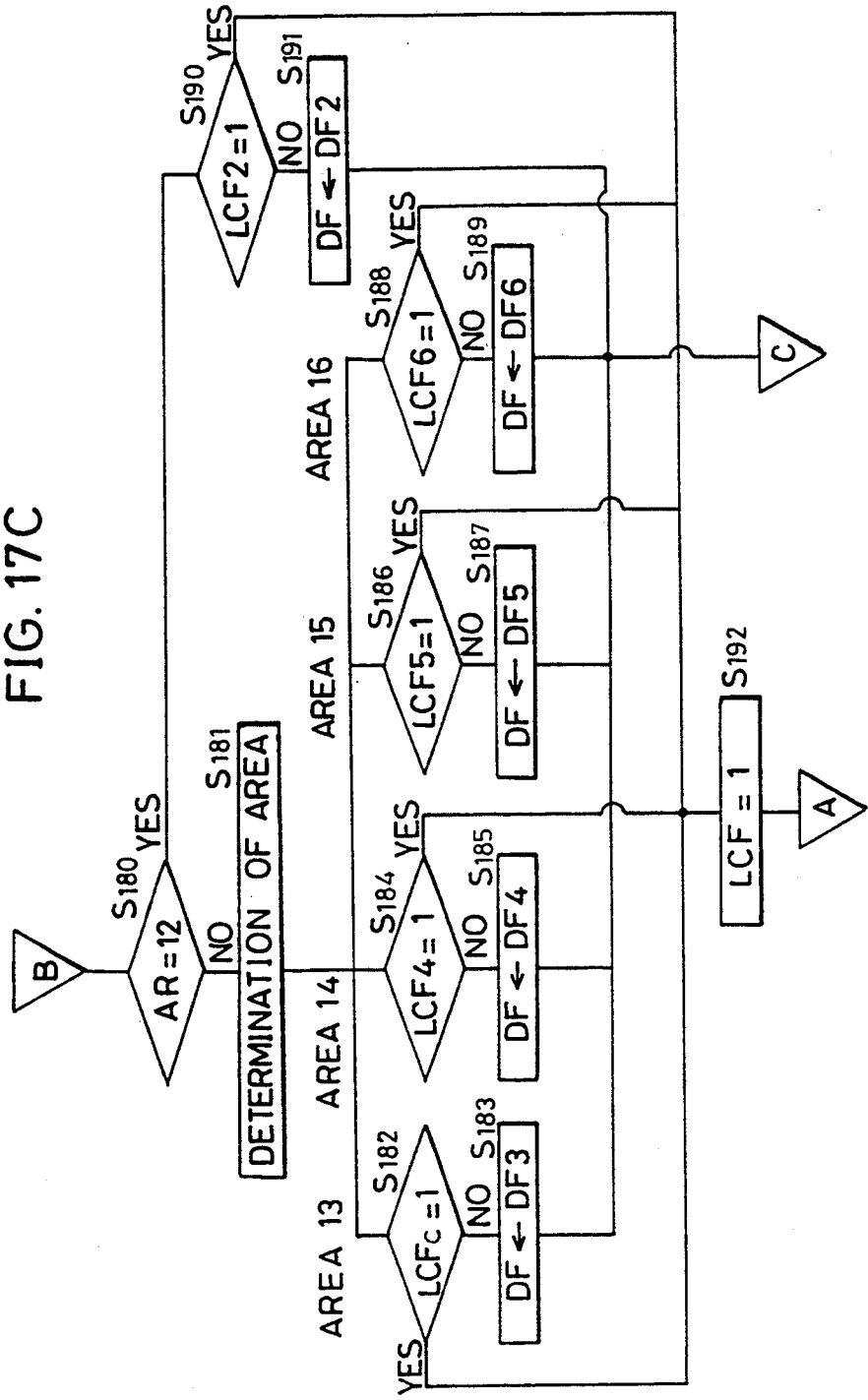

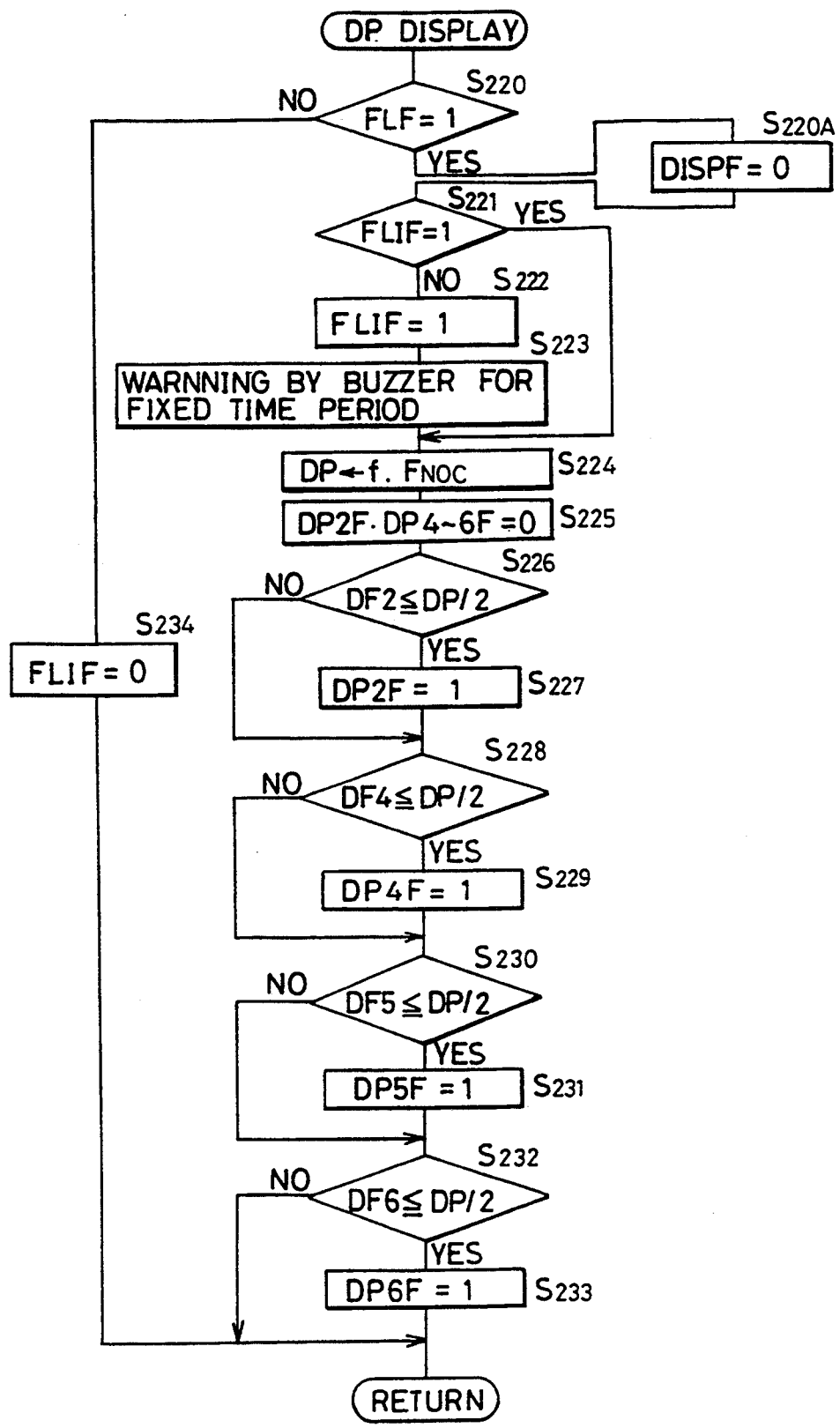

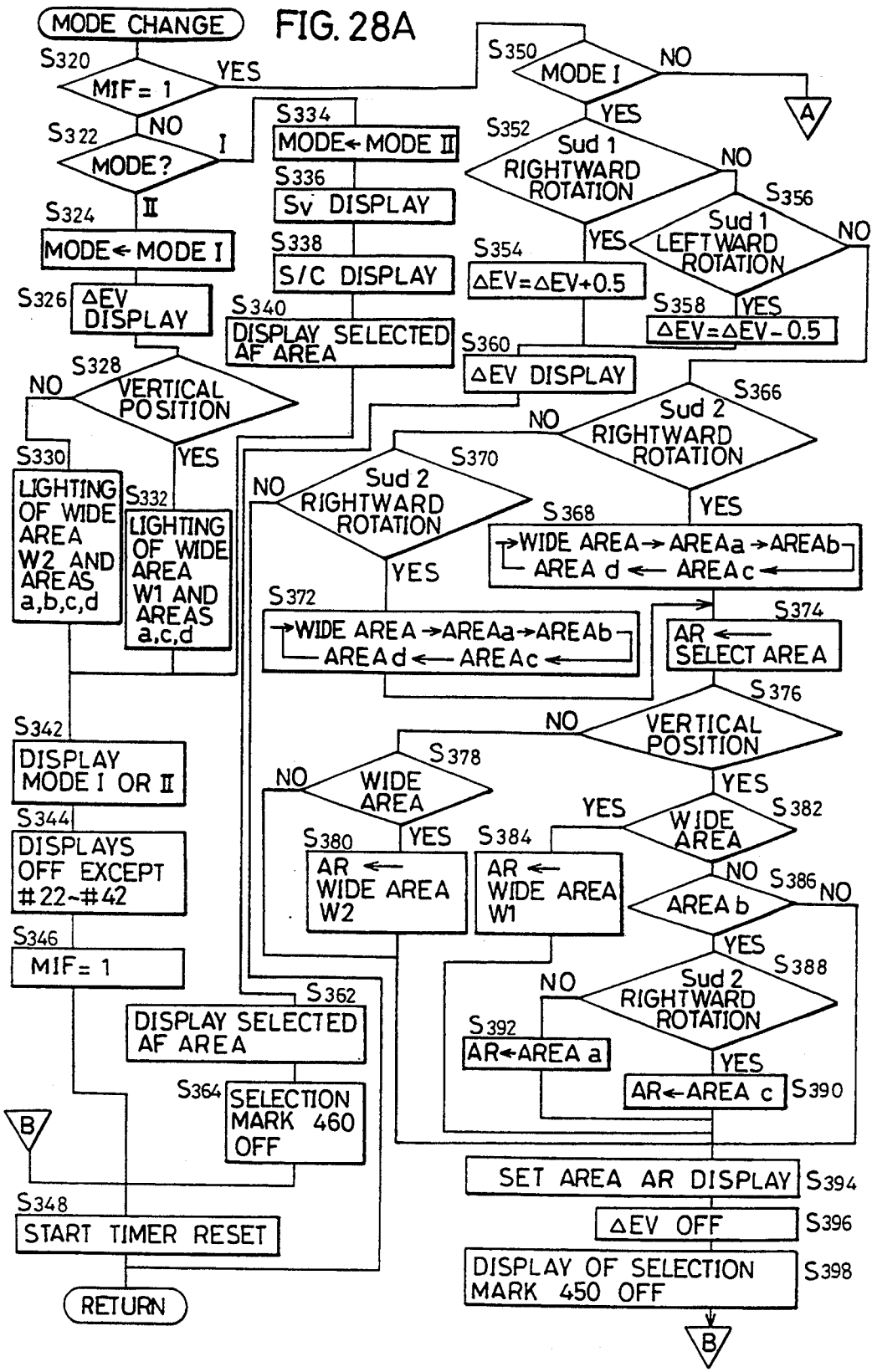

CAMERA OPERATED IN ONE OF A PLURALITY OF PHOTOGRAPHING MODES

This application is a divisional of application Ser. No. 07/789,022, filed Nov. 7, 1991 now U.S. Pat. No. 5,227,833 which is a divisional of application Ser. No. 07/686,150, filed Apr. 16, 1991 now U.S. Pat. No. 5,264,889.

BACKGROUND OF THE INVENTION

1. Field of the Invention

The present invention relates to an automatic focus detecting device for automatically detecting a focus condition of an object, and more particularly, to an apparatus having such automatic focus detecting device.

2. Description of the Related Art

An apparatus having an automatic focus detecting function is conventionally known. For use in such apparatus, various automatic focus detecting devices have been proposed which have a plurality of detecting areas for detecting a focus condition of an object corresponding to those areas in order to more effectively use an automatic focusing function.

For example, a conventional camera is provided with focus detecting areas at the center and right and Left sides thereof in an image area to be photographed. A photographer uses this camera by manually selecting a focus detecting area suitable for the position of a main object in the image area among the above-described plurality of focus detecting areas. A focus condition of the object is detected by using the selected focus detecting area in such conventional camera, so an operation of changing a composition after a focus lock is eliminated more than in such a camera as having only one focus detecting area.

With a conventional camera held its longitudinal side in parallel with the horizontal direction (the camera is held horizontally) for photographing, a main object is more likely to be located at an upper part of the center of an image area to be photographed. Therefore, the photographer should once set the object at the center of the image area for a focus detection and then, set the camera anew so that the object is located at the upper part of the center, which make the operation of the camera troublesome. In order to overcome such problem, disclosed in, for example, the patent application No. 581,886, filed Sep. 13, 1990 and assigned to the same assignee of the present invention, is a camera in which an additional focus detecting area is provided at an upper portion of the center, so focus detecting areas are symmetrical only in a horizontal direction when the camera is held horizontally.

While the above-described conventional camera eliminates the operation of changing a composition after a focus lock, it is not sufficiently practical in use. For example, there occurs photographing with a camera held vertically or horizontally depending on an object. In such a case, a focus detecting area where a main object is often positioned varies depending on the camera situation. Therefore, an operation for selecting an appropriate area might not be carried out effectively when the focus detecting areas are designated one by one in the same order at all times irrespective of the possibility that an area includes the main object at the selection of one of the plurality of focus detecting areas.

SUMMARY OF THE INVENTION

One object of the present invention is to provide an automatic focus detection device for use in an apparatus having a plurality of manually changeable focus detecting areas, which device allows an effective operation of changing a focus detecting area corresponding to a situation of the apparatus in use.

Another object of the present invention is to provide an apparatus having a plurality of manually changeable parameters, which apparatus allows an effective operation of changing the above-described parameters corresponding to a situation of the apparatus in use.

A further object of the present invention is to provide an automatic focus detection device for use in an apparatus, which device allows focus detection to be carried out in a good condition irrespective of a situation of the apparatus in use.

Still further object of the present invention is to provide an automatic focus detecting device for use in an apparatus, which device has focus detecting areas asymmetrical in a vertical direction when the apparatus in use is held horizontally and allows focus detection to be carried out at an appropriate focus detecting area even when the apparatus is held vertically.

Still further object of the present invention is to provide an automatic focus detection device for use in an apparatus, which device has focus detecting areas asymmetrical in a vertical direction when the apparatus in use is held horizontally and has a displaying device allowing an effective operation for focus detection to be performed even when the apparatus is held vertically.

Still further object of the present invention is to provide an automatic focus detection device for use in an apparatus, which device has a plurality of focus detecting areas and allows focus detection to be carried out in a good condition according to a state of the apparatus in use.

Still further object of the present invention is to provide a camera having a plurality of detection areas for detecting a predetermined state, in which a detecting operation can be effectively performed in a good state according to a state of the apparatus in use.

Still further object of the present invention is to provide an automatic focus detection device having a plurality of switchable focus detecting areas, in which selection of a detection area among the plurality of focus detecting areas can be made effectively.

The above-described object of the present invention can be achieved by the apparatus having an automatic focus detection device including the following elements. That is, the apparatus having the automatic focus detection device according to the present invention includes a detector for detecting a focus condition of a lens by using a plurality of detection areas, a device for displaying the areas detected by the detector, a manual operation member, a device for sequentially designating one detection area among the plurality of detection regions in response to the operation of the manual operation member, a device for determining a situation of the apparatus and a device for determining the order of the designation of the detection areas by the designating device in response to the determination result of the determining device.

Determination is made on a situation of the apparatus, and on which determination result, the order is determined in which the designating device designates the plurality of detection areas. As a result, an operation of changing the focus detecting area can be effectively performed according to the situation of the apparatus in use when in manually changing the focus detecting area in the apparatus having the automatic focus detection device having a plurality of focus detecting areas.

In accordance with another aspect of the present invention, the apparatus having the automatic focus detection device includes the following elements. That is, the apparatus having the automatic focus detection device according to the present invention includes a device for detecting a focus condition of a lens, a device for determining whether the apparatus is held vertically or horizontally, and a controller for controlling the detector such that the detection areas by the detector are arranged symmetrically in the vertical and horizontal direction when the determining device determines that the apparatus is held vertically.

When the determination is made that the apparatus is held vertically, the detection areas by the detector are arranged symmetrically in the vertical and horizontal directions. As a result, in the apparatus having the automatic focus detection device having the focus detecting area asymmetrical in the vertical direction when the apparatus in use is held horizontally, focus detection can be performed at an optimum focus detecting area even when the apparatus in use is held vertically.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flow chart showing control to be executed when a switch $S_1$ of FIG. 5 is turned on.

FIGS. 7A and 7B are flow charts showing control to be executed when a switch $S_{ar}$ or a switch $S_{ch}$ of FIG. 5 is turned on.

FIG. 8 is a diagram showing displays of the focus detecting frames in a finder to be switched when the switch $S_{ar}$ of FIG. 5 is turned on.

FIG. 11A is a diagram showing a change in display of the focus detecting frames in the finder when the vertical and horizontal switch $S_b$ is turned on.

FIG. 11B is a diagram showing a change in display of the focus detecting frames in the finder when the vertical and horizontal switch $S_a$ of FIG. 5 is turned on.

FIG. 11C is a diagram showing a change in display of the focus detecting frames in the finder when the vertical and horizontal switch $S_c$ of FIG. 5 is turned on.

FIG. 12 is a diagram showing a specific arrangement of the switching switch $S_{ar}$ and the spot switching switch $S_{ch}$ of FIG. 5 on the camera body.

FIGS. 17A-17C are flow charts controlled by a turning-on of the switch $S_1$ according to the second embodiment of the present invention.

FIG. 19 is a flow chart showing the specific contents of the routine for displaying depth of field in the steps of FIG. 17B.

FIG. 27 is a flow chart explaining interruption processing when a photographing preparation switch or a function button is turned on.

FIGS. 28A and 28B are flow charts explaining operation procedure when the function button is switched from off to on.

DESCRIPTION OF THE PREFERRED EMBODIMENTS (1) The first embodiment

Figure 1:
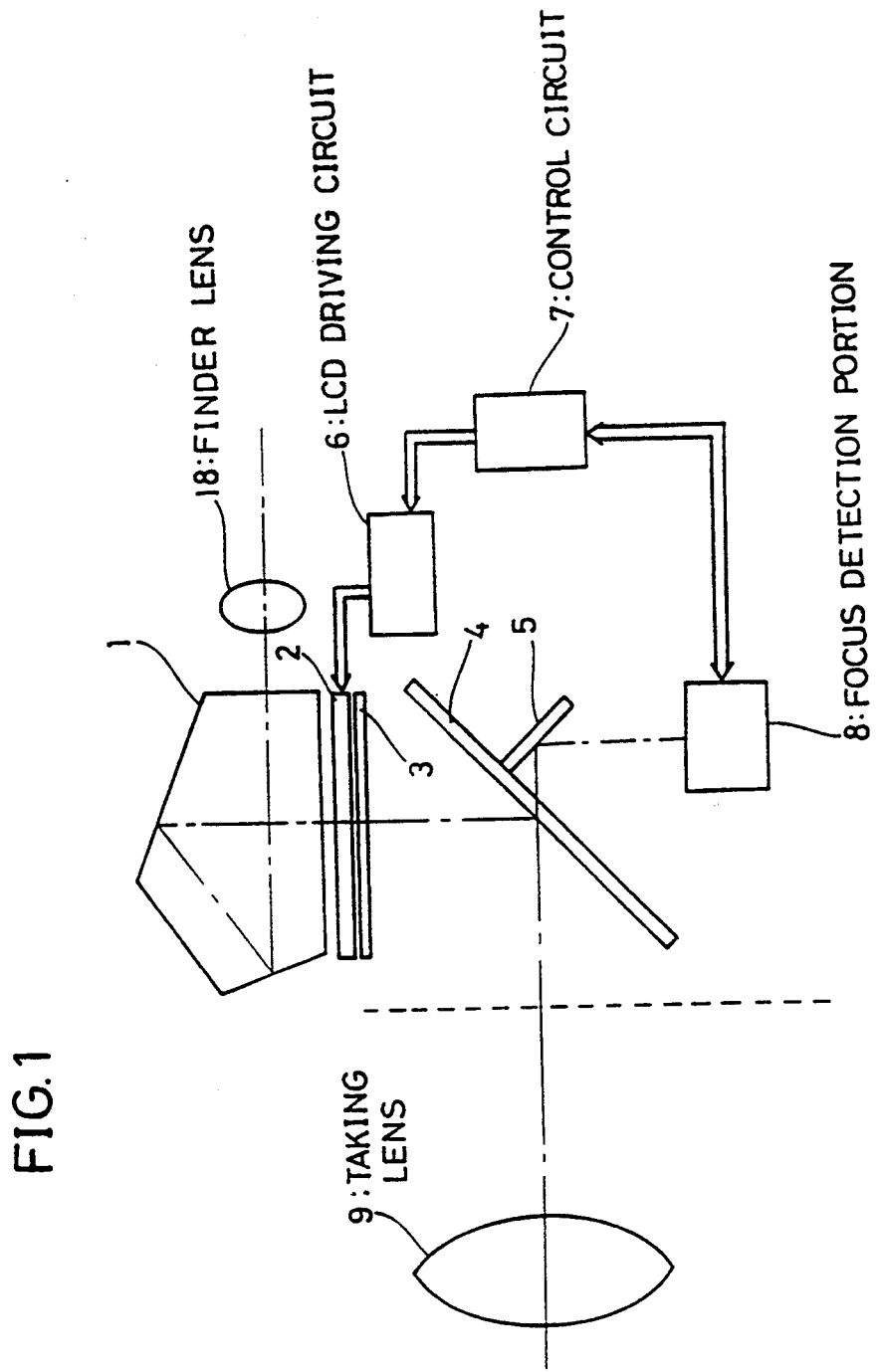
FIG. 1 is a diagram showing an arrangement of a main part of a camera according to one embodiment of the present invention.

With reference to FIG. 1, an incident light through a taking lens 9 is reflected by a finder mirror 4 and then, enters a penta prism 1 through a focusing screen 3 and a transparent liquid crystal display (LCD) 2 to reach a finder lens 18. Out of the incident light upon the finder mirror 4, part of the light required for focus detection passes through the mirror 4 and then it is reflected by a submirror 5 to enter a focus detection portion 8. The focus detection portion 8 includes an optical system necessary for focus detection and a sensor and data output portion and the like. The data output from the focus detection portion 8 is input to a control circuit 7. The control circuit 7 outputs data for controlling a focus detection sensor, and a LCD driving circuit 6 based on the input data. Further, the control circuit 7 controls the total operation of the camera and the calculation for focus detection. The LCD driving circuit 6 controls the transparent liquid crystal display 2 based on the control data output from the control circuit 7 to make various displays by liquid crystal.

Figure 2:
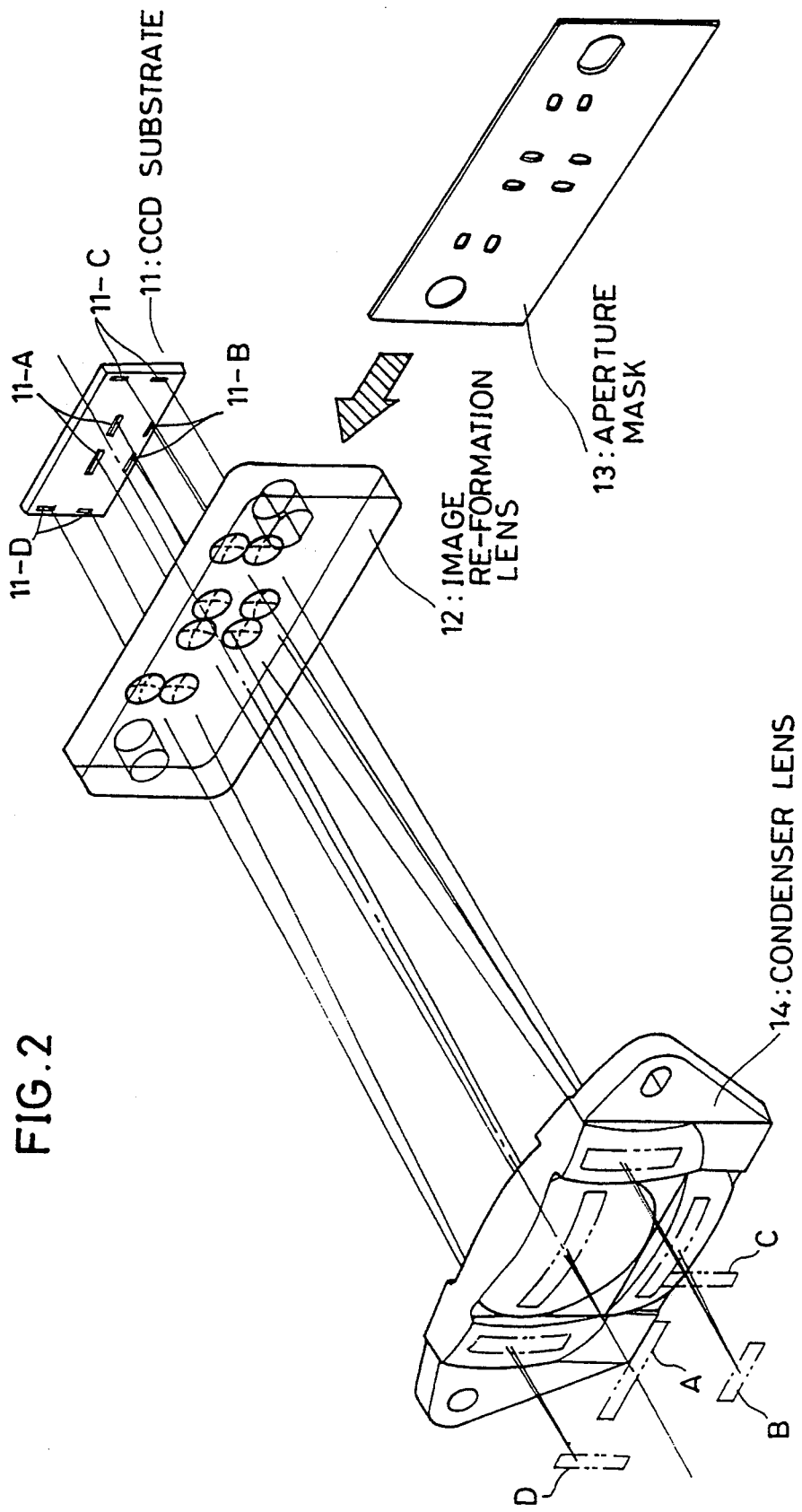
FIG. 2 is a diagram showing a specific arrangement of a focus detection portion of FIG. 1.

With reference to FIG. 2, the light reflected by the submirror 5 passes through a condenser lens 14 and divided into four bundles of rays by an image-reformation lens. The bundles of rays form image on a CCD substrate 11. The auto focus (referred to as "AF" hereinafter) system in the present embodiment is a well-known phase difference detecting method. An aperture mask 13 is set to overlap with an image re-formation lens 12 and the apertures of the aperture mask eliminate the unnecessary light for focus detection coming from the condenser lens 14. Formed on the CCD substrate 11 are the respective pairs of line sensors 11-A, 11-B, 11-C and 11-D corresponding to the four focus detecting areas a, b, c and d which will be described later.

Figure 3:
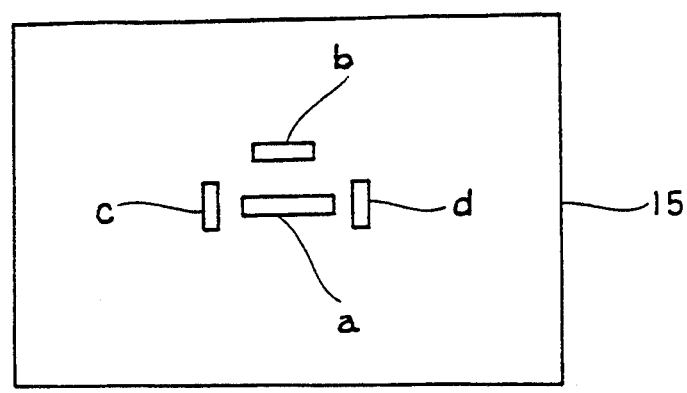
FIG. 3 is a diagram showing an arrangement of focus detecting area in an image area.

FIG. 3 is a diagram showing a state of an image area to be photographed of a camera according to one embodiment of the present invention.

In the drawing, the focus detecting areas corresponding to the respective line sensors formed on the CCD substrate 11 of FIG. 2 are shown in an image area 15.

Figure 4:
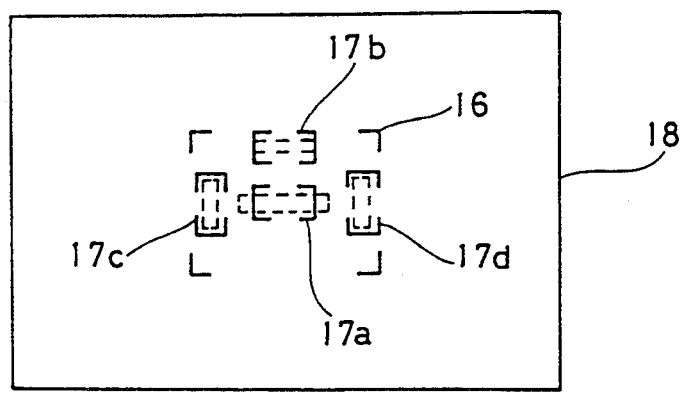
FIG. 4 is a diagram showing a locational relation between an arrangement of the CCD substrate of FIG. 2 corresponding to the focus detecting area of FIG. 3 and focus detecting frames.

FIG. 4 shows all the focus detecting frames of a LCD display portion in the finder according to one embodiment of the present invention. In the drawing, the solid lines represent liquid crystal display displayed in the LCD display portion and the dotted lines represent the areas corresponding to the focus detecting area shown in FIG. 3.

A focus detecting frame display 16 is made when photographing at a wide AF state covering all the focus detecting areas is carried out. Small focus detecting frame displays 17a–17d are made at a spot AF state when detection of each focus detecting area is carried out.

The spot focus detecting frames are referred to as a center spot frame 17a, an upper spot frame 17b, the left spot frame 17c and a right spot frame 17d.

Figure 5:
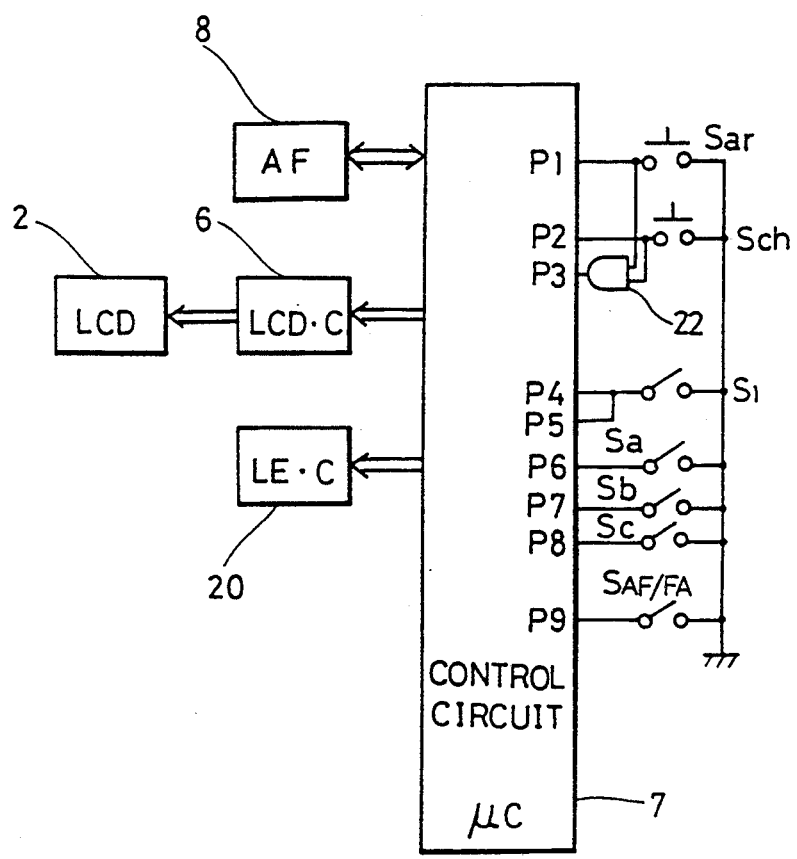
FIG. 5 is a block diagram of a control portion according to one embodiment of the present invention.

FIG. 5 is a block diagram showing the arrangement of a control portion according to one embodiment of the present invention.

In the drawing, the control circuit (microcomputer $\mu C$) 7 receives signals from various switches. A first manual operation member, switch $S_{ar}$ is an area switching switch for switching a focus detecting area to a desired area as will be described later. When the switch $S_{ar}$ is turned on, an on-signal is applied to a port P1. A second manual operation member switch $S_{ch}$ makes switching of spot areas among focus detecting areas to as will be described later, in response to the turning-on of which switch the on-signal is applied to a port P2. An AND circuit 22 turns on when either the switch $S_{ar}$ or $S_{ch}$ applies an input signal to a port P3, so that the program enters to an AF area routine which will be described later.

A switch $S_1$ is turned on by a first stroke of a release button, and in response to the turning-on, an on-signal is applied to a port P4 to start an AF operation. Then, determination is made of an on-off state of the switch $S_1$ based on the input of a port P5. Switches Sa, $S_b$ and $S_c$ are horizontal or vertical situation detecting switches indicative of a camera holding situation in photographing. The following-described arrangement enables detection of a camera holding situation at photographing, and then, the respective on signals are applied to the control circuit 7 through ports P6–P8. A switch $S_{AF/FA}$ makes a switching between auto focus photographing and focus aid (FA) photographing in which only a focus detection is performed without driving a lens. The on-signal is applied to a port P9 in response to the turning-on the switch.

The focus detection portion 8 applies data to the control circuit 7 which outputs control data for controlling the focus detection portion 8. The control output of the control circuit 7 controls the transparent liquid crystal display (LCD) 2 through the LCD driving circuit 6. The control output of the control circuit 7 is also output to a lens drive control circuit (LE.C) for controlling the drive of a lens for auto focusing.

Figure 6:
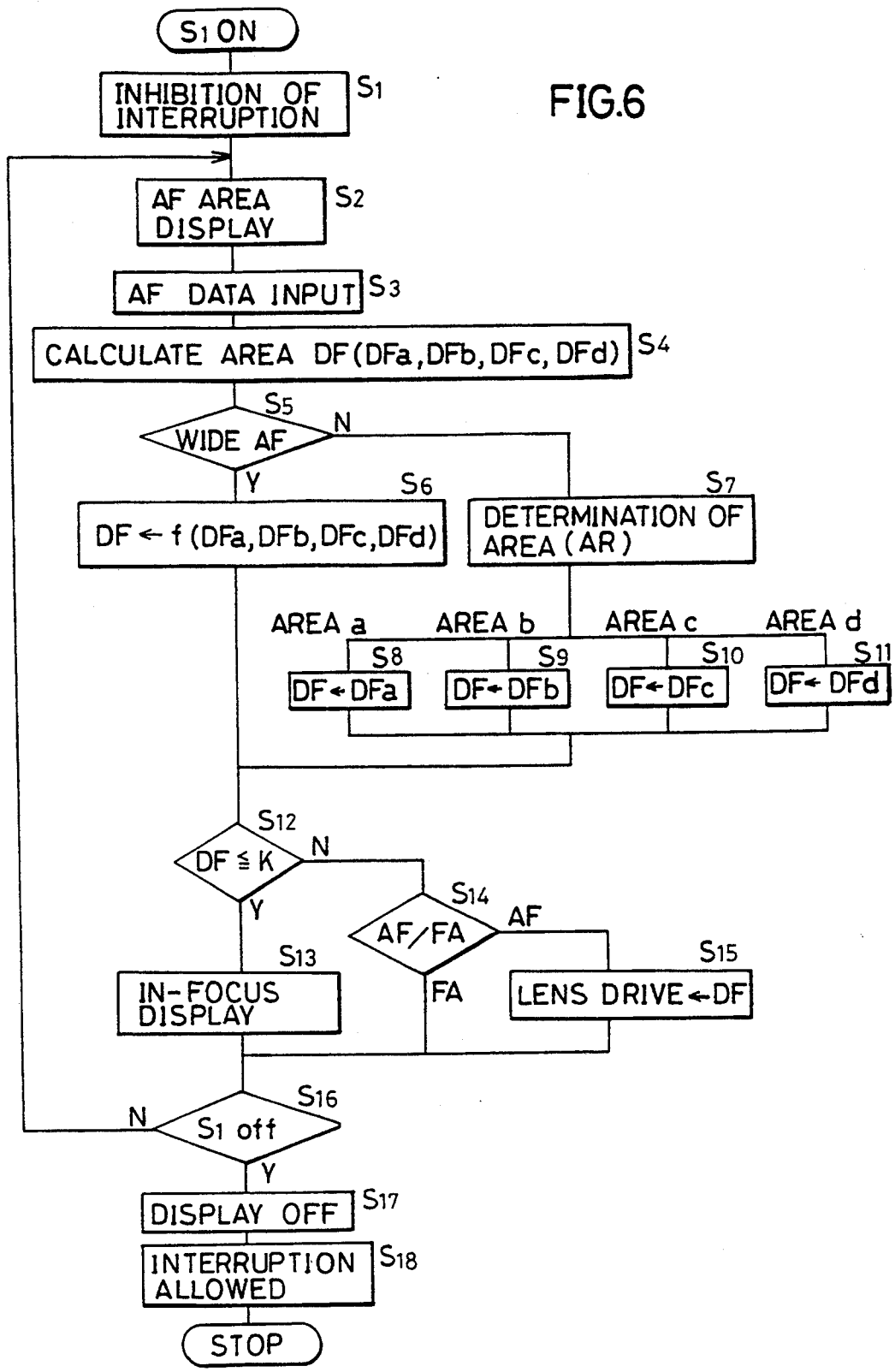

FIG. 6 is a flow chart for a control carried out when the switch $S_1$ is turned on.

First, when the program enters the flow in response to a turning-on of the switch $S_1$, interruption is inhibited in step $S_1$ for inhibiting interruption from other portion hereinafter. Then, a set AF area is displayed in step The display is made by the LCD 2 controlled by the LCD driving circuit 6 based on an area (AR) value. At an initial state in which no area is set, ordinarily a normal wide display (AR1, see FIG. 8) is made.

Then, in steps S3, AF data, i.e. focus detecting data is input from all the focus detecting areas. Then, a defocus amount of each area, that is, area DF values (Dfa, Dfb, Dfc and Dfd) are calculated (step S4).

In step S5, determination is made as to whether the AF area is at a wide state or not depending on "0" or "1" of a spot flag SPTF indicative of a spot area display. When the AF area is at a wide AF state, one defocus amount DF is calculated on a predetermined system based on the defocus amount of each area obtained in step S4. The spot flag SPTF is reset ("0") at a power supply or the like.

On the other hand, when the AF area is not an a wide AF state (NO in step S5), determination of a spot area is made in step S7. When the spot focus detecting area falls on a shown in FIG. 3, the value Dfa of focus detecting area a is used as a defocus amount in step S8. Similarly, in the cases of the areas b, c and d, the defocus amounts Dfb, Dfc and Dfd are used as the defocus amounts.

Determination is made in step S12 as to whether the above-obtained defocus amounts DF are equal to or less than a predetermined value K. When the defocus amount is equal to or less than the predetermined value K which is considered to be an in-focus state, the indication is given in step S13 that the camera is in the in-focus. When the defocus amount is more than the predetermined value K, determination is made in step S14 as to whether the camera is in the auto-focus mode or the focus aid mode. When in the auto-focus mode, the lens is driven to enter the in-focus state based on the defocus amounts DF obtained in step S15. On the other hand, when in the focus aid mode, the lens is not driven and the program proceeds to step S16.

Determination is made in step S16 as to whether the switch $S_1$ is off or not. If the switch $S_1$ is not off, the program returns to step S2 to repeat the above-described operations. On the other hand, when the switch $S_1$ is off, the operation of the switch $S_1$ is considered completed, so that the display of the LCD display portion is off in step S17 to allow interruption in step S18, thereby stopping the program.

Figure 7A:
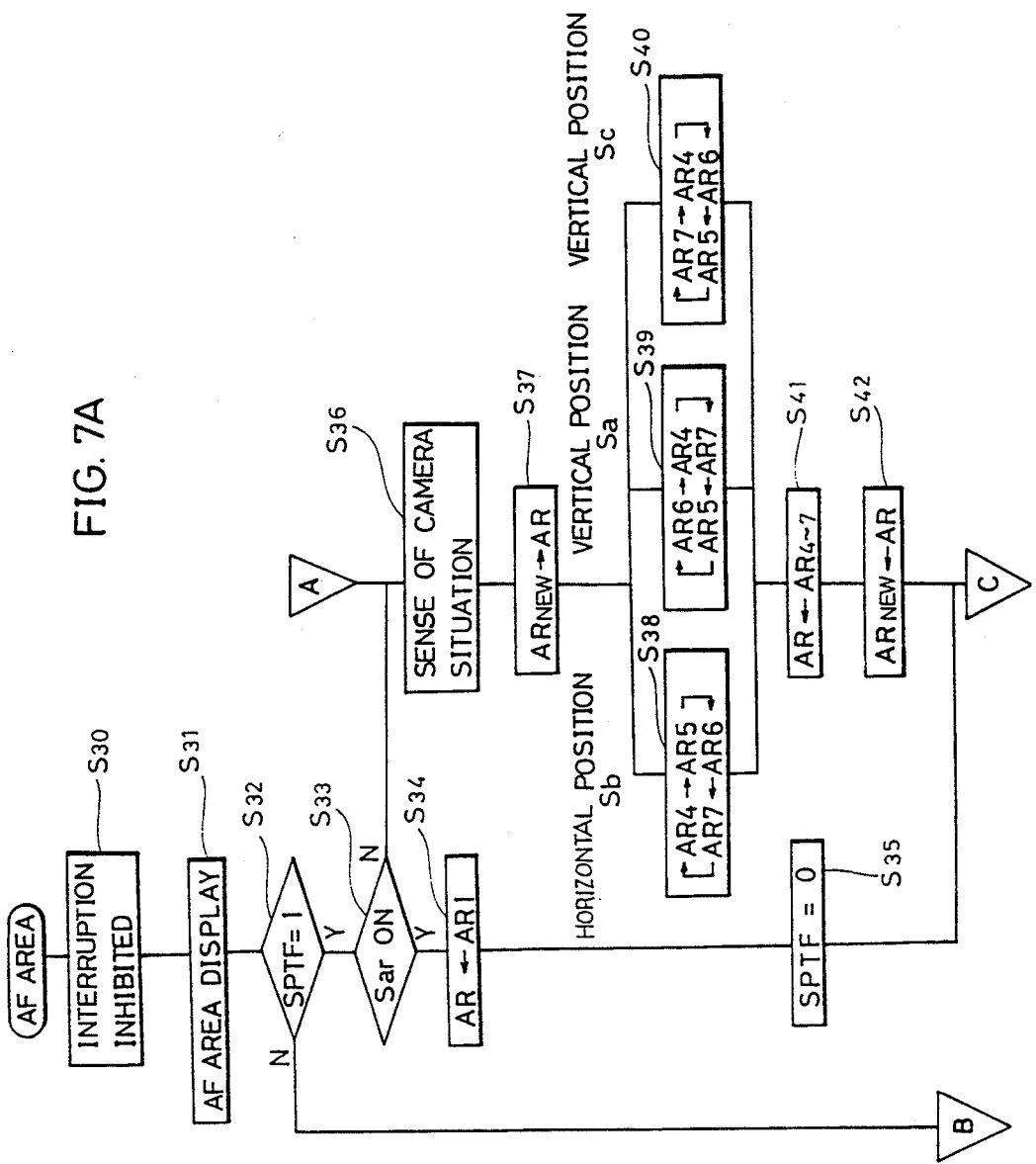
Figure 7B:
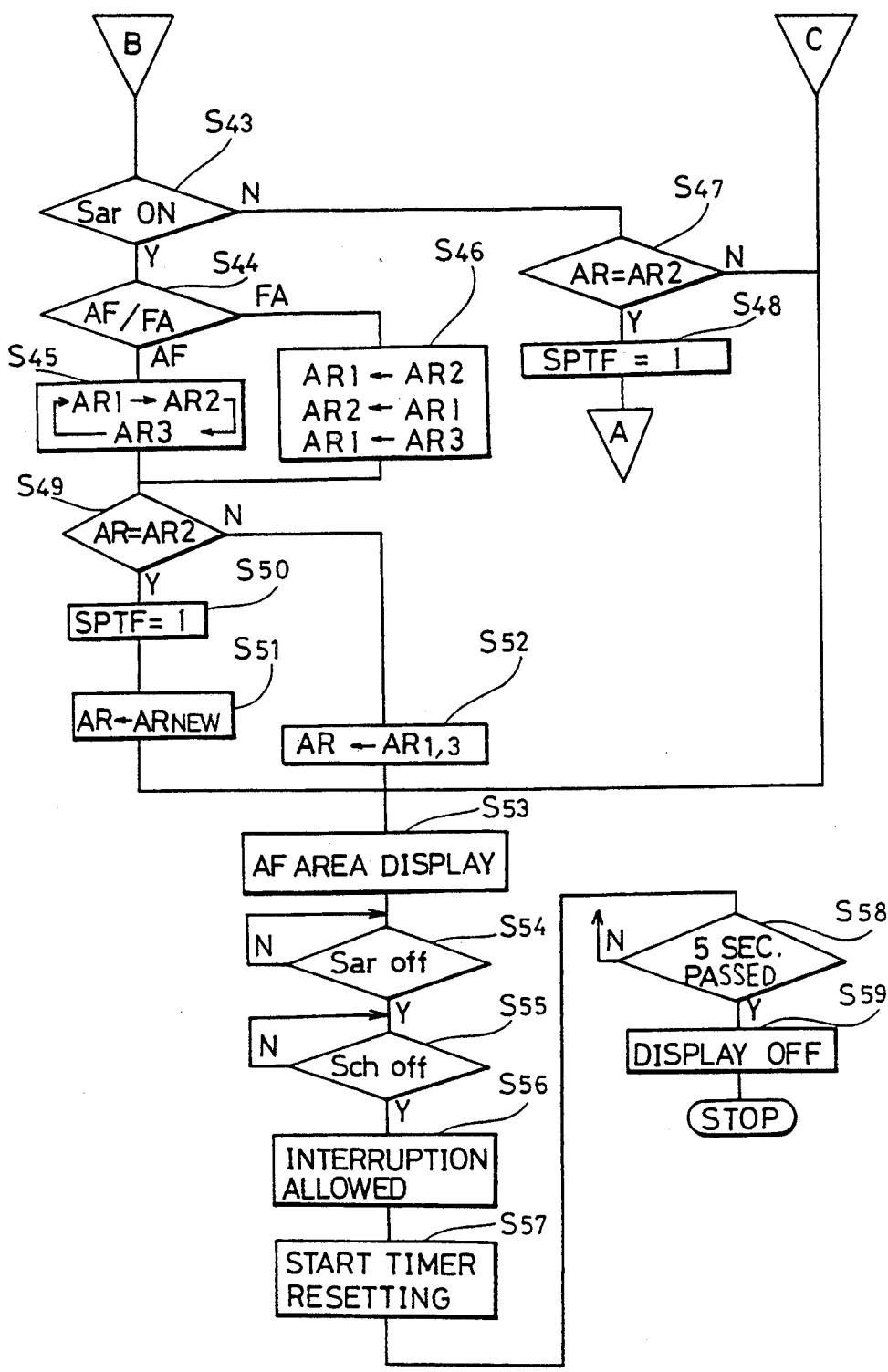

FIGS. 7A and 7B are flow charts showing the specific contents of the AF area routine according to one embodiment of the present invention.

This routine is executed by switching the switches $S_{ar}$ and $S_{ch}$ from off to on state. Upon entering the flow, interruption is inhibited in step S30 to give priority to this flow. Then, in step S31, the LCD display portion makes a display of a focus detecting area based on a value of AR indicative of a display state of the focus detecting area. Determination is made in step S32 as to whether the spot flag SPTF is "1" or not. If it is "1", that is, if a spot area is displayed, determination is made in step S33 as to whether the switch $S_{ar}$ is turned on or not. Specifically, the switch $S_{ar}$ shown in FIG. 5 is arranged in the camera as shown in FIG. 12. In other words, switching of focus detecting areas is made by turning-on the switch $S_{ar}$, provided at a camera body 25. As shown in FIG. 12, the switch $S_{ch}$ is also provided on the upper surface of the camera body 25. Then, the switch $S_{ch}$ is turned on every rightward slide thereof (to a position represented by the broken line) and thereafter, when the operator takes his hand off the switch, it is energized by a spring to return to the initial position and turned off.

Figure 8:
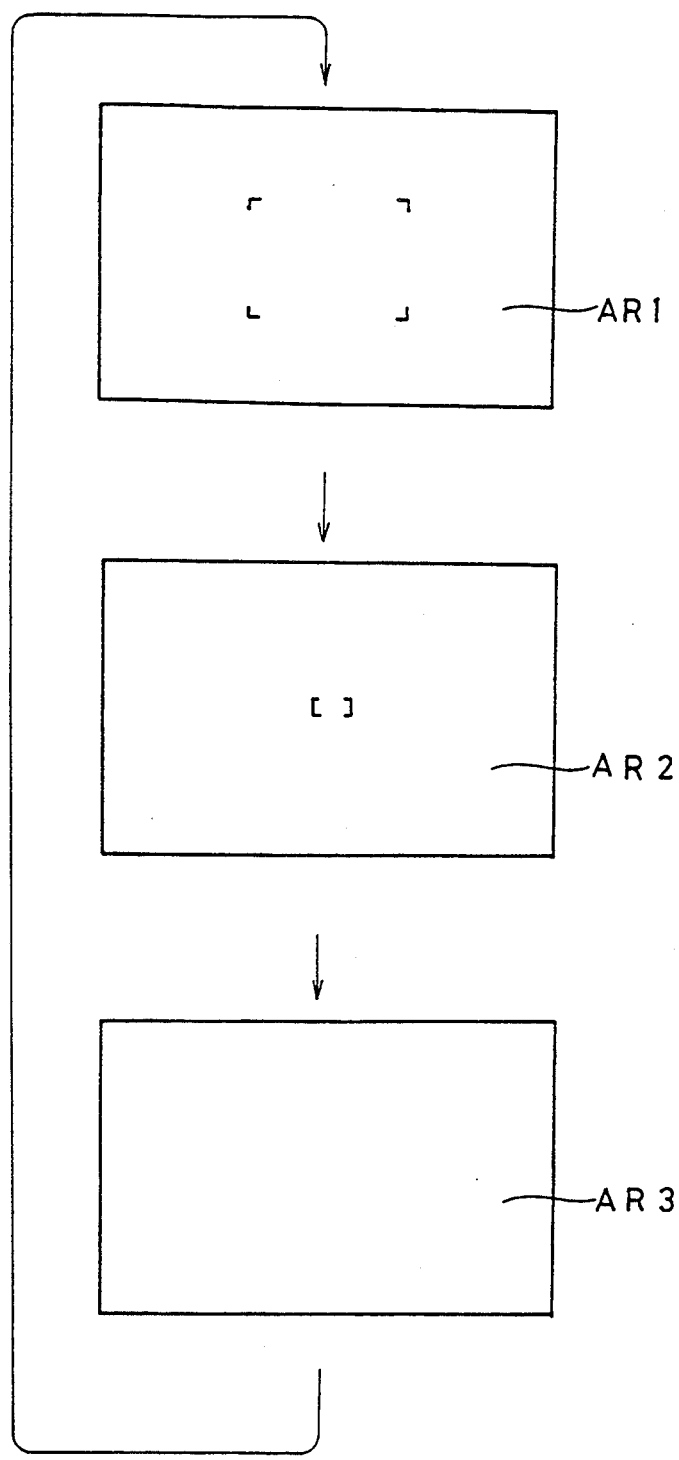

When the switch $S_{ar}$ is on in step S33, an AR value set to AR1 for the normal wide display as shown in FIG. 8. Then, the spot flag SPTF is set to "0" in step S35 and the program proceeds to step S53. On the other hand, when the switch $S_{ar}$ is not turned on in step S33, meaning that a spot area is displayed, the camera holding situation in photographing is detected in step S36. The camera holding situation will be more specifically shown in FIGS. 9 and 10A-10C.

Figure 9:
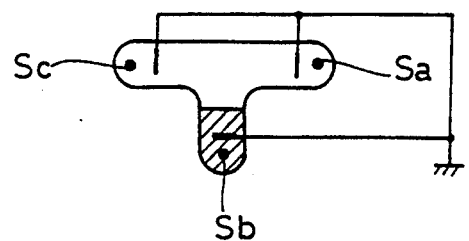
FIG. 9 is a diagram showing an arrangement of vertical and horizontal switches $S_a$, $S_b$ and $S_c$ of FIG. 5.
Figure 10A:
FIGS. 10A-10C are diagrams showing photographing situations of the camera corresponding to the vertical and horizontal switches $S_a$–$S_c$.
Figure 10B:
Figure 10C:

The vertical or horizontal situation detecting switches $S_a$, $S_b$ and $S_c$ are arranged as shown in FIG. 9. That is, the hatched portion is filled with mercury which moves to any of the switches $S_a$-$S_c$ as the camera holding situation changes, thereby causing current to flow to the switch. As a result, the camera holding situation is sensed from a change of a potential from "H" (logical high) to "L" (logical low) of any of the ports P6-P8 corresponding to the respective switches shown in FIG. 5. FIGS. 10A-10C show the specific holding situation in photographing of the camera.

Then, in step S37 in FIG. 7, the value $AR_{NEW}$ indicative of a focus detecting area set at present is considered a focus detecting area. The value of the focus detecting area $AR_{NEW}$ is initially set to a spot value AR4 (see FIG. 11A) supposedly the highest frequency of use in general.

Any of the processings in steps S38-S40 is carried out corresponding to each camera holding situation sense by each of the horizontal or vertical situation detecting switches $S_a$-$S_c$ shown in FIG. 9. For example, when the camera is held with its longitudinal side in parallel with a horizontal direction, if AR4 is set as an initial value of a focus detecting of AR value in step S38, the display position of the spot focus detecting areas cyclically changes as AR4→AR5→AR→AR7→AR4.

Figure 11A:
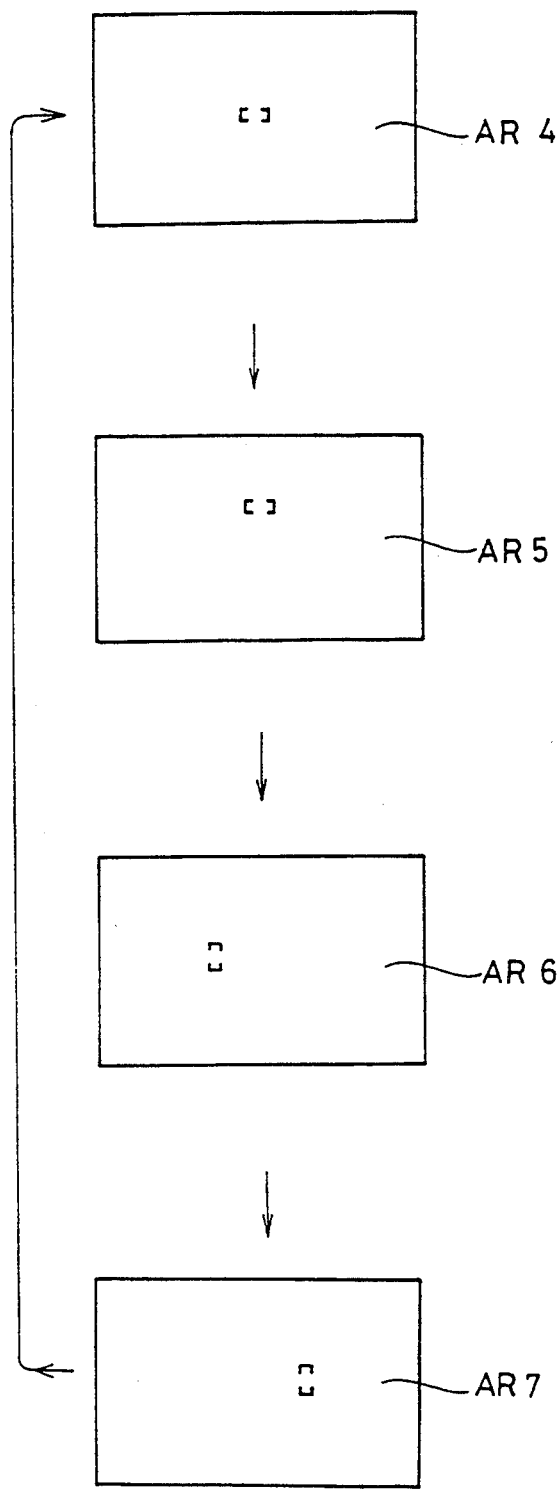
Figure 11B:
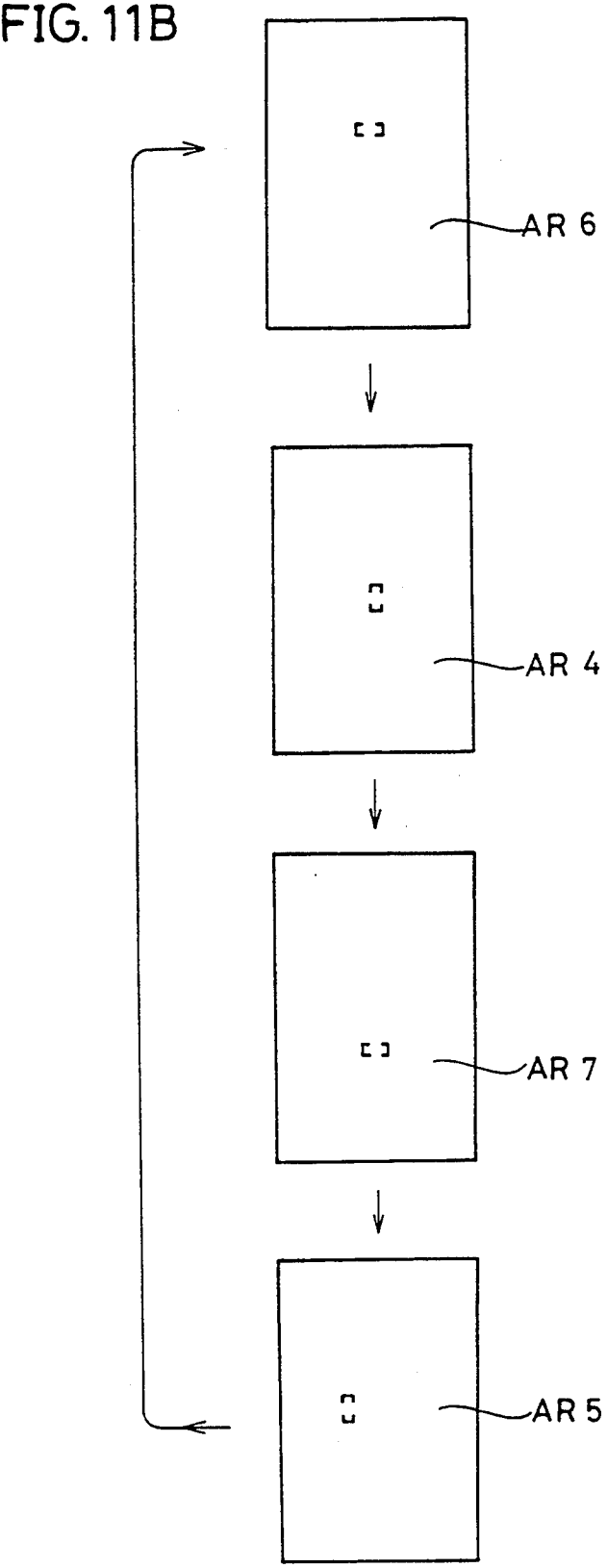
Figure 11C:
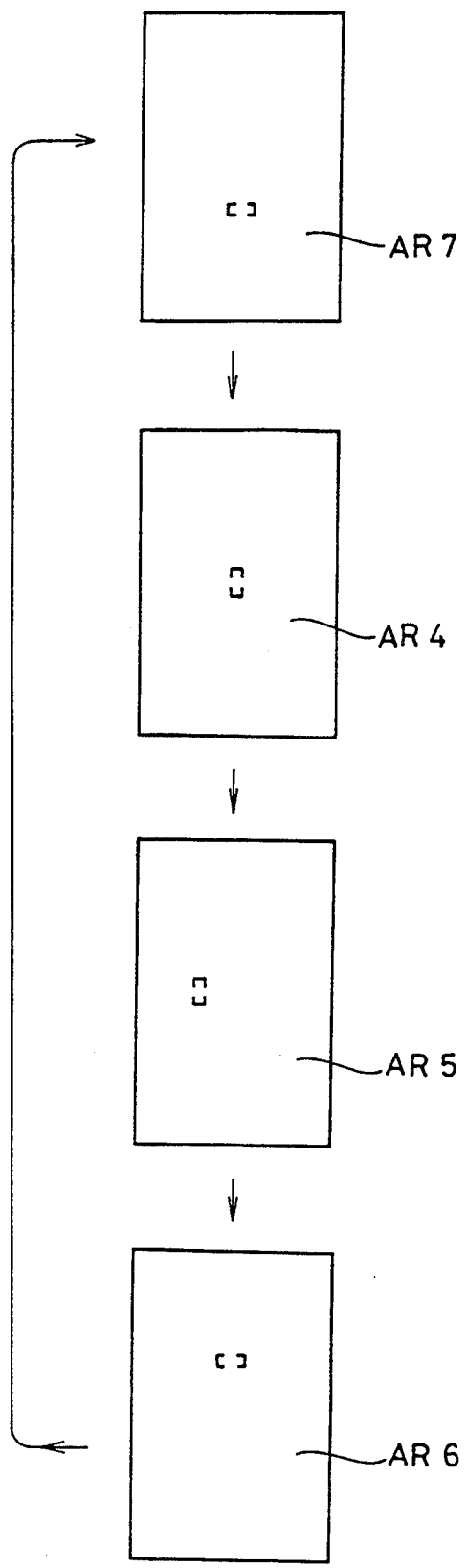

FIGS. 11A-11C show specific changes of the display position. FIG. 11A shows the operation in step S38, that is, a case wherein the camera is held with its longitudinal side in parallel with a horizontal direction (the switch $S_b$ is on), FIG. 11B shows the operation in step S39, that is, a display in a case wherein the camera is held with its longitudinal side vertical to the same (the switch $S_a$ is on) and FIG. 11C shows the operation in step S40, that is, a change in display in a case wherein the camera is held with its longitudinal side vertical to the same (the switch $S_c$ is on).

In step S41, one of the AR values indicative of the focus detecting areas is used as a focus detecting area AR and in step S42, the focus detecting area AR is used as a value $AR_{NEW}$ indicative of a present set area. Then, the program proceeds to step S53.

On the other hand, when the spot flag SPTF is not "1" in step S32, that is, when no spot area is displayed, determination is made in step S43 as to whether the area switching switch $S_{ar}$ is turned on or not. If the switch is not turned on, determination is made in step S47 as to whether the focus detecting area value AR is AR2 indicative of a spot display or not. When the spot display is made, the spot flag is SPTF is set to "1" in step S48 and the program returns to step S36 wherein the holding situation of the camera is detected to change the position of the above-described spot display. When the focus detecting area value is not AR2, the program proceeds to S53.

When the area switching switch $S_{ar}$ is on in step S43, determination is made in step S44 as to whether the camera is in the auto focus mode or the focus aid mode. When in the focus aid mode, if the focus detecting area value is AR2 in step S46, the value is changed to AR1, if it is AR1, AR1 is changed to AR2 and if it is AR3, AR3 is changed to AR1.

When in the auto focus mode, the display is changed in step S45 in the cycle shown in FIG. 8. More specifically, when the present display of the focus detecting area is a normal wide display represented as AR1, the display is sequentially changed as AR1→AR2→AR3-→AR1 every turning-on of the switch $S_{ar}$.

Then, in step S49, determination is made as to whether the focus detecting area value is AR2 or not. If it is AR2, the spot flag SPTF is set to "1" in step S50 and the focus detecting area value $AR_{NEW}$ indicative of the present spot display is input as a focus detecting value AR in step S51. On the other hand, when the focus detecting area value is not AR2, AR1 or AR3 is input as a focus detecting area value AR and the display indicative of a focus detecting area is made based on value AR in step S53. Interruption is allowed in step S56 after the turning-off of the switches $S_{ar}$ and $S_{ch}$ in steps S54 and S55. Then, the timer is reset in step S57 to start counting and liquid crystal display of the LCD is off in step S59 after five minutes has passed in step S58, thereby terminating the program.

As described in the foregoing, according to the first embodiment, even if a photographer familiar with operation of a camera memorizes the position of the focus detecting frames and then he fines the displays of these frames in the finder a nuisance, for example, he is allowed to select display or no-display of the frames at will according to his preference and skill, which makes the camera more practical.

However, without a display of a focus detecting frame, a photographer focusing a camera by manual operation finds difficulty in continuing the focus adjustment because he cannot see which part of an object is at an in-focus condition. The present embodiment is therefore structured such that the focus detecting frames are displayed without fail at the time of photographing in a focus aid mode to clearly inform the photographer of the part of the object at the in-focus condition, thereby facilitating manual focus adjustment.

In addition, the photographer can select an arbitrary area among the plurality of spot focus detecting areas by operating the switch Sch according to a state of the object to be photographed. Even in the spot area selection mode, the camera can be changed to a wide AF mode in which all the focus detecting areas are used for focus detection only by one push of the switch Sar. Therefore, mode switching can be quickly made to prevent the photographer from missing shutter chance because of a changing operation of a focus detecting area.

(2) Second Embodiment

The second embodiment of the present invention will be described. The basic arrangement of the camera body of the second embodiment is the same as that of the first embodiment.

Figure 13:
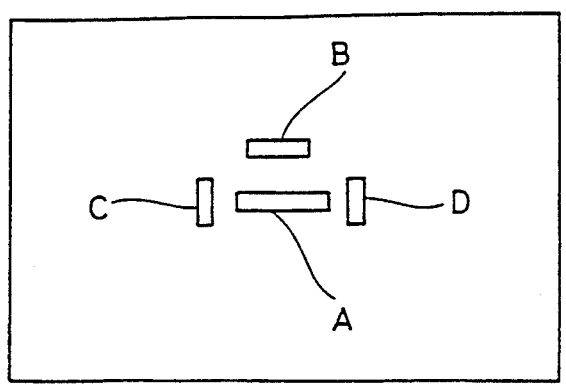
FIG. 13 is a diagram showing a locational relation between the display portions and the focus detection areas which can be perceived in the finder of the camera according to a second embodiment.

FIG. 13 is a diagram showing a state of an image area to be photographed of the camera according to the second embodiment and in the drawing, focus detecting areas A–D which corresponding to the areas a–d on the image area shown in FIG. 3.

Figure 14:
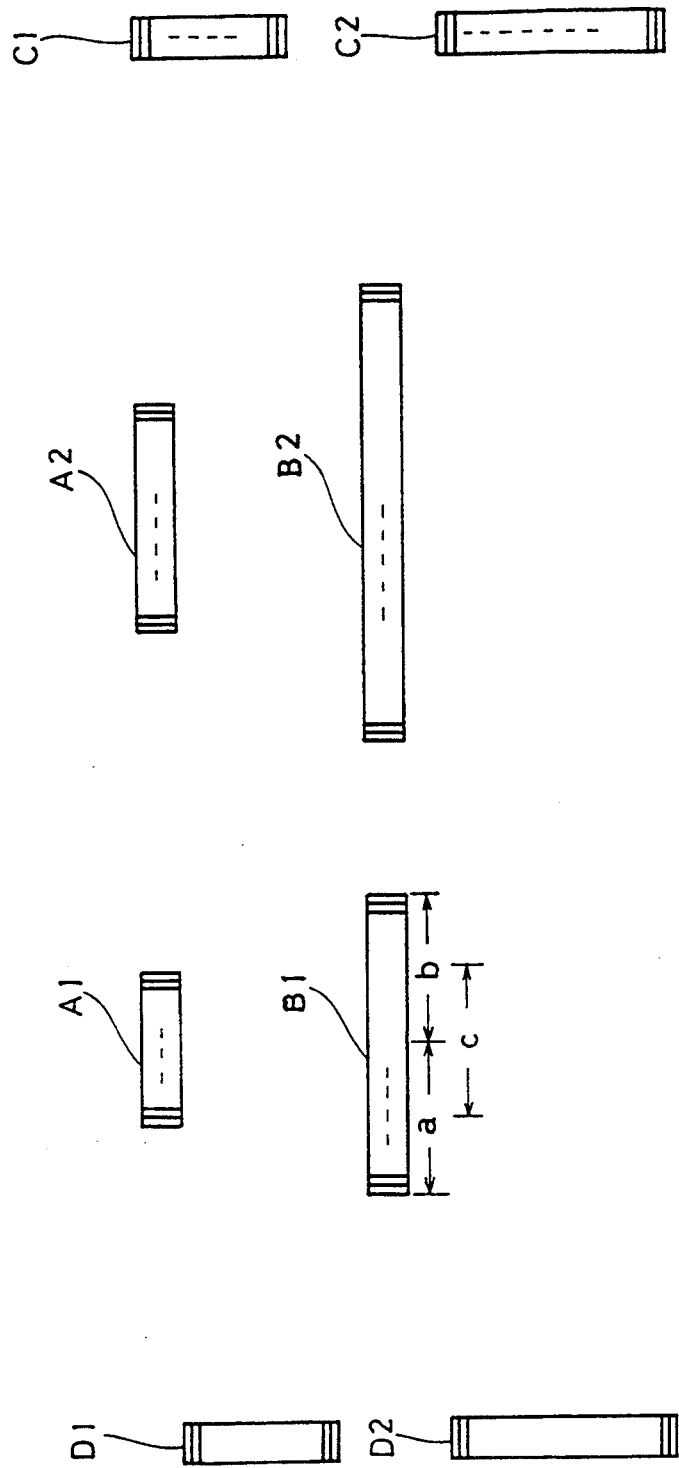
FIG. 14 is a diagram showing a specific arrangement of the CCD substrates of FIG. 2 corresponding to the focus detecting area of FIG. 3.

FIG. 14 is a diagram showing a specific arrangement of line sensors in the CCD substrate 1 shown in FIG. 2.

In the drawing, basic portions include A-1, B-1, C-1 and D-1 and reference portions include A-2, B-2, C-2 and D-2. The pairs of reference numerals A-1 and A-2, B-1 and B-2, C-1 and C-2, and D-1 and D-2 are corresponding basic portions and reference portions, respectively, which are for focus detection based on correlation between image of a basic portion and image of a reference portion shifted therefrom. With regard to focus detection at the reference portion B-1, the whole data from the line sensor is not used at once but the portion is divided into three blocks a, b, and c and image of each block is compared with the reference portion B-2 as shown in the drawing.

The following is the reason for the division of the region B into three blocks a–c as shown in FIG. 14. The region B covers larger area than the regions A, C and D. As a result, objects existing at different distances might be included in one area. In such a case, when the basic portion and the reference portion are correlated with each other for focusing, the defocus amounts of the far and the near objects are added as error amounts to the correlation value, which makes it the focus detection difficult. Thus, the region B is divided into three blocks to facilitate automatic focus detection in the present invention.

Figure 15:
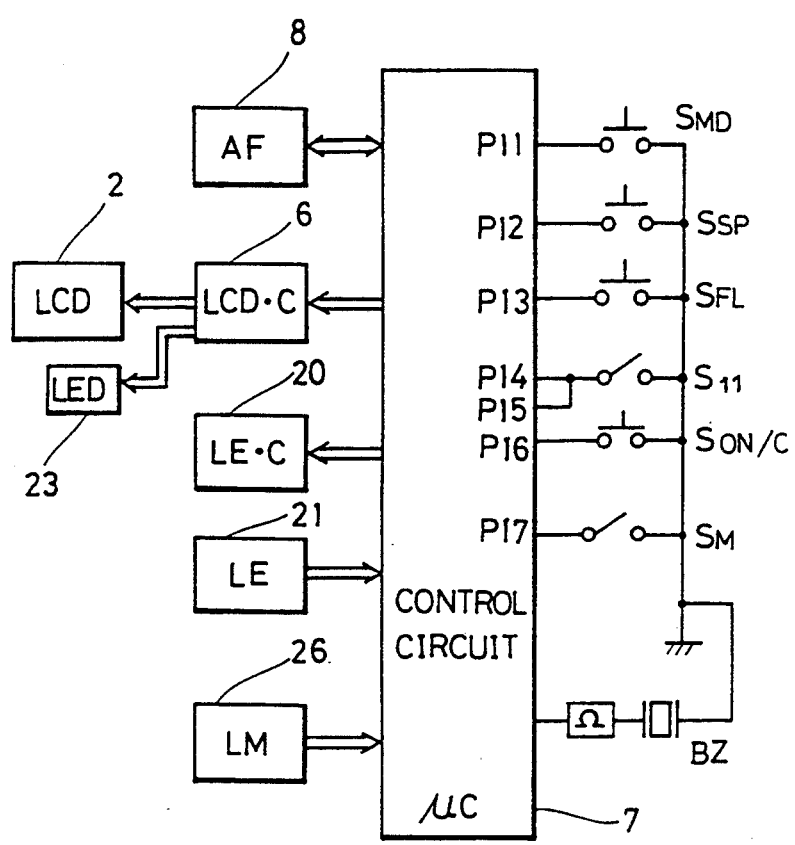
FIG. 15 is a block diagram of a control portion according to the second embodiment of the present invention.

FIG. 15 is a block diagram showing the arrangement of a control portion according to a first embodiment of the present invention.

In the drawing, a control circuit (microcomputer $\mu$C) 7 receives signals from various switches. A switch $S_{MD}$ is an area mode switch, in response turning-on of which, an on-signal is input to a port P11. A switch $S_{SP}$ performs switching of spot areas among the focus detecting areas, in response to turning-on of which, an on-signal is input to a port P12. A switch $S_{FL}$ is a focus lock switch and an on-signal is input to a port P13 in response to the on-signal of the switch. A switch $S_{11}$ is activated by a first stroke of a release button, in response to turning-on of which switch, an on-signal is input to a port P14 to start an AF operation. Then, the input of a port P15 determines on/off state of the switch $S_{11}$. A switch $S_{ON/C}$ switches modes between a one-shot AF mode wherein no focus adjustment is made after in-focus condition is obtained and a continuous AF mode wherein focus adjustment is continuously repeated after in-focus, and in response to turning-on of which switch, an on-signal is input to a port P16. A switch $S_M$ is a main switch of the camera and in response to turning-on of which switch, an on-signal is input to a port P17. A buzzer BZ gives a warning sound in response to a one-shot pulse from the control circuit 7.

The control circuit 7 receives data from a focus detection portion 8 and outputs control data for controlling the focus detection portion 8. In addition, the control output from the control circuit 7 controls a transparent liquid crystal display (LCD) 2 and a light emitting element (LED) 23 through a LCD driving circuit (LCD.C) 6. The control output from the control circuit 7 is connected to a lens drive control circuit (LE.C) 20 to control driving of a lens for auto focusing. The circuit also receives data indicative of a lens position from a lens (LE) 21. The circuit receives data corresponding to brightness of an object from a light measuring circuit (LM) 26.

Figure 16A:
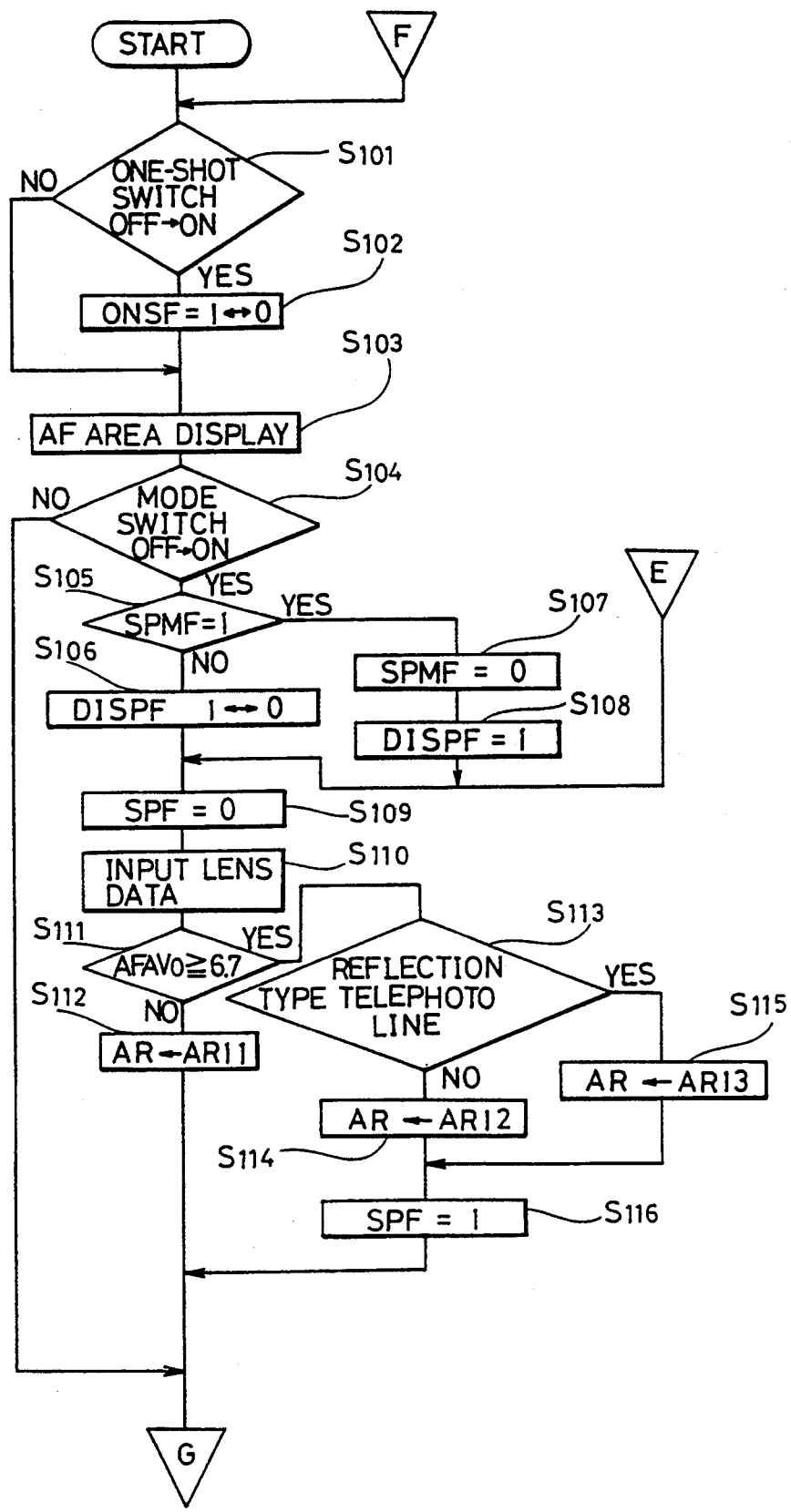
FIGS. 16A and 16B are flow charts starting with a turning-on of a power supply switch according to the second embodiment of the present invention.
Figure 16B:
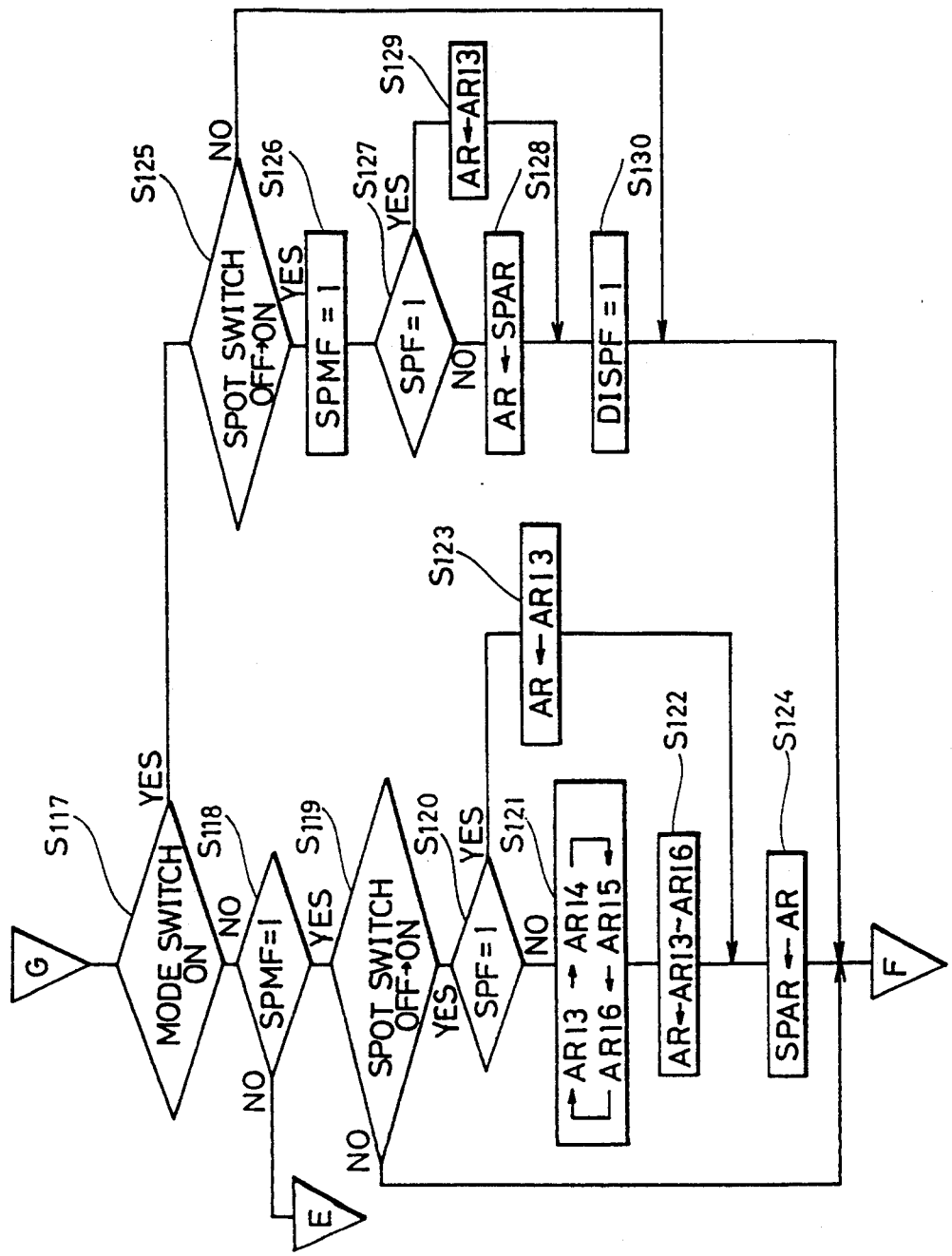

FIG. 16A and FIG. 16B are flow charts showing control flow executed by turning-on of the main switch $S_M$ according to a second embodiment.

Prior to descriptions of these flows, display in a finder will be described.

Figure 20:
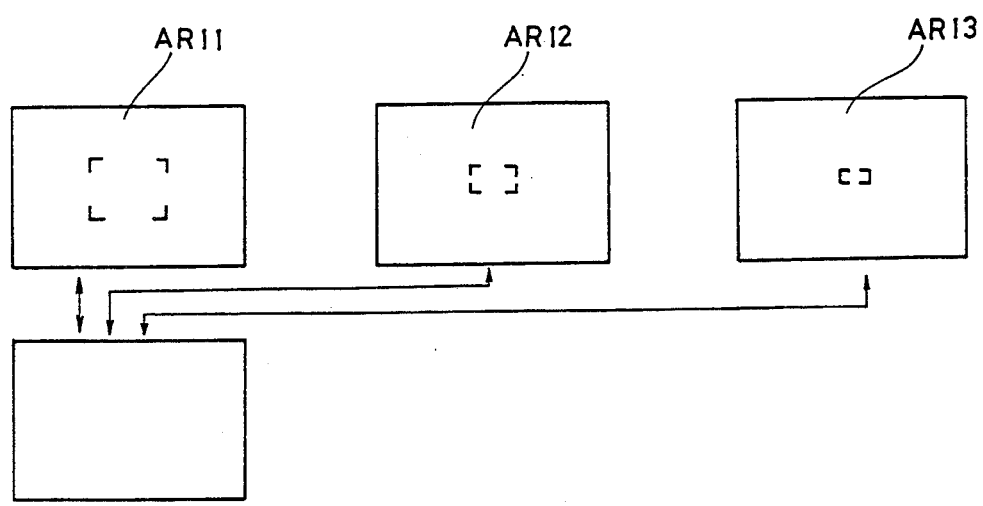
FIG. 20 is a diagram showing a state of the focus detecting frames in the finder to be switched by a turning-on of a mode switch according to the second embodiment of the present invention.

FIG. 20 is a diagram showing an image area of the finder wherein an object is to be displayed, which is changed in response to the turning-on of the mode switch $S_{MD}$.

The image area shown at upper left of the drawing shows a state controlled by the area value AR11 and comprises the maximum area including all the focus detecting areas A–D of FIG. 13 as focus detecting frames. That is, in this state, auto focus detection is performed based on all the focus detection information of the focus detection areas A–D. The image area at the center shows a focus detecting frame controlled by the area value AR12, in which case, focus is detected by using the blocks a and b of the reference portion B-1 of FIG. 14. Shown at upper right is a focus detecting frame controlled by the area value AR13, in which, focus detection is made by using the block c of the reference portion B-1 of FIG. 14.

The camera according to the present invention has two modes, one in which focus detecting frames are displayed and the other in which the same are not displayed, and switching of display in response to a mode switch $S_{MD}$ will be described later. When a flag DISPF (will be described later) is set, a frame is displayed and when the same is not set, the camera enters a frame-less mode wherein no frame is displayed.

Therefore, when the flag DISPF is set, the focus detecting frames are displayed as shown at the upper column of FIG. 20 and when the same is not set, no frame is displayed as shown in the lower column (in a frame less state).

Figure 21:
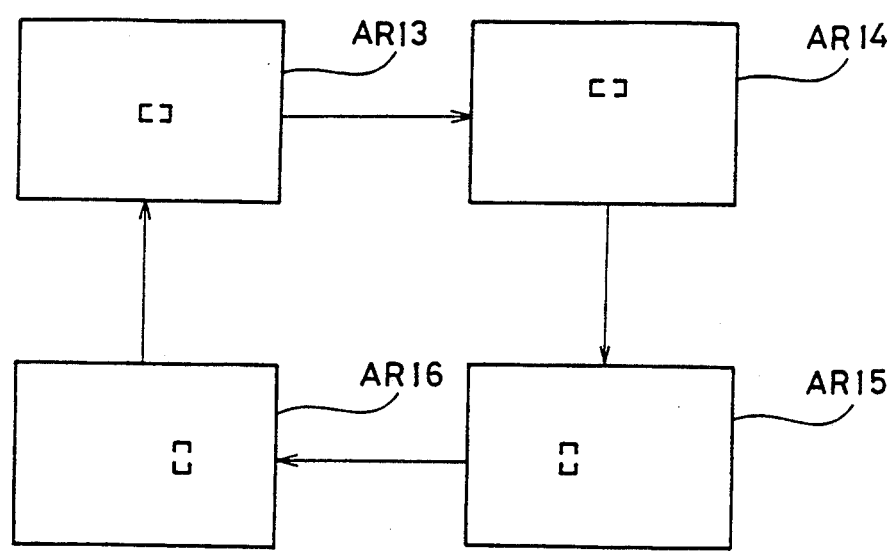
FIG. 21 is a diagram showing a state of the focus detecting frames in the finder to be switched by a turning-on of a spot switch according to the second embodiment of the present invention.

FIG. 21 is a diagram showing states of a focus detecting frame in a spot mode which frame is switched in response to a turning-on of the mode switch $S_{MD}$ and a turning-on of the spot switch $S_{SP}$.

In the drawing, the focus detecting frame represented as the area value AR13 corresponds to the focus detecting area A of FIG. 13, that represented as the area value AR14 corresponds to the focus detecting area B of FIG. 13, that represented as the area value AR15 corresponds to the focus detecting area C of FIG. 13 and that represented as the area value AR16 corresponds to the focus detecting area D of FIG. 13. A position of the focus detecting frames sequentially and cyclically changes in response to a turning-on of the spot switch as shown in the drawing.

As described above, in the camera according to the second embodiment of the present invention, while the areas wherein focus condition is detected in practice include the four areas A–D shown in FIG. 13, focus detection at photographing is made in the six regions corresponding to the frames represented as the area value AR11–AR16 shown by the solid lines of FIG. 13.

Figure 22A:
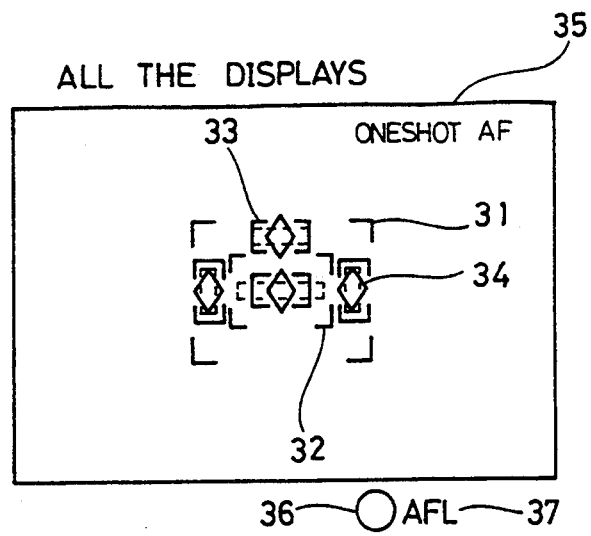
FIGS. 22A-22T are diagrams showing displays in the finder at various states according to the second embodiment of the present invention.
Figure 22B:
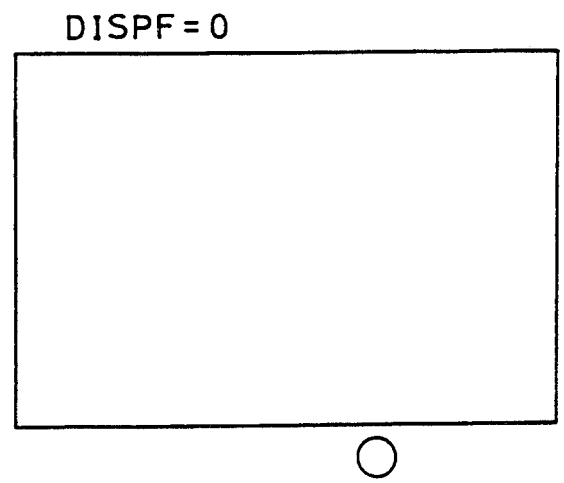
Figure 22C:
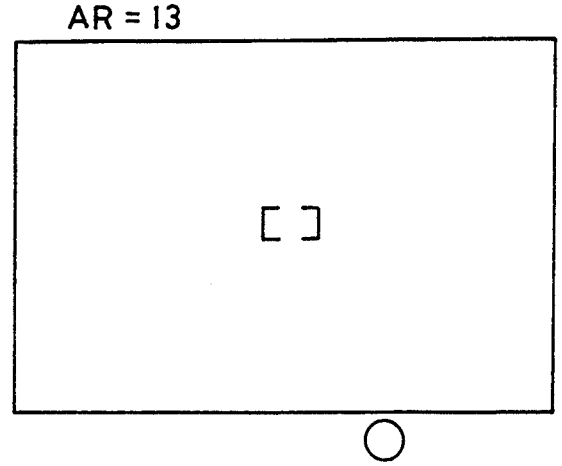
Figure 22D:
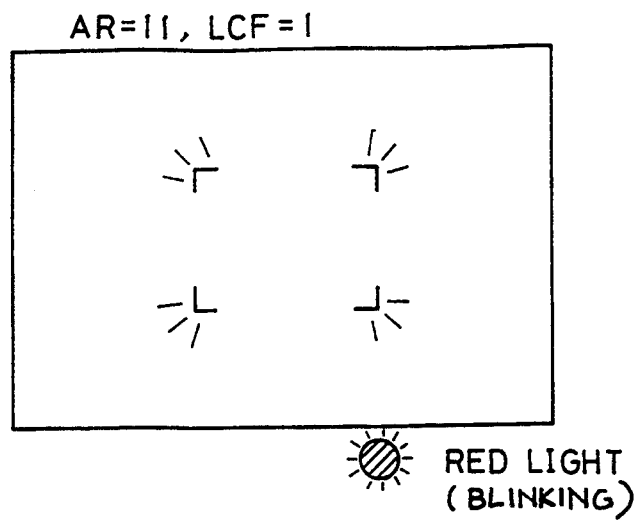
Figure 22E:
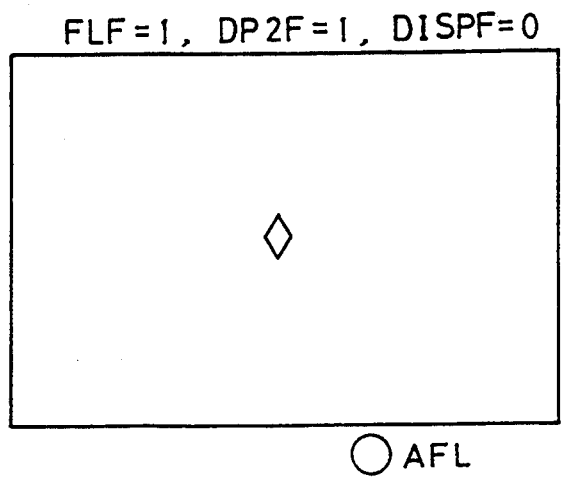
Figure 22F:
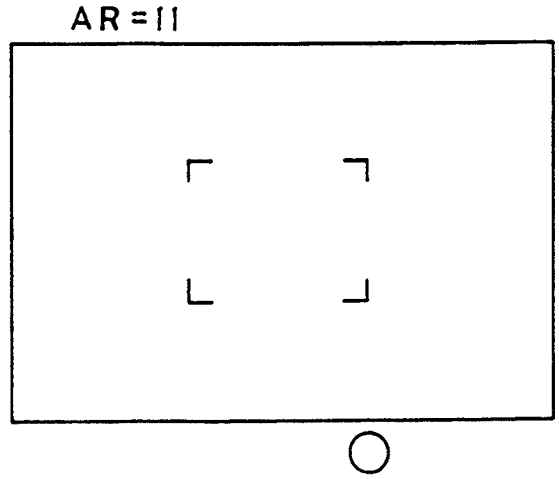
Figure 22G:
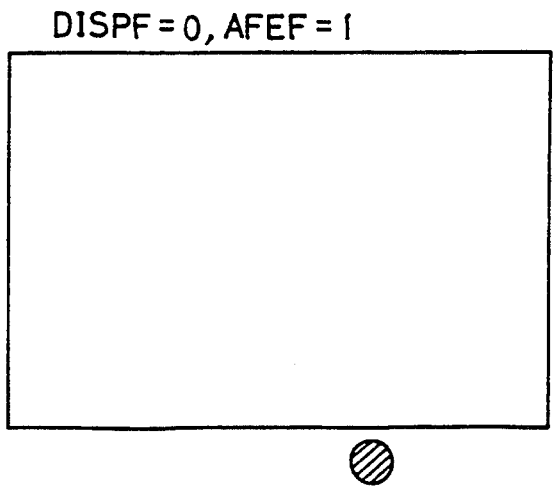
Figure 22H:
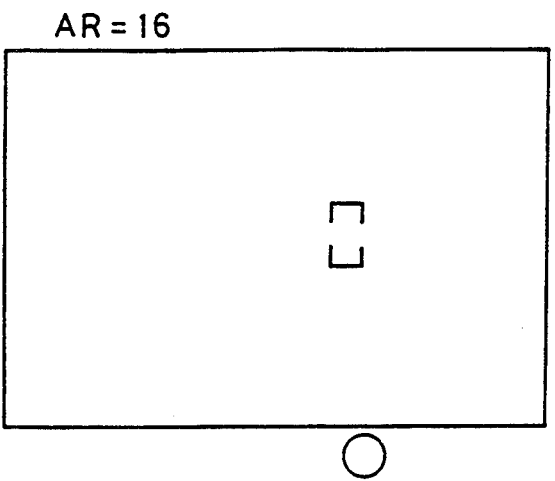
Figure 22I:
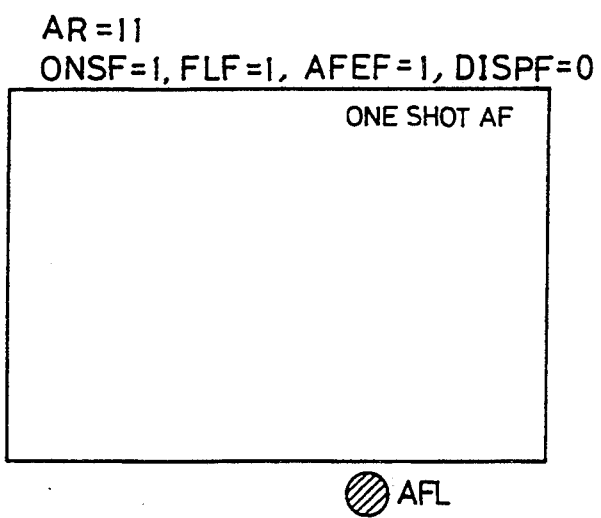
Figure 22J:
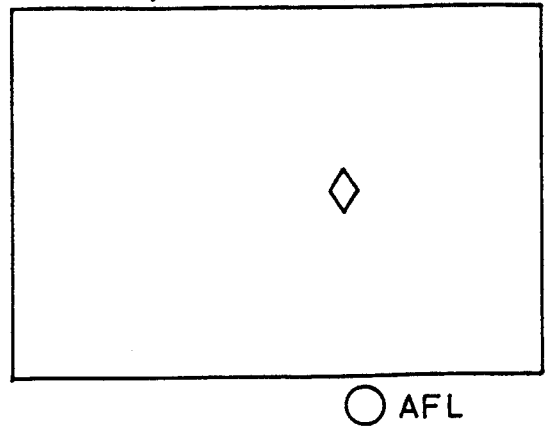
Figure 22K:
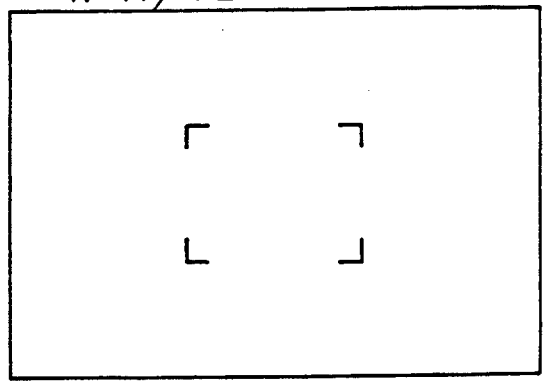
Figure 22L:
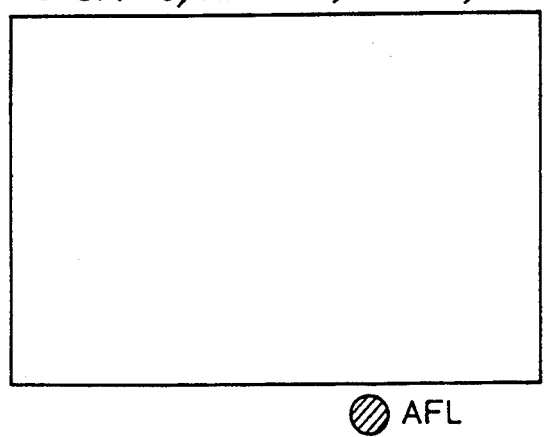
Figure 22M:
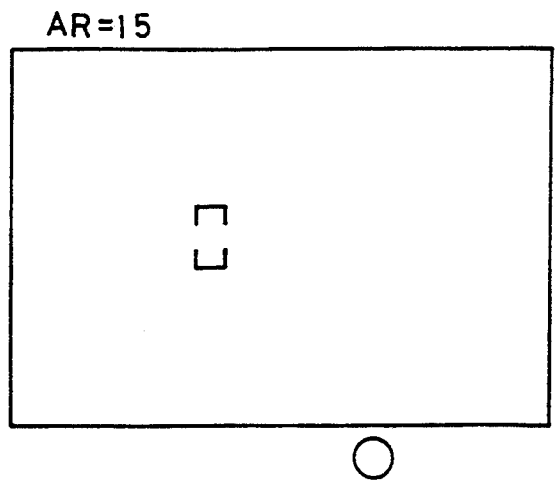
Figure 22N:
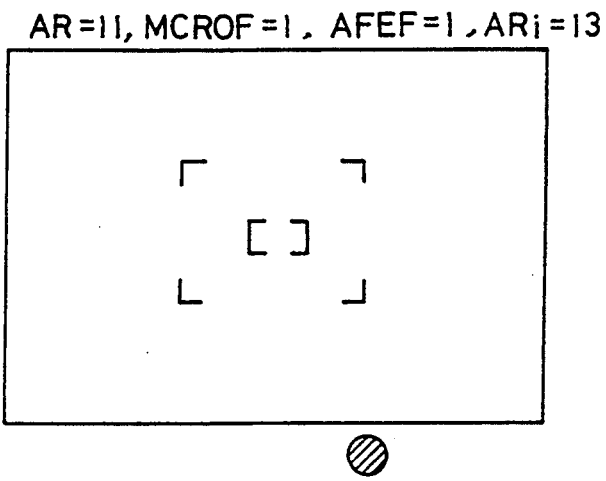
Figure 22O:
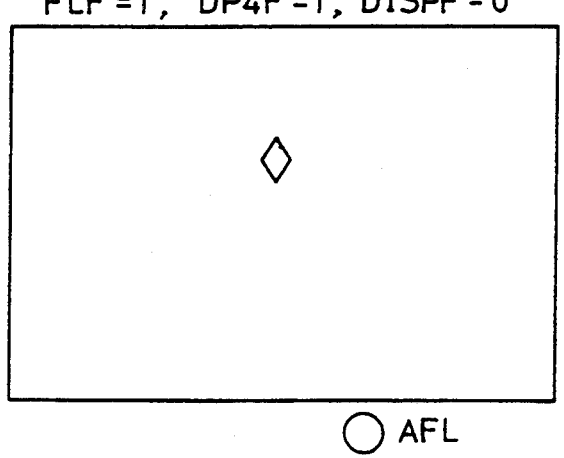
Figure 22P:
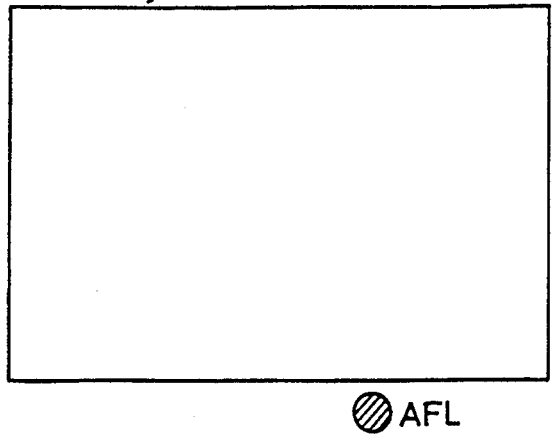
Figure 22Q:
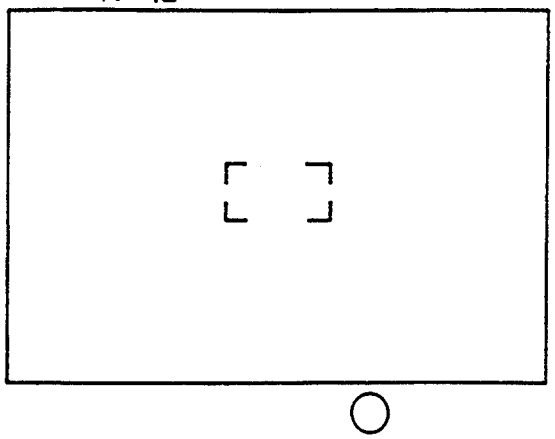
Figure 22R:
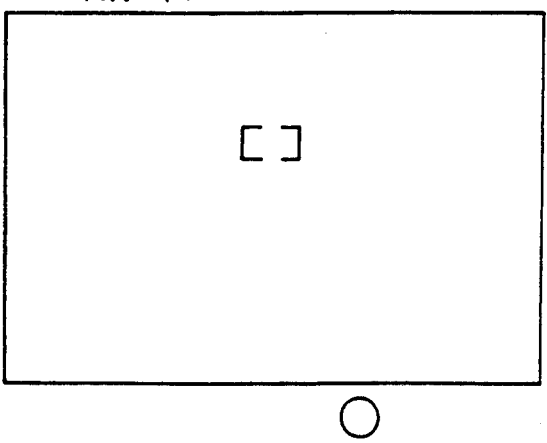
Figure 22S:
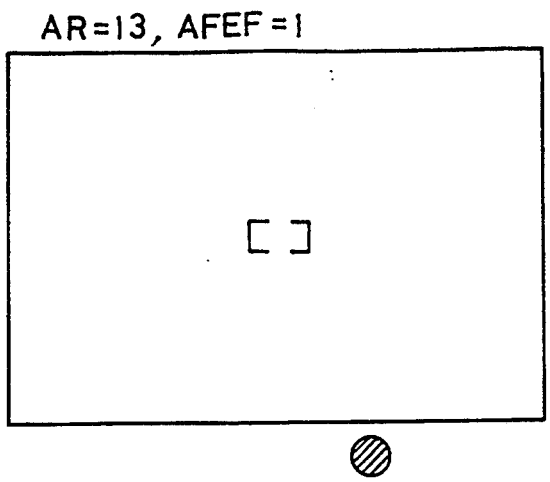
Figure 22T:
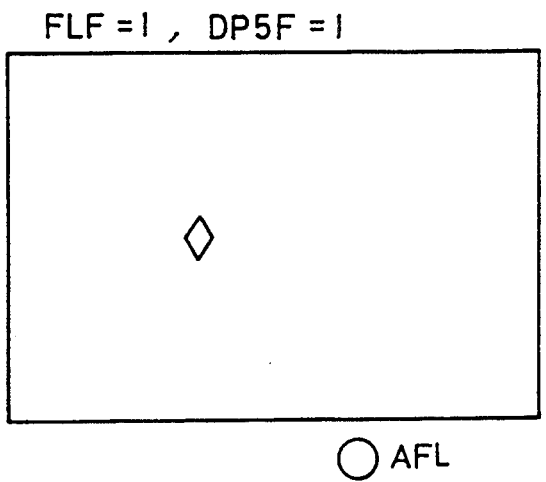

FIGS. 22A–22T are diagrams showing displays in the finder according to each photographing state. FIG. 22A shows all the displays in the finder.

In the drawing, a display 31 shows a focus detecting frame at a wide state at the area value AR11, a display 32 shows a focus detecting frame at an area value AR12, and a display 33 shows a focus detecting frame at an area value AR14. The broken lines correspond to the focus detecting areas A–D of FIG. 13 and they are not displayed in the finder in practice. A display 34 appears when an object in each focus detecting frame falls within a depth of field. A display 35 appears when the one-shot switch $S_{ON/C}$ is turned on. A display 36 lights up green at in-focus. A display 37 appears at a focus lock. Although the display 36 is represented as a circle in the drawing, it does not appear at all in practice in the finder when it does not light up or is not turned on.

And FIGS. 22B–22T show respectively various display state caused by various combination of each condition of flags which are following described with reference to flow charts in FIGS. 16–19.

As described above, various displays are made in the finder, by which a photographer can precisely perceive a photographing state, thereby making the camera easy to operate.

Control according to the second embodiment will be described following the flow charts shown in FIGS. 16A and 16B in the following.

The program enters this routine upon a turning-on of the main switch $S_M$ and determination is made in step S101 as to whether the one-shot switch $S_{ON/C}$ is turned on or not. When the switch is on, a one-shot flag ONSF is set to "1" and the program proceeds to step S103 wherein a focus detecting area is displayed. When the main switch $S_M$ is turned on, as an initial value, the flag DISPF to be set for displaying a focus detecting frame is set to "1" and the flag ONSF to be set at a one-shot AF is set to "1", the area value is set to AR11, the focus detecting area value SPAR in a spot area mode is set to AR13 and the other flags are reset.

Then, determination is made in step S104 as to whether the mode switch is turned on or not. When it is on, determination is made in step S105 as to whether the flag SPMF indicative of a spot area mode is set to "1" are not. If the flag is set to "1", SPMF is set to "0" in step S107, the flag DISPF is set to "1" in step S108 and then the program proceeds to step S109. When the spot mode flag is not set to the "1", the value of the flag DISPF is changed in step S106 and then, in step S109, the spot flag SPF is set to "0". As described in the foregoing, display/non-display of the focus detecting frames can be selected only when the mode switch $S_{MOD}$ changed from off to on and the camera is not in the spot area mode. The data of the taking lens is input in step S110, and determination is made in step S111 whether an full open aperture value $AFAV_0$ allowing AF is a predetermined value or more, for example, 6.7 or more. If the full open aperture value $AFAV_0$ is greater than the predetermined value, determination is made as to whether the full open aperture value is greater than a second predetermined value less than the above predetermined value. In this embodiment, determination is made as to whether the taking lens is a catadioptric lens or not (S113). When the taking lens is a catadioptric lens in step S115, the area value AR is set to AR13. It is because that in catadioptric lens, focus condition can not be detected except in area value AR13, that is smallest focus detecting frame.

When the taking lens is not a catadioptric lens, the area value AR is set to AR12 in step S114, the spot flag SPF is set to "1" in step S116 and then, the program proceeds to S117.

The three types of focus detecting frames are displayed because a region in which focus can be detected is automatically determined beforehand according to character of the taking lens 9 set at the camera body.

On the other hand, when the mode switch is not turned on in step S104, the program proceeds directly to step S117 without performing the processings of step S105–S116.

Then, in step S117, determination is made whether the mode switch $S_{MD}$ is turned on or not. If it is turned on, determination is made in step S125 whether the spot switch $S_{SP}$ is turned on or not. More specifically, only when both the mode switch $S_{MD}$ and the spot switch $S_{SP}$ are turned on at the same time, the program proceeds to step S126 wherein the spot mode flag SPMF is set to "1" and then, determination is made in step S127 whether the spot flag SPF is set to "1". When the spot flag is "1", the area value is set to AR13 in step S129 and if the spot flag is not "1", the area value AR is set to SPAR which is a variable indicative of previously set focus detecting area in spot area mode (described later in S124), and then, the flag DISPF is set to "1" in step S130 to return to step S101 again.

On the other hand, when the mode switch $S_{MD}$ is not turned on in step S117, determination is made in step S118 whether the flag SPMF is "1" or not. If the flag is not "1", the program returns to step S109, while the flag is "1", determination is made in step S119 whether the spot switch $S_{SP}$ is turned on or not. When the spot switch $S_{SP}$ is turned on, determination is made in step S120 whether the flag SPF is "1" or not. If the flag is "1", the area value AR is set to AR13 indicative of the smallest focus detecting area in step S123 because full open aperture value of the taking lens 9 is a predetermined value or more and then, the program proceed to step S124. When the spot flag SPF is not "1", the area value cyclically changes as AR13 AR14→AR15→AR16→AR13 in step S112. Then, the area value selected in step S121 is used as an area value AR in step S122, the area value AR is used as the spot area value SPAR in step S124 and then, the program returns to step S101.

As described above, the spot mode is selected only when the mode switch $S_{MD}$ is on and the spot switch $S_{SP}$ is changed from off to on. That is, with the spot mode being set, the camera does not enter a frame-less mode.

With reference to steps S118–S124 and S103–S116 shown in FIGS. 16A and 16B, the four focus detecting areas AR13–AR15 shown in FIG. 21 are switched to AR11–AR13 shown in FIG. 20 in response to a switching of the mode switch $S_{MD}$ from off to on when the camera is in a spot mode. However, the camera does not enter a frame-less mode either in this case.

As described above, in order to select a spot area for focus detection in the present invention requires both the mode switch $S_{MD}$ and the spot switch $S_{SP}$ to be turned on. As a result, mistakes in operating can be avoided. Furthermore, the spot area can be easily switched by throwing the spot switch $S_{SP}$. The switching from the spot mode to the wide mode can be quickly made by throwing the mode switch once.

Figure 17B:
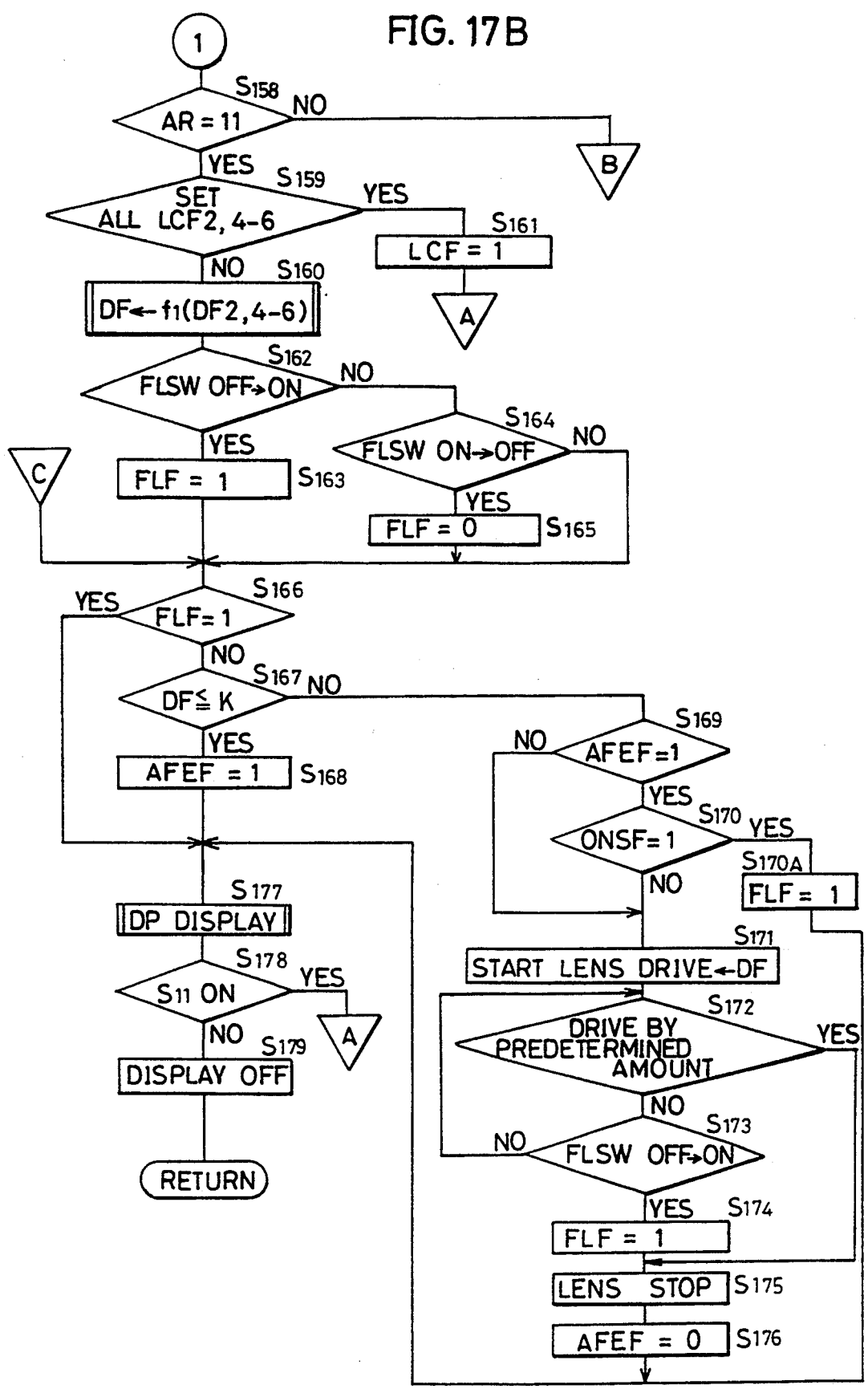

FIGS. 17A–17C are flow charts showing control flows executed at a first stroke of the release button, that is, when the Af starting switch $S_{11}$ is turned on.

A flag is initialized in step S140 upon a turning-on of the switch $S_{11}$. More specifically, a flag FLF to be set at a focus lock, a flag AFEF to be set at in-focus and a flag 1STF to be set after one execution of the control flow determining a defocus amount DF based on the defocus amount DF2 and DF4–6 are set to "0".

Then, the value of the flags ONSF, AFEF, FLF, AR11–AR16, DP2F, DP4F–DP6F, DISPF, LCF and that of flag MCROF are output to the data display circuit. MCROF flag is to be set when a photographing magnification $\beta$ is 1/10 or more, that is, to be set at a micro mode, and an AF area is displayed based on the data thereof. Then, in step S142, an APEX light measurement value $B_V$ is input, based on which value an exposure value EV is determined, and a control F value $F_{NOC}$ is determined based on the value EV.

In step S143, AF data based on a situation of the taking lens is input. In step S144, the distance data D is input based on the information of the taking lens and the focal length data f is input. The photographing magnification $\beta$ ($\beta = f/D$) is calculated based on those data in step S146.

Then, determination is made as to whether the calculated photographing magnification $\beta$ is 1/10 or more. With the photographing magnification being not less than the value, the flag MCROF is set to "1" in step S148 for macro photographing and with the magnification being less than the value, the flag MCROF is set to "0" in step S149 to proceed to step S150. Then, in step S150, the flag LCF indicative of impossibility of focus detection, the flags LCFa–c, LCF4–6 and LCF2 indicative of impossibility of focus detection at the respective focus detecting areas a–c and the focus detecting frames represented as the area values AR12 and AR14–16, are set to "0" and then, focus detection in each focus detecting area is made in step S151.

In step S152, the flags LCFa–c and LCF4–6 are set, which flags indicate a focus detection disable state of an area in which no focus can be detected. A focus detection disable state occurs when a contrast value is small or reliability of distance measurement is low.

In step S153, a large defocus amount DF which is ordinarily too large to take is input for processing as the defocus amounts Dfa–c and DF4–6 of the areas in which no focus detection is possible.

In step S154, a defocus amount DF of an area wherein focus detection is possible is calculated. Then, determination is made in step S155 whether the flags LCFa–c are all set. If so, the program proceeds to step S158 after setting the flag LCF2 indicative of the center focus detecting area to "1" in step S157, but if not, the program proceeds to step S158 after calculating a defocus amount DF2 of the center area based on the defocus amounts Dfa, Dfb and Dfc.

Determination is made in step S158 whether the area value AR is AR11. If the area value AR is AR11, determination is made in step S159 whether the flags CLF2 and LCF4–6 are all set. If these flags are all set, the flag LCF is set to "1" in step S161, and then, the program returns to step S141 wherein the AF area is displayed.

If not all these flags are set in step S159, the program proceeds to step S162 after calculating a defocus amount DF in step S160, which calculation will be described in more detail in the following. Determination is made in step S162 whether the focus lock switch $S_{FL}$ is turned on or not. If it is turned on, the flag FLF is set to "1" in step S163 and then, program proceeds to step S166. On the other hand, when the focus lock switch $S_{FL}$ is not turned on, determination is made in step S164 whether the focus lock switch is switched from on to off. When the focus lock switch $S_{FL}$ is turned off, the flag FLF is set to "0" in step S165, and if it is not turned off, the program directly proceeds to step S166 wherein determination is made whether the flag FLF is "1" or not. If the flag is not "1", determination is made in step S167 whether the defocus amount DF is equal to or less than a predetermined value K. If the defocus amount is equal to or less than the predetermined value K, the flag AFEF is set to "1" in step S168.

On the other hand, when the defocus amount DF is more than the predetermined value K, determination is made in step S169 whether the flag AFEF is "1" or not. If the flag is "1", determination is made in step S170 whether the flag ONSF is "1". If this flag is not "1", lens drive based on the defocus amount DF is started in step S171.

Then, determination is made in step S172 whether the lens has been driven by a predetermined amount. If it has not been driven, determination is made in step S173 whether the focus lock switch $S_{FL}$ is turned on. If the switch is not turned on, the program returns to step S172, while the switch is turned on, the flag FLF is set to "1" in step S174, and the program proceeds to step S175 wherein the lens drive is stopped.

On the other hand, when the lens has been driven by a predetermined amount in step S172, the program proceeds to step S175 wherein the lens drive is stopped and then, the flag AFEF is set to "0" in step S176 and the program proceeds to step S177. In a case where the flag ONSF is "1" in step S170, the flag FLF is similarly set to "1" in step S170A and the program proceeds to step S177.

After displaying a focus detecting frame wherein the object is within a depth of field in step S177, determination is made in step S178 whether the switch $S_{11}$ is turned on. If the switch $S_{11}$ is turned on, the program returns to step S141 wherein the above-described operation is repeated, while if the switch $S_{11}$ is not turned on, the program returns after turning off the display in the finder (step S179).

When the area value AR is not AR11 in step S158, the program proceeds to step S180 wherein determination is made whether the area value AR is AR12 or not. If it is not AR12, determination of the area is made in step S181.

When the determination is made that the area value is AR13, determination is made in step S182 whether the flag LCFc indicative of impossibility of focus detection is "1". If the flag is "1", the flag LCF is set to "1" in step S192 and then, the program returns to step S141. If the flag LCFc is not "1", DF3 is adopted as a defocus amount DF in step S183 and the program proceeds to step S166.

When the determination is made that the area is AR14, determination is made in step S184 whether the flag LCF4 is "1". If the flag is "1", the program similarly proceeds to step S141 through step S192. If the flag is not "1", DF4 is adopted as a defocus amount DF in step S185 and the program proceeds to step S166.

When the determination is made that the area is AR15, determination is made in step S186 whether the flag LCF5 is "1". If the flag is "1", the program similarly proceeds to step S141 through step S192. If the flag is not "1", DF15 is adopted as a defocus amount DF in step S187 and the program proceeds to S166.

When the determination is made that the area is AR16, determination is made in step S188 whether the flag LCF6 is "1". When the flag is "1", the program similarly proceeds to step S141 through step S192. If the flag is not "1", DF16 is adopted as a defocus amount DF and the program proceeds to step S166.

In a case where the area value AR is AR12 in step S180, determination is made in step S190 whether the flag LCF2 is "1". If the flag is "1", the program proceeds to step S141 through step S192. If the flag is not "1", DF2 is adopted as a defocus amount DF in step S191 and the program proceeds to S166.

Figure 18A:
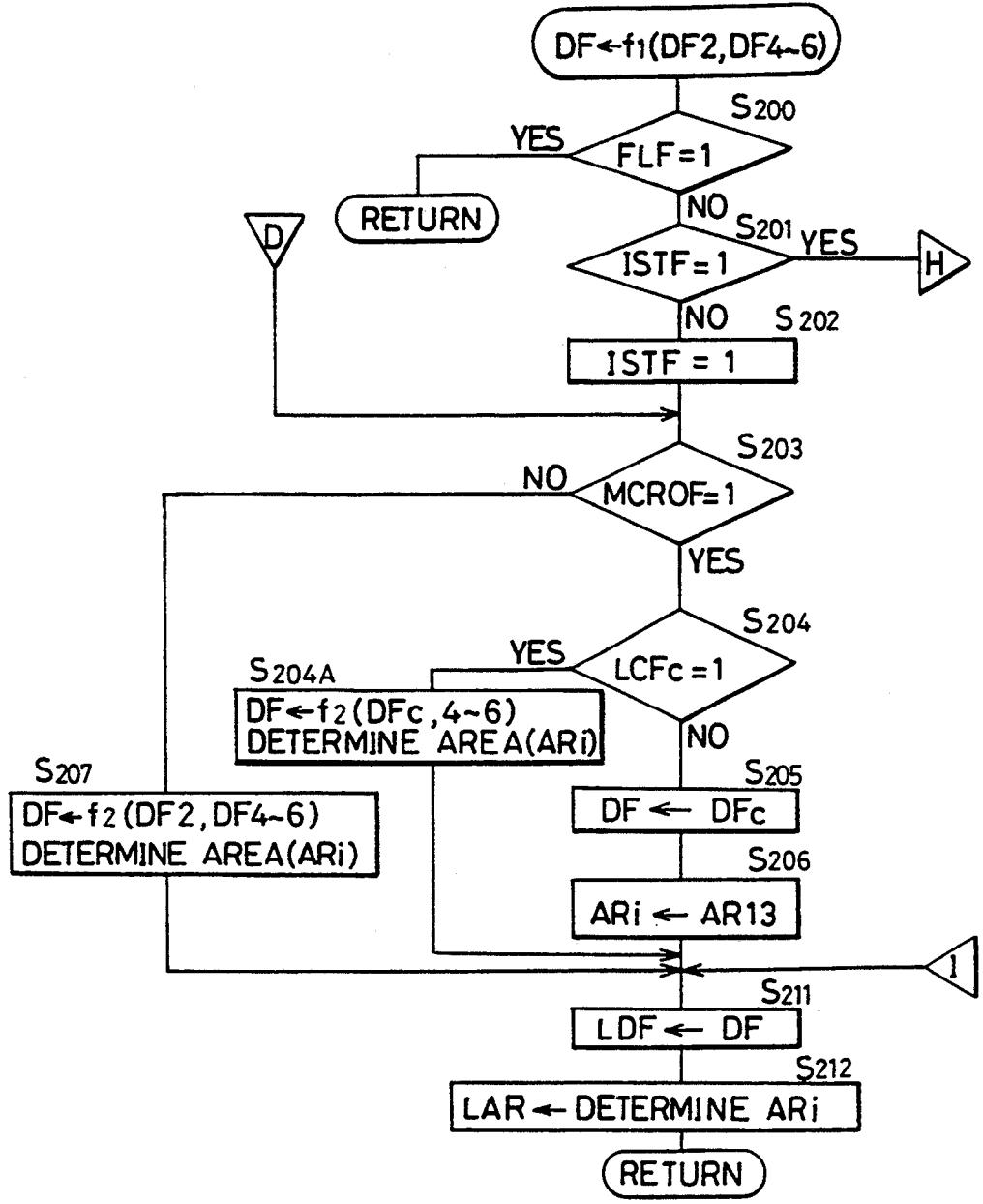
FIGS. 18A and 18B are flow charts showing the specific contents of determining a defocus amount in the steps of FIG. 17B.
Figure 18B:
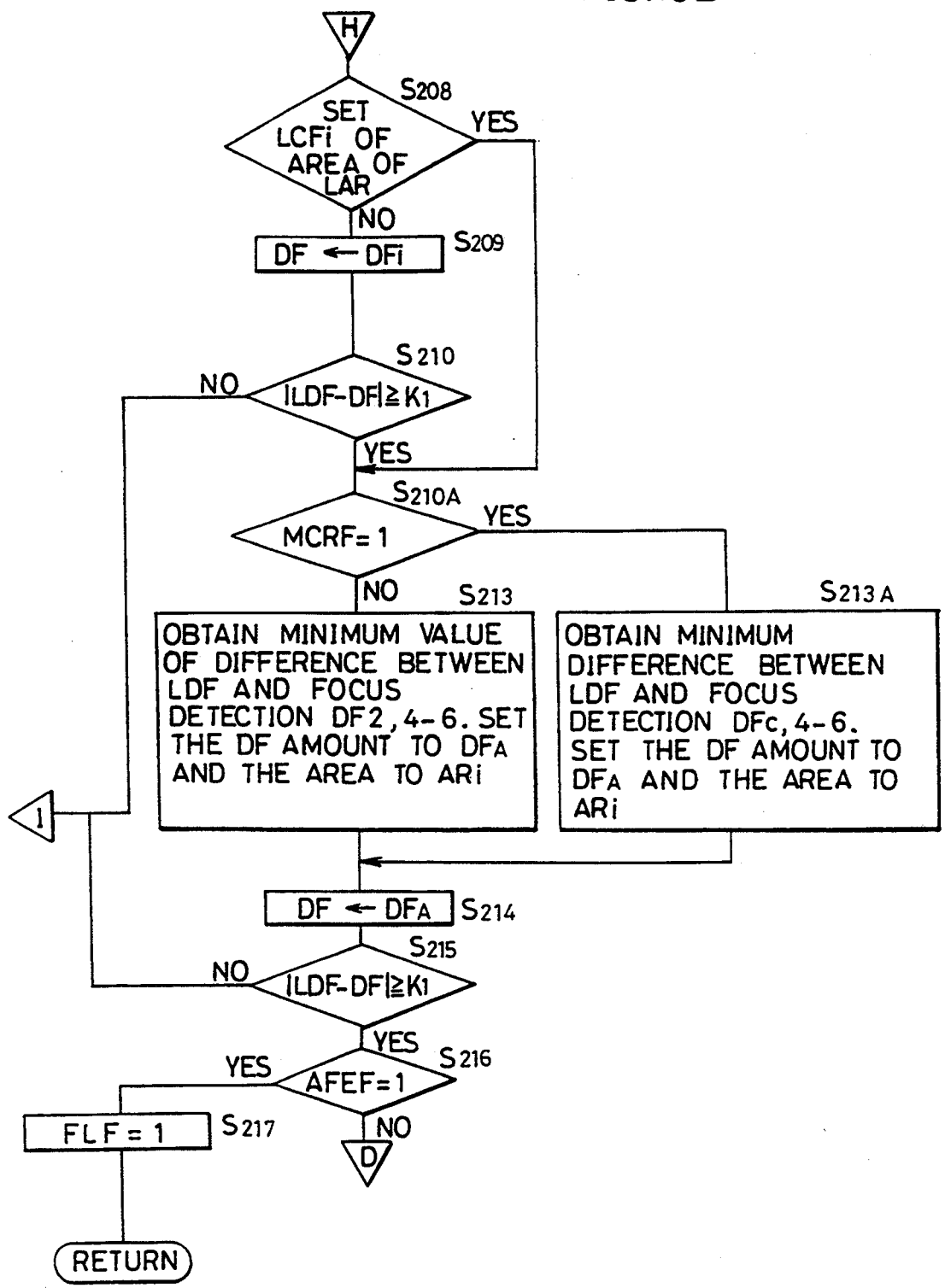

FIGS. 18A and 18B are flow charts showing the specific contents for determining a defocus amount DF in step S160 of FIG. 17B.

In the drawings, determination is made in step S200 whether the flag FLF is "1". If the flag is "1", the program returns, while if the flag is not "1", determination is made in step S201 whether the flag 1STF which is set when this flow chart is carried out one time is "1". If the flag is not "1", the flag is set to "1" in step S202 and determination is made in step S203 whether the flag MCROF is "1", which flag indicates whether the photographing mode is a macro mode or not. If the flag is "1", determination is made in step S204 whether the flag LCFc is "1". If it is not "1", DFc is adopted as a defocus amount DF in step S205 and the area value AR13 is adopted as an area value ARi in step S206.

In a case where the flag MCROF is not "1" in step S203, the data of the focus detecting area wherein focus detection is not possible is eliminated, and then, an area value ARi is determined so as to set the camera in an in-focus state based on, for example, a focus detecting area at a closest point or an area having the smallest defocus amount DF at the present time in step 207. When the determination is made that the flag LCFc is "1" in step S204, the program proceed to S204A wherein an area value ARi is determined in the same manner as in step S207.

In step S211, the defocus amount DF obtained in step S207 is adopted as a defocus amount LDF and in step S212 the focus detecting area value ARi is adopted as a value LAR indicative of determined focus detecting area and the program returns.

In case that the photographing mode is macro mode, (that is YES in step S203), the focus detecting frames indicative of both area value AR11 set as area value AR and ARi wherein focus detection is made in practice in macro mode, are displayed in the finder. For example, when AR13 is adopted as an area value ARi in step S206, displays such as shown in FIG. 22N are made. When the other area value than AR13 is determined as area value ARi in step S204A, the focus detecting frame corresponding to the determined area value is displayed besides the focus detecting frame for area value AR11 in the finder.

In a case where the flag 1STF is "1" in step S201, determination is made in step S208 whether flag LCF of determined focus detecting area LAR is set or not. If it is not set, the defocus amount DF is set to a defocus amount DFi of a certain focus detecting area in step S209 and determination is made whether the absolute value of the difference between the defocus amount LDF determined and the defocus amount DF is equal to or more than a predetermined value $K_1$ in step 210. The predetermined value $K_1$ is greater than the predetermined value K used in step S167 of FIG. 17B. If the absolute value is less than the predetermined value $K_1$, the program proceeds to S211, while it is equal to or more than the predetermined value $K_1$, the program proceeds to S210A wherein determination is made whether the flag MCROF is "1". If the flag MCROF is not "1" in S210A, the program proceeds to step S213 wherein a minimum value of a difference between LDF and the defocus amount DF2, DF4, DF5 or DF6 for focus detection is obtained. The defocus amount DF is adopted as $DF_A$ and the corresponding focus detecting area is adopted as ARi. Then, $DF_A$ is adopted as a defocus amount DF in step S214 and determination is made in step S215 whether the absolute value of the difference between LDF and DF is equal to or more than predetermined value $K_1$. If the absolute value does not exceed the predetermined value $K_1$, the program proceeds to S211, while if it is more than or equal to the predetermined value $K_1$, determination is made in step S216 whether the flag AFEF is "1". When the flag is "1", the flag FLF is set to "1" (S217) and the program returns, while if the flag is not "1", the program proceed to step S203.

When the MCORF is "1" in step S210A, the program proceeds to S213A wherein the defocus amount $DF_A$ is obtained in the same manner as in step S213, and the program proceed to step S214.

FIG. 19 is a flow chart showing the specific contents of the routine for displaying a focus detecting area within a depth of field in step S117 of FIG. 177B.

First, determination is made in step S220 whether the flag FLF is "1". If the flag is not "1", the flag FLIF is set to "0" in step S234 and the program returns. If the flag FLF is "1", the flag DISPF is set to "0" in step S220A and determination is made in step S221 whether the flag FLIF is "1". If the flag is not "1", the flag FLIF is set to "1" in step S222 and then, the buzzer gives a warning sound for 0.2-0.3 seconds, for example, in step S223. If the flag FLIF is "1" in step S221, the buzzer gives no warning sound and the program directly proceeds to step S224.

A depth of field DP is obtained based on a focal length f and a controlling aperture value $F_{NOC}$ in step S224. After setting the depth of field flags DP2F and DPF4-6F of the respective areas to "0" in step S225, determination is made in step S226 whether the defocus amount DF2 of the area 2 is equal to or less than ½ of the depth of field DP. When it is equal to or less than ½ of the depth of field, the flag DP2F is set to 1 in step S227 and then, the program proceeds to step S228, while if the DF2 is not within ½ of depth of field, the program directly proceeds to step S228.

Determination is made in steps S228, S230, and S232 whether defocus amounts of the focus detecting area 4, 5 and 6 are within ½ of the depth of field. Then, when the defocus amount is within ½ of the depth of field, the corresponding flag is similarly set to 1 and the program returns.

As described above, the second embodiment of the present invention has the following effects. It is a common practice for a photographer using a camera having a plurality of changeable spot focus detecting areas to select an area among said plurality of areas prior to a start of each photographing operation. According to the present embodiment, however, the area used the last time is automatically selected at the time of AF photographing using the spot focus detecting areas, resulting ion that an area frequently used by the photographer is selected in advance without an additional manual operation, thereby reducing a time period required for selecting an area prior to a start of the photographing to prevent the photographer from missing shutter chance.

Additionally, determination requires considerable skill and experience as to whether an object except that at the in-focus condition is focused on or not. The arrangement of the present embodiment, however, allows even a beginner to easily determine whether the other object than that at the in-focus condition is included in an in-focus condition or not because display is made indicating the object which is within depth of field. Furthermore, since the above-described display is made at the same position as the focus detecting frame including the object within the depth of field, it is easy to acknowledge the object at the in-focus condition. Furthermore, the focus condition of the object in each focus detecting frame is continuously detected even after the focusing condition is locked by an operation of the switch $S_{FL}$ or the like, and the detection result is displayed in the finder to allow the photographer to continuously acknowledge the in-focus condition of the object.

Furthermore, in the present embodiment, while the display of each focus detecting frame is turned off at the focus lock, this arrangement allows the photographer to acknowledge an end of repeatedly performed AF operation, that is, the focus lock. After the end of AF operation, unnecessary focus detecting frame is turned off and therefore, the display in the finder is unlikely to hinder the photographer in determining composition.

At the macro photographing with a large photographing magnification, a small difference in distance to an object results in an increased defocus amount, which makes a determination of a main object of the camera difficult. According to the present embodiment, the camera automatically detects such photographing state that is different from ordinary photographing state to change a focus detecting area for accurate focus detection as well as display indicating that the camera is in a macro photographing state, which can be easily acknowledged by the photographer to accurately know the photographing state at all times.

(3) Third Embodiment

A third embodiment of the present invention will be described in the following. The basic structure of the camera body according to the third embodiment is the same as those of the first and second embodiments. In this embodiment, by means of LCD2, displays indicative of contents of the following described various functions are made besides that indicative of focus detecting area, therefore those are displayed in the finder with super-imposed inside of a frame delineating a field of view. The focus detecting area in the third embodiment are also arranged as shown in FIG. 13.

Figure 23:
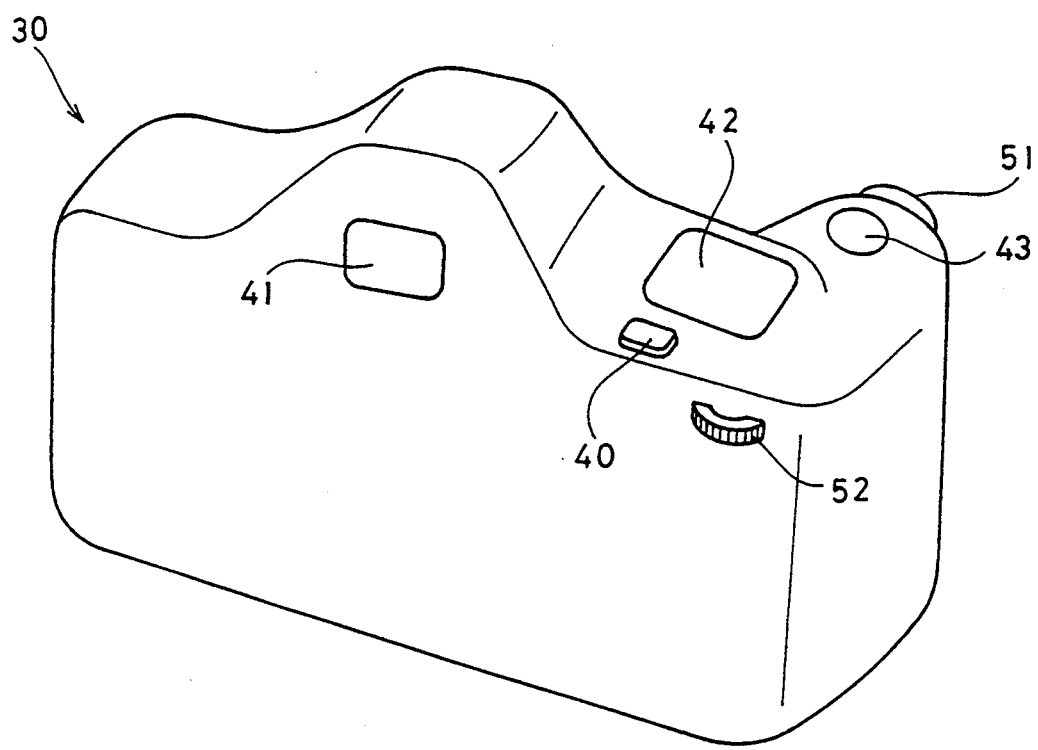
FIG. 23 is an outer view seen from the rear side of the camera 30.

FIG. 23 is an outer view seen from the rear side of a camera 30. The configuration of the camera body 30 is applicable to the first and the second embodiments. A finder 41 is provided at an appropriate position of the rear part of the camera 30. As described above, the contents of focus detecting areas and various functions are displayed in the finder 41. Some of the contents of the functions are also displayed in an on-body display portion 42 comprising LCD or the like provided at an appropriate position of the upper part of the camera 30. 43 denotes a shutter button, pressing of which starts photographing. A first stroke of the shutter button 43 turns on a photographing preparation switch 49 which will be described later and a second stroke thereof starts exposure.

The camera body 30 is further provided with a function button 40 which selects various functions such as exposure compensation "±", AF areas, film sensitivity compensation ISO and single/continuous photographing drive. In the present embodiment, the above-described four functions are divided into two groups. The first group includes the exposure compensation "±" and AF areas and the second group includes the film sensitivity compensation ISO and the single/continuous photographing drive. The two groups are alternately selected at every press of the function button 40.

Rightward and leftward rotatable front up-down dial 51 is provided at the front side of the camera 30, which dial is used for changing the function contents of the exposure compensation "±" and the film sensitivity compensation ISO. Rightward and leftward rotatable rear up-down dial 52 is provided at the rear side of the camera 30, which dial is used for changing the function contents of the AF areas and single/continuous photographing drine. A focus mode switch (not shown) is provided at the front side of the camera 30. The focus mode switch serves for switching between AF mode and FA (focus aid) mode.

Figure 24:
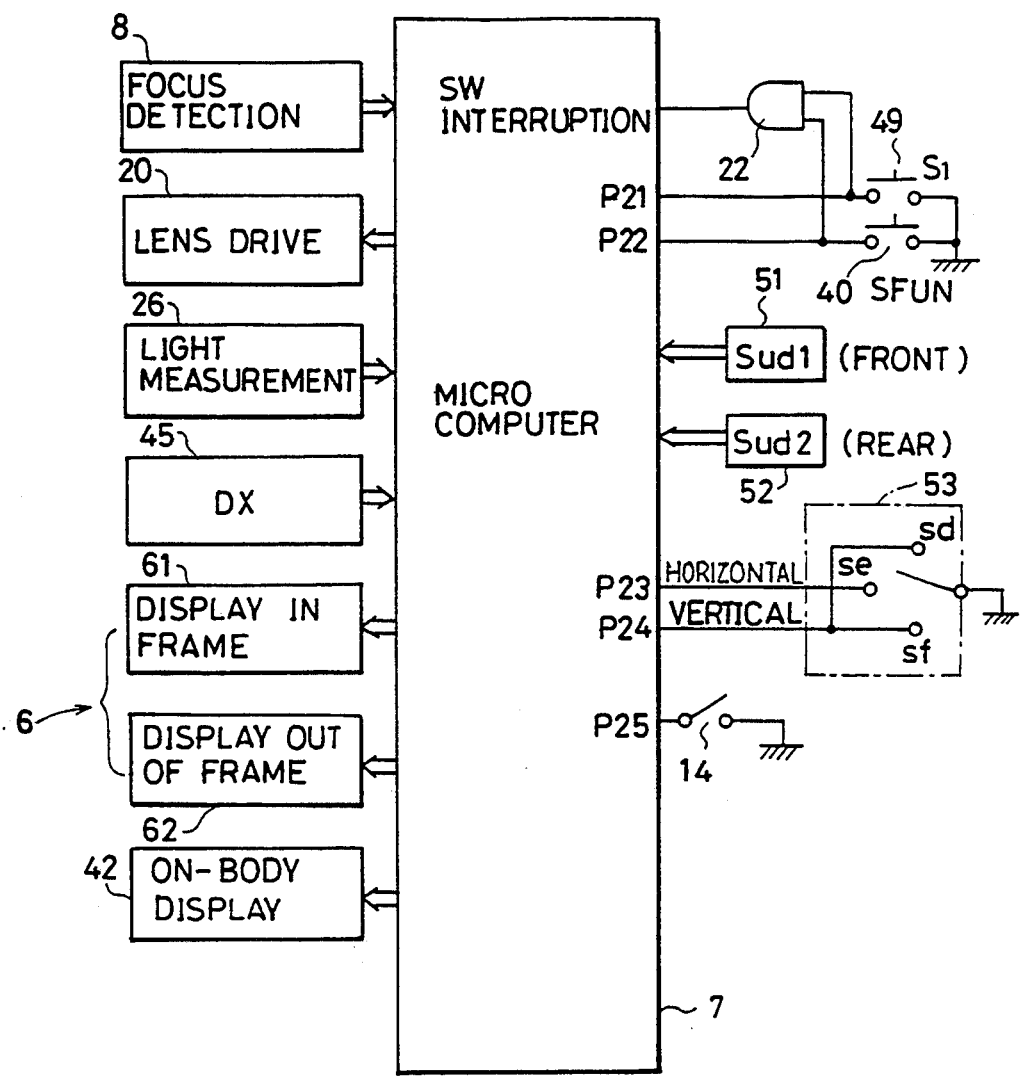
FIG. 24 is a block diagram showing a control system of the camera according to the present invention.

FIG. 24 is a block diagram showing the control system of the camera according to the third embodiment of the present invention and corresponds to FIGS. 5 and 15 of the first and the second embodiments, respectively. The same portions as those of the previous embodiments are given the same reference numerals, of which no description is made.

A DX sensor 45 reads a film sensitivity recorded on a loaded film (not shown). A LCD driving circuit 6 operates for displaying the area and a necessary function and the contents thereof in the finder area and includes an inside frame display driving circuit 61 for controlling a display displayed inside of in a frame wherein an object is to be displayed in the finder area, and an out-of-frame display driving circuit 62 for controlling a display at an appropriate position in the periphery outside of the frame wherein the object is to be displayed. 47 denotes an on-body display portion activating an on-body display portion 42 to make a display.

An AND gate 42 receives an interruption signal and the opposite input ends thereof are pulled up at a high level potential by terminals P21 and P22 of CPU 7. When the photographing preparation switch 49 or the function button 40 is turned on, CPU 7 receives a low level potential via AND gate thereby acknowledging interruption. The CPU 7 can make a determination whether the interruption comes from the terminal P21 or P22 based on the level changes thereof. The front up-down dial 51 and the rear up-down 52 output a signal corresponding to a rotating direction to the CPU 7.

Figure 25:
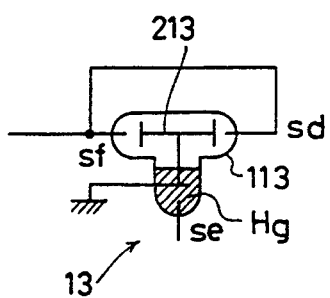
FIG. 25 is a diagram of an arrangement showing one example of a situation sensor.

A situation sensor 53 is attached to an appropriate position of the camera body 30 for sensing that the camera 30 is held its longitudinal side vertical to or in parallel with a horizontal direction, which sensor is the same as that of the first embodiment shown in FIG. 9 and one example of the arrangement thereof is shown in FIG. 25.

FIG. 25 shows a horizontally positioned camera 30 wherein a quasi T-shaped sealed container 113 is filled with conductive fluid such as adequate mercury Hz or the like. Terminals $S_d$–$S_f$ are provided at the respective end portions of the T-shape. A common wiring 213 is provided in the container, slightly spaced apart from the respective terminals $S_d$–$S_f$. As can be seen from the drawing, the terminal $S_a$ and the common wiring 213 conduct via mercury Hg. As a result, the terminal $S_a$ is grounded, thereby sensing that the camera 30 is held horizontally (lateral situation). A lead line connects the terminals $S_d$ and $S_f$, which enables detection of a vertical situation of the camera 30 irrespective of rightward and leftward rotations of the camera. That is, back to FIG. 24, the potentials at the terminals P23 and P24 of the CPU 7 are pulled up to a "H" level. When the camera 30 is horizontally held, the potential at the terminal P23 drops to a low level and when it is vertically held, the potential at the terminal P24 drops to a low level. The CPU 7 distinguishes a terminal which potential drops to a low level to detect the situation of the camera 30. A focus mode switch 14 is connected to the CPU 7 through a terminal P25.

Figure 26:
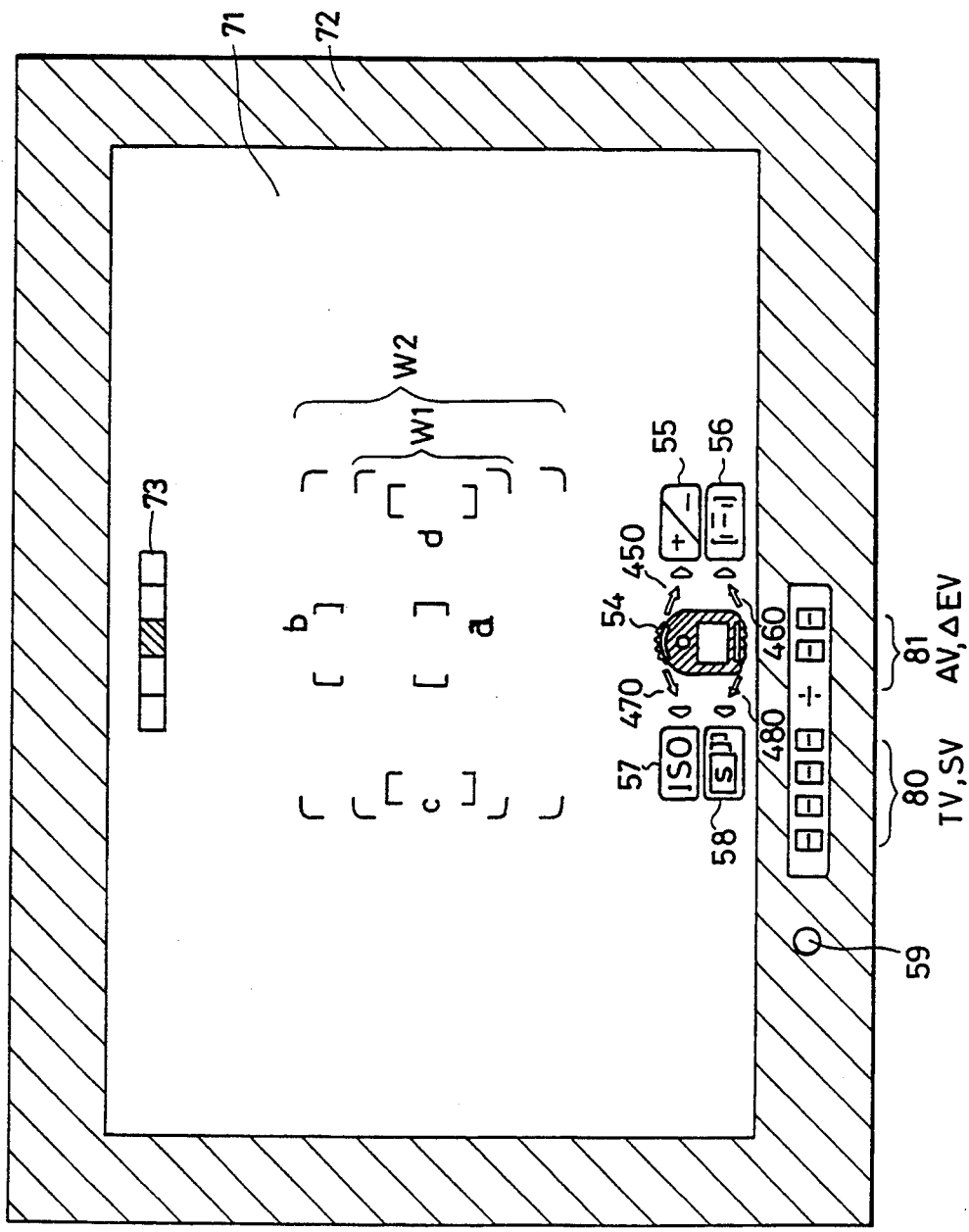
FIG. 26 is a diagram showing the display contents displayed on a LCD 24, that is, showing a state wherein all the display contents to be displayed in the finder area are displayed.

FIG. 26 is a diagram showing a state wherein the display contents of the LCD 2, that is, all the display contents in the finder area (lightened). In the drawing, the inner white portion is an inside frame display portion 71, display of which is driven by the inside frame display driving circuit 61. The surrounding portion with oblique lines is an out-of-frame display portion 72, display of which is driven by the out-of-frame display driving circuit 62.

In the inside frame display portion 71, an upper FA meter display portion 73 is used for focus aid. The FA meter display portion 73 includes five bar displays, the center position of which indicates an in-focus condition as shown in the drawing. The left-side bars indicate a rear focus condition and the right-side bars indicate a front focus condition. FIG. 26 shows an in-focus condition, for example.

Respective areas a, b, c and d in the center portion are marked at the positions corresponding to the focus detecting area A–D of the second embodiment shown in FIG. 13 and the respective areas display designated focus detecting areas. A wide area $W_1$ includes the areas a, c, and d and is marked with display at the four corners and is symmetrical in both vertical and horizontal directions. A wide area $W_2$ includes all the areas a, b, c and d and is marked with display at the four corners, which is symmetrical only in the horizontal direction.

A dial mark 54 at the lower portion of the inside frame display portion 71 is a schematization of the front up-down dial 51 and the rear up-down dial 52. The upper portion of 54 corresponds to the front up-down dial 51 and the lower portion thereof corresponds to the rear-up down dial 52. Displayed at the right side of the dial mark 54 are a "±" mark 55 and an AF mark 56 indicative of the functions of exposure compensation "±" and an AF area, respectively, and displayed at the left side are an ISO mark 57 and a S/C mark 58 indicative of functions of film sensitivity compensation ISO and single/continuous photographing drive, respectively. Displayed correspondingly between the dial mark 54 and the respective marks 55–58 are selection marks 450, 460, 470, 480 indicative of a selection state.

The out-of-frame display portion 72 includes, from the left of the drawing, an in-focus indicator 59 lightening at an in-focus condition, a four-digit display portion 80 displaying a shutter speed TV and a film sensitivity value SV and a two-digit display portion 81 displaying an aperture value AV and an exposure compensation amount ΔEV. The two-digit display portion 80 displays + or − indicative of a compensation direction. The four-digit display portion 80 and the two-digit display 81 are not limited to display four digits and two digits, respectively, but a desired number of digits can be set.

Figure 27:
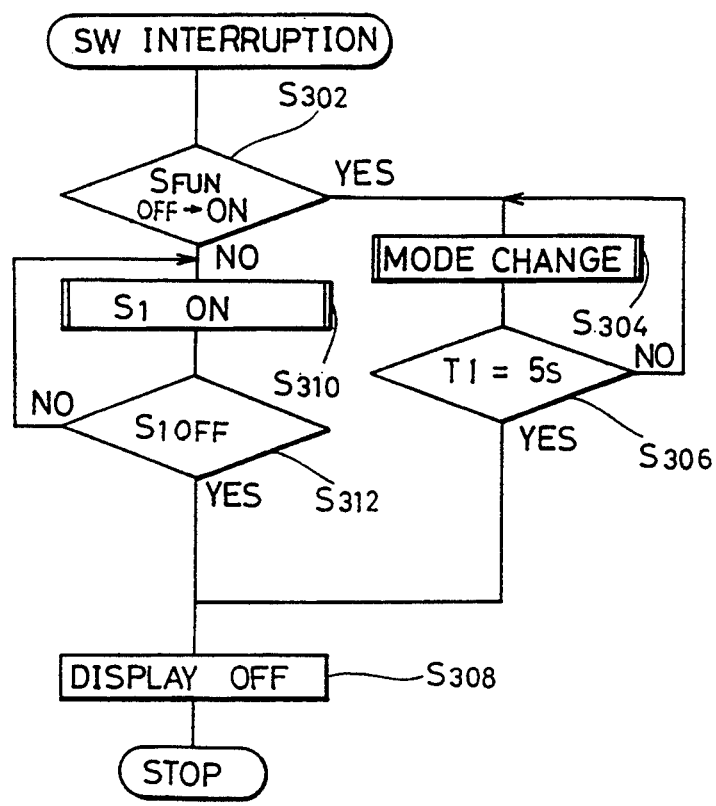

FIG. 27 is a flow chart explaining an interrupting operation when either the photographing preparation switch 49 or the function button 40 is turned on.

When either the photographing preparation switch 49 (represented as $S_1$ in the flow chart) or the function button 40 (represented as $S_{FUN}$ in the flow chart) is turned on, determination is first made whether the function button 40 is switched from off to on (step S302). Determination can be made on which is turned on.

Figure 28B:
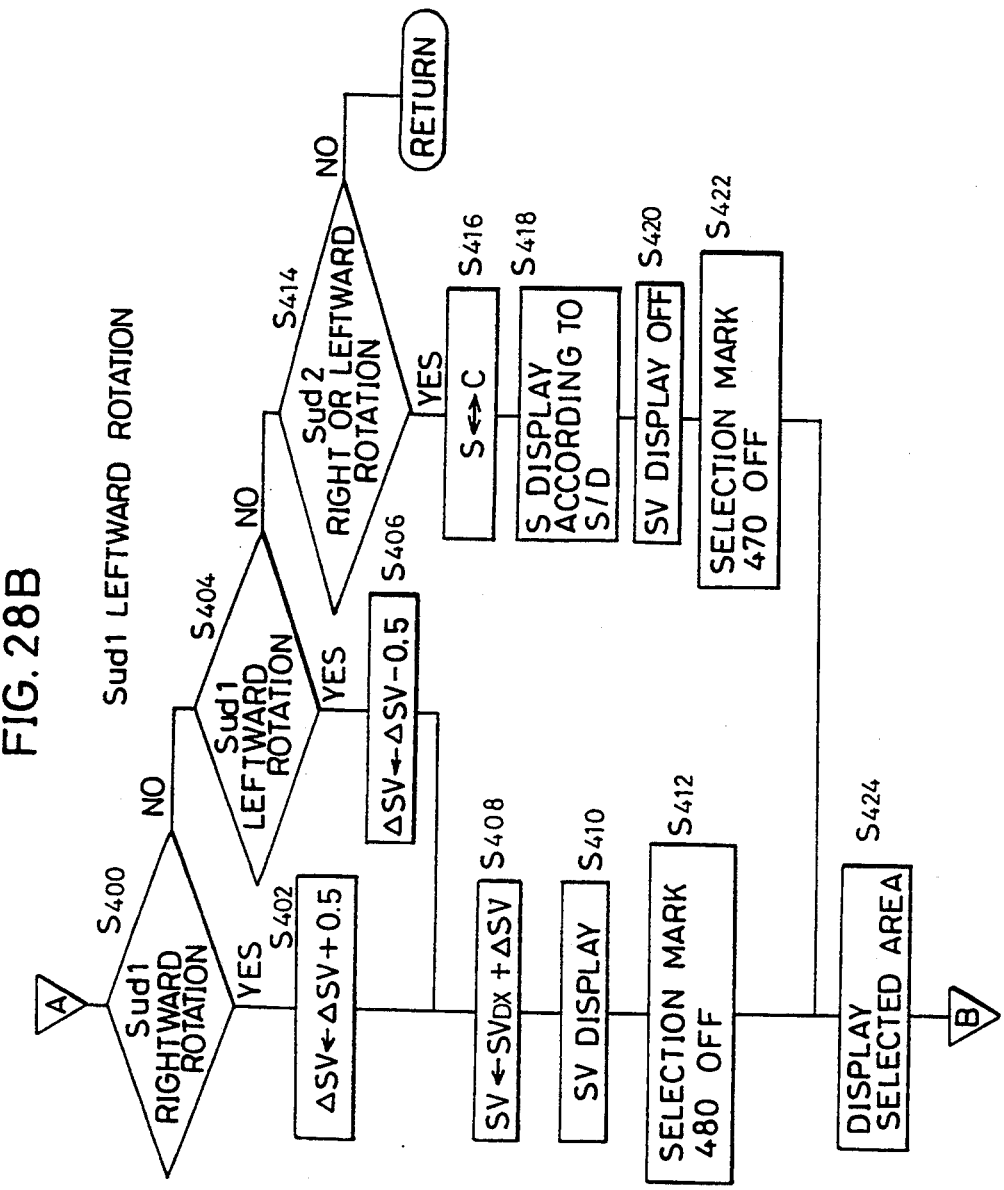

When the determination is made that the function button 40 is switched from off to on (YES in step S302), the processing for changing a mode shown in FIGS. 28A and 28B is executed (step S304). After a lapse of five seconds after the predetermined processing (YES in S306), the processing contents displayed in the finder area is turned off (step S308). When the determination is made that the photographing preparation switch 49 is switched from off to on (NO in step S302), the processing is executed shown in FIG. 36, which processing is to be performed at the turning-on of the photographing preparation switch 49 (step S310). At this time, if the photographing preparation switch 49 is turned off (YES in step S312), the display contents is turned off in step S308.

FIGS. 28A and 28B are flow charts explaining operational procedure for changing a mode when the function button 40 is switched from off to on. The operation procedure for a mode change will be described in the following with reference FIGS. 29–35.

In the drawings, a mode I denotes a selection of the above-described first group including the exposure compensation "±" and the AF area and a mode II denotes a selection of the above-described second group including the film sensitivity compensation ISO and the single/continuous photographing drive.

First, determination is made in step S320 whether the first mode flag MIF is "1", thereby determining whether the function button 40 is in the initial routine after the turning-on thereof.

If it is initial routine (NO in step S320), determination is made in step S322 whether the previously selected mode is I or II. More specifically, if the mode II is selected at a setting operation at the previous interruption when the function button 40 is turned on (mode II in step S322), the mode flag is changed to the mode I in step S324 for setting the mode I at an interruption at this time. Conversely, if the mode I is selected at the setting operation at the previous interruption (mode I in step S322), the mode flag is changed to the mode II in step S334 for setting the mode II at an interruption at this time.

As described above, a function mode is switched to another mode and set at every interruption by a turning-on of the function button 40. In other words, a function mode is cyclically changed.

Figure 29:
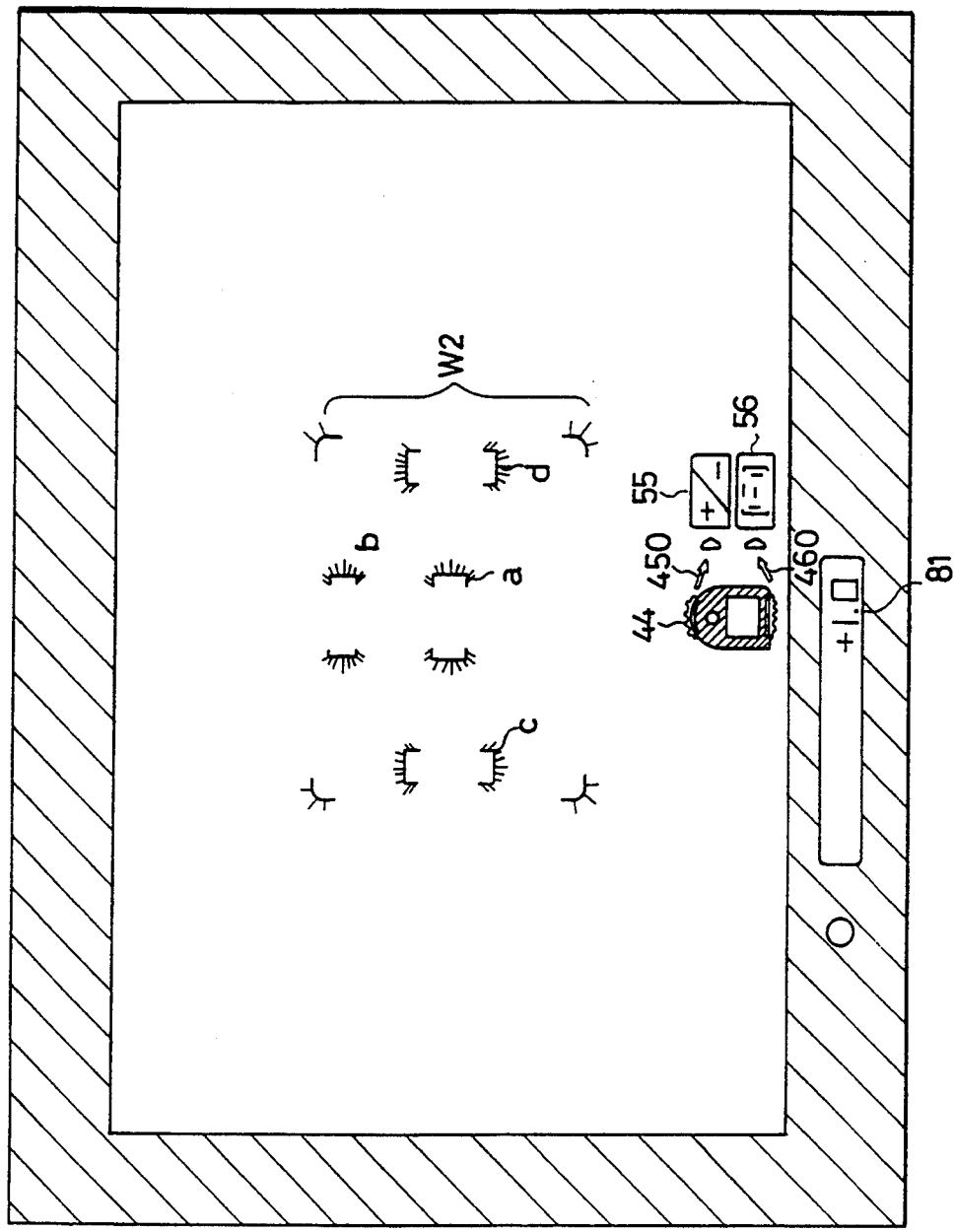
FIGS. 29-35 are diagrams showing states of displays in the finder image area at the respective steps of FIG. 28.
Figure 30:
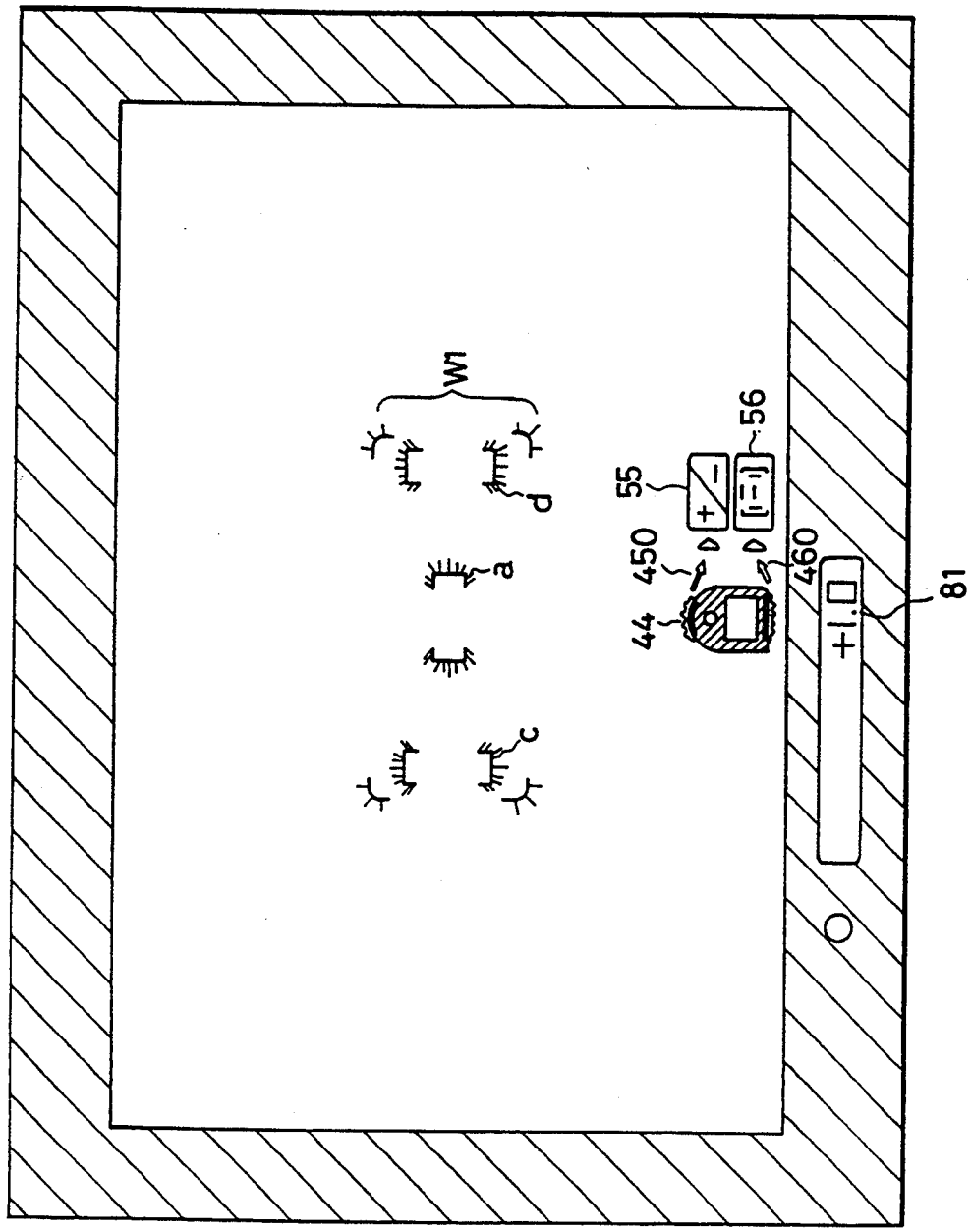

When the mode is changed to the mode I, the inside frame display portion 71 and the out-of-frame display portion 72 display the contents and the marks related to the exposure compensation "±" and the AF area which can be set in the mode I, as shown in FIGS. 29 and 30. Some of the display contents and the marks indicating the contents of the setting in the previous mode I are displayed also at this time, which makes confirmation of the previous setting contents and eliminates a necessity of setting the same contents as the former contents if the determination is made that no modification of the setting contents is required, as will be described later, resulting in a smooth operation of the camera.

In this example, the two-digit display portion 81 displays the previous exposure compensation amount ΔEV as an APEX value of 1.0, for example (step S326). Then, the situation sensor 53 senses the present situation of the camera. When the camera 30 is held horizontally (NO in step S328), the respective marks of the focus detecting area a, b, c and d and the wide area $W_2$ which can be selected at a horizontal situation displayed with blinking to indicate that they can be selected as shown in FIG. 29 (step S330). On the other hand, when the camera 30 is held vertically (YES in step S328), the respective marks of the focus detecting area a, c and d and the wide area $W_1$ which can be selected at a vertical situation displayed with blinking to indicate that they can be selected as shown in FIG. 30 (step S332). Subsequently, the dial mark 54, the "±" mark 55 and the AF mark 55 indicative of functions in the mode I and the selection marks 450 and 460 thereof are displayed and the other displays are off (steps S342 and S344). Thereafter, the first mode flag MIF is set to "1" and furthermore, said built-in timer is reset to start counting five seconds (steps S346 and S348). The program returns to step S306 of FIG. 27.

Figure 31:
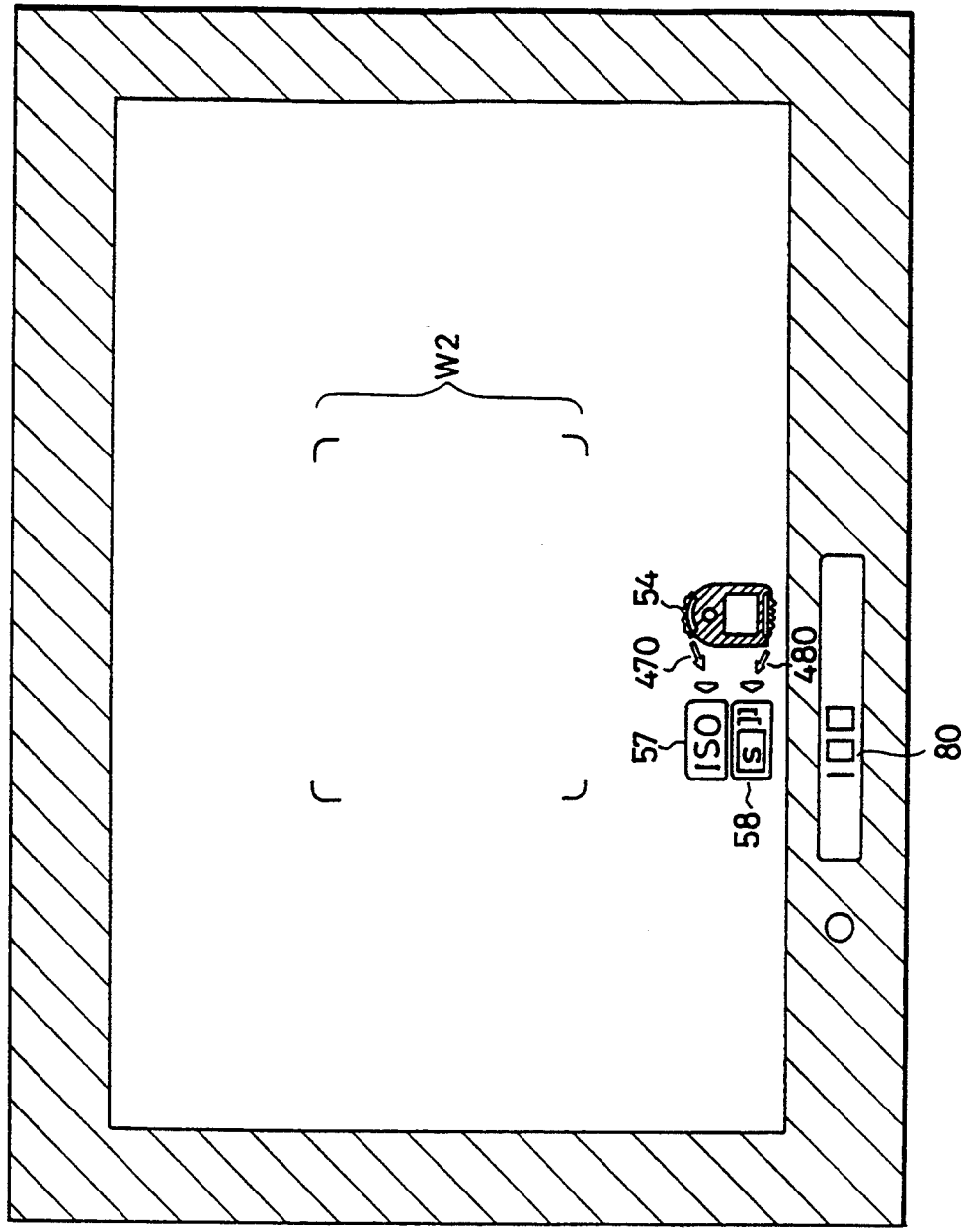

When the mode is changed to the mode II in step S334, successively the inside frame display portion 71 and the out-of-frame display portion 72 display the contents and the masks related to a film sensitivity ISO and single/continuous photographing drive which functions can be set in the mode II as shown in FIG. 31. More specifically, first, the four-digit display portion 80 displays 100, for example, as the previous film sensitivity SV (step S336) and then, displays the contents of the previous single/continuous photographing drive (step S338). In the case of FIG. 31, the character "S" indicative of single photographing drive is displayed in the S/C mark 58. The area selected at present (in the previous mode I) is displayed (step S340). It can be seen from FIG. 31 that the wide area W2 is selected. Displayed in step S342 are the dial mark 54, the ISO mark 57, the S/C mark 58 and the selection marks 470 and 480 thereof of the mode II.

Like the previous case, the program returns to step S306 of FIG. 27 after the turning-off of the other displays (the setting of the first mode flag MIF to "1" and the start of a reset of the built-in timer (steps S344–S348).

In step S306, if the setting operation of the function contents is started before an elapse of five seconds, the flow for changing a mode (step S304) continues.

As described above, when the inside frame display portion 61 and the out-of-frame display portion 62 of the finder display the previous setting contents, the program returns to step S320 wherein determination is made of a state of the first mode flag MIF. In this case, that is, in the routine after the initial one, with the first mode flag MIF being set to "1" (YES in step S320), the program proceeds to step S350 wherein determination is made whether the mode I is selected.

Figure 32:
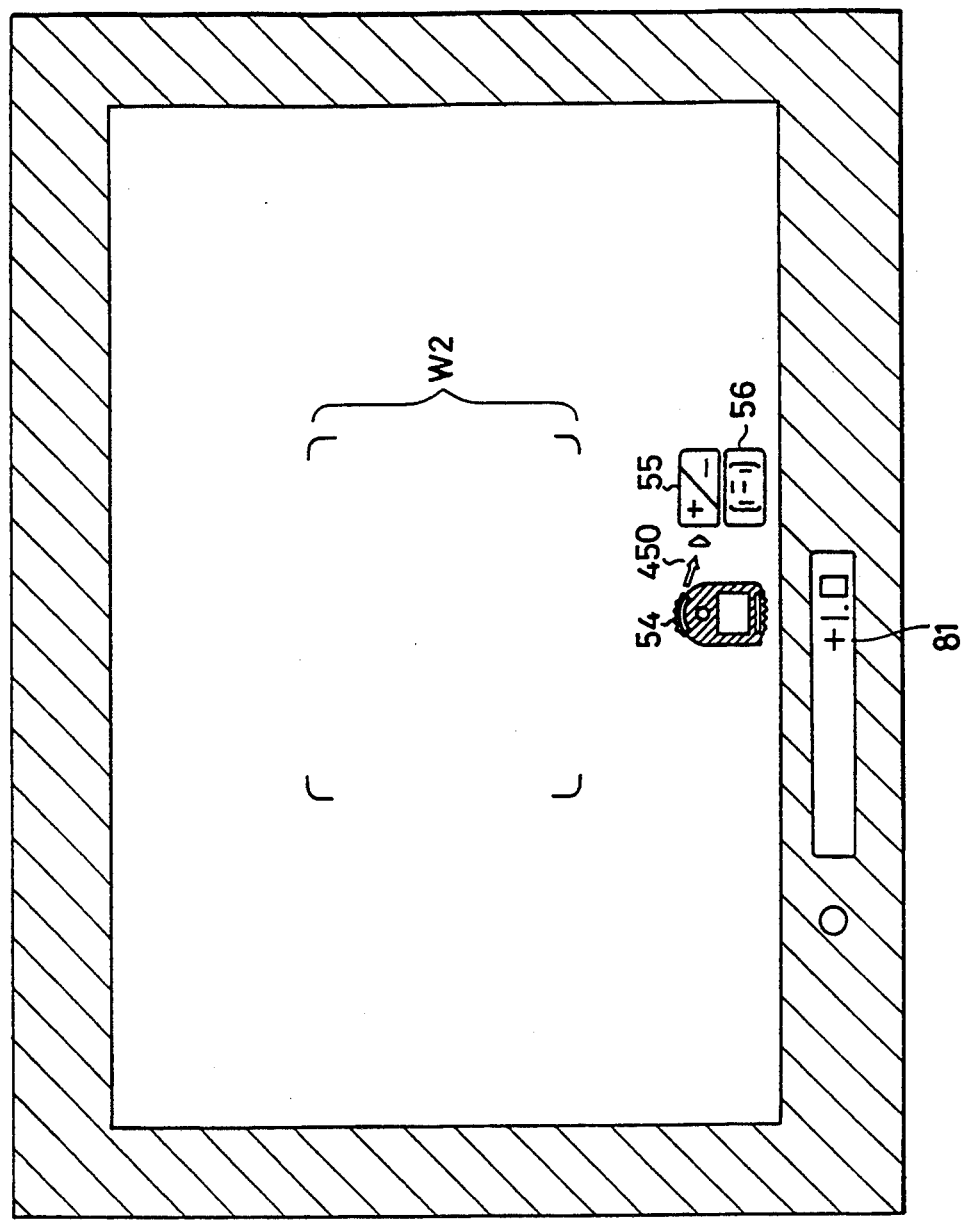

When the mode I is selected, determination is first made of a rotation of the front up-down dial 51 (represented as $Sud_1$ in the flow chart) (in steps S352 and S356, see FIG. 32). More specifically, when the front up-down dial 51 rotates rightward (YES in step S352), an APEX value 0.5 is added to the exposure compensation amount ΔEV. The addition result is displayed in an APEX value of 1.0, for example, in the two-digit display portion 81 (steps S354 and S360). At this time, the already selected area (as will be described later, the area set when the rear up-down dial 52 is first operated after the first mode flag is set to "1" or the area set in the mode I at the previous interruption) is displayed (in the case of FIG. 32, the wide area W2 is selected). At the same time, the display of the selection mark 460 is turned off in order to indicate that the AF areas is not in setting at present. On the other hand, when the front up-down dial 51 is rotated leftward (NO in step S352 and YES in step S356), 0.5 as an APEX value is subtracted from the exposure compensation amount ΔEV and the subtraction result is displayed in an APEX value of 1.0, for example (steps S358 and S360).

Then, when the front up-down dial 51 is rotated neither in right nor left direction, determination is made of a rotation of the rear up-down dial 52 (represented as Sud2 in the flow chart) (NO in both steps S352 and S356 and steps S366 and S370). Selection of an area of the inside frame display portion 71 corresponding to a focus detecting area is forwardly or backwardly made cyclically every time the rear up-down dial 52 is rotated rightward (YES in step S366) or leftward (NO in step S366, YES in step S370) (steps S368 and S372, see FIG. 33).

Figure 33:
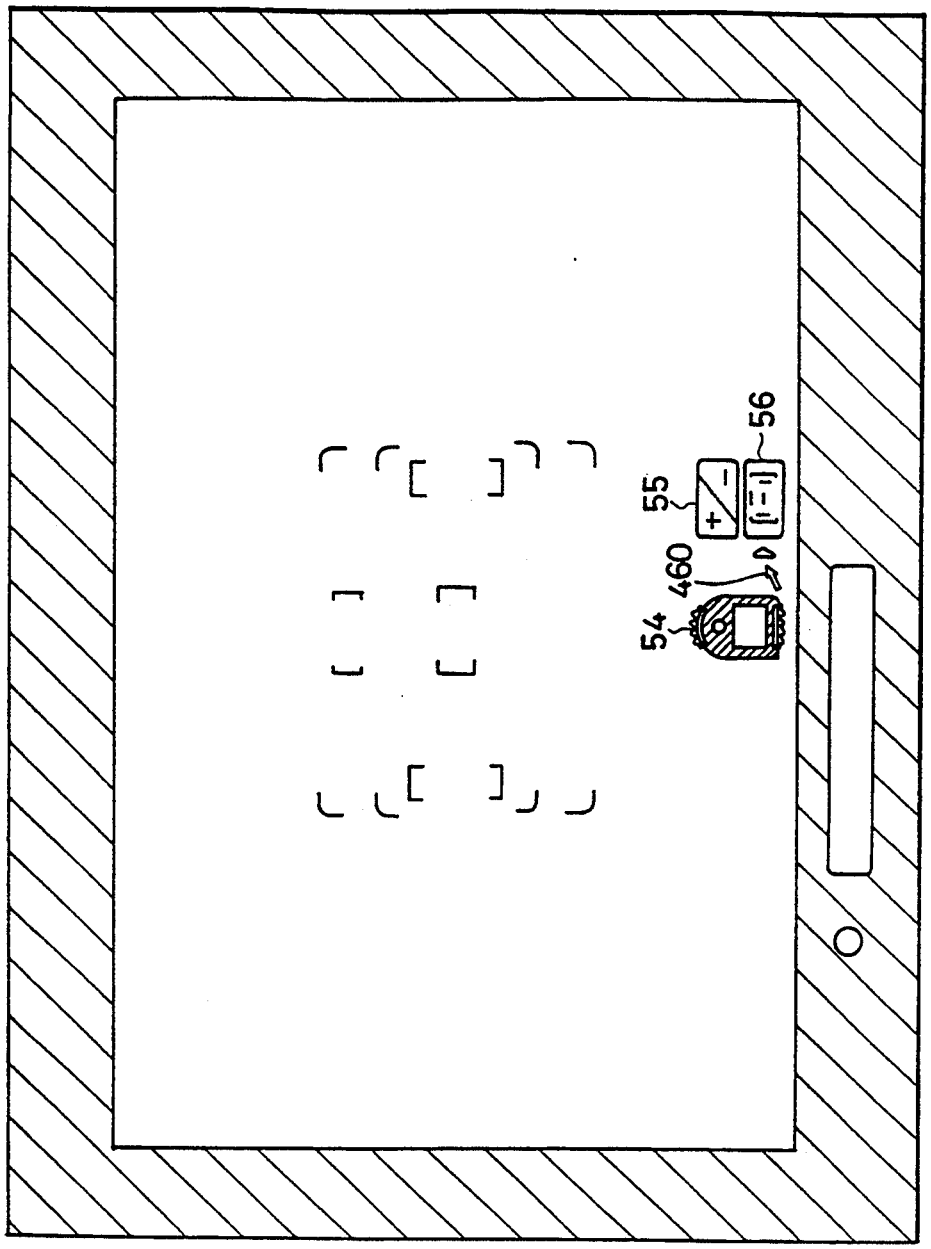

Although, for convenience sake, FIG. 33 shows all the area marks which can be selected, only one area among them is selected in practice and displayed, as will be described later.

At a first operation of the rear up-down dial 52, areas which can be selected are displayed with blinking as shown in steps S330 and S332. An area is selected among them. The rear up-down dial 52 rotates rightward or leftward to select an area which is to be set as a setting area AR. Subsequently, the situation of the camera 30 is sensed (step S376). When the camera 30 is held horizontally and the setting area AR is a wide area (YES in step S376 and YES in step S378) the wide area W2 is set as a setting area AR (step S380), If the other areas are selected (NO in step S378), the area selected in step S374 is set as a area AR.

When the camera 30 is held vertically and the setting area AR is a wide area (NO in step S376 and YES in step S382), the wide area W1 is set as a setting area AR (step S384). When the setting area AR is the area b (YES in step S386), a rightward rotation of the rear up-down dial 52 enables a setting of the area c in place of the area b as the setting area AR and a leftward rotation of the dial enables a setting of the area a in place of the area b as the setting area AR (NO in step S388, step S392) because the area b can not be selected when the camera is held vertically. When the area a, c or d is selected (NO in step S386), the selected set as the setting area AR. After setting the area, the set area indicative of the setting area AR is display with lighting which is followed by turning-off of the exposure compensation amount ΔEV and an turning-off of the selection mark 450 indicating that the function of exposure compensation "±" is not in setting at present (steps S394–S398). Subsequently, the program returns to step S320 through steps S348 and S306 (FIG. 27) and further proceeds to step S352.

In order to further change an exposure compensation amount ΔEV, the front up-down dial 51 is successively rotated rightward or leftward until a desired exposure compensation amount is obtained. In order to further change an area, the rear up-down dial 52 is successively rotated rightward or leftward until a desired area can be set in step S366 or step S370.

A lapse of five minutes wherein neither the front up-down dial 51 nor the rear up-down dial 52 is operated, is taken by the CPU 7 for a termination of a setting, thereby turning off all the displays (FIG. 21, step S308). Alternatively, an area which can be selected may be displayed with lighting and a selected area may be displayed with blinking.

Figure 34:
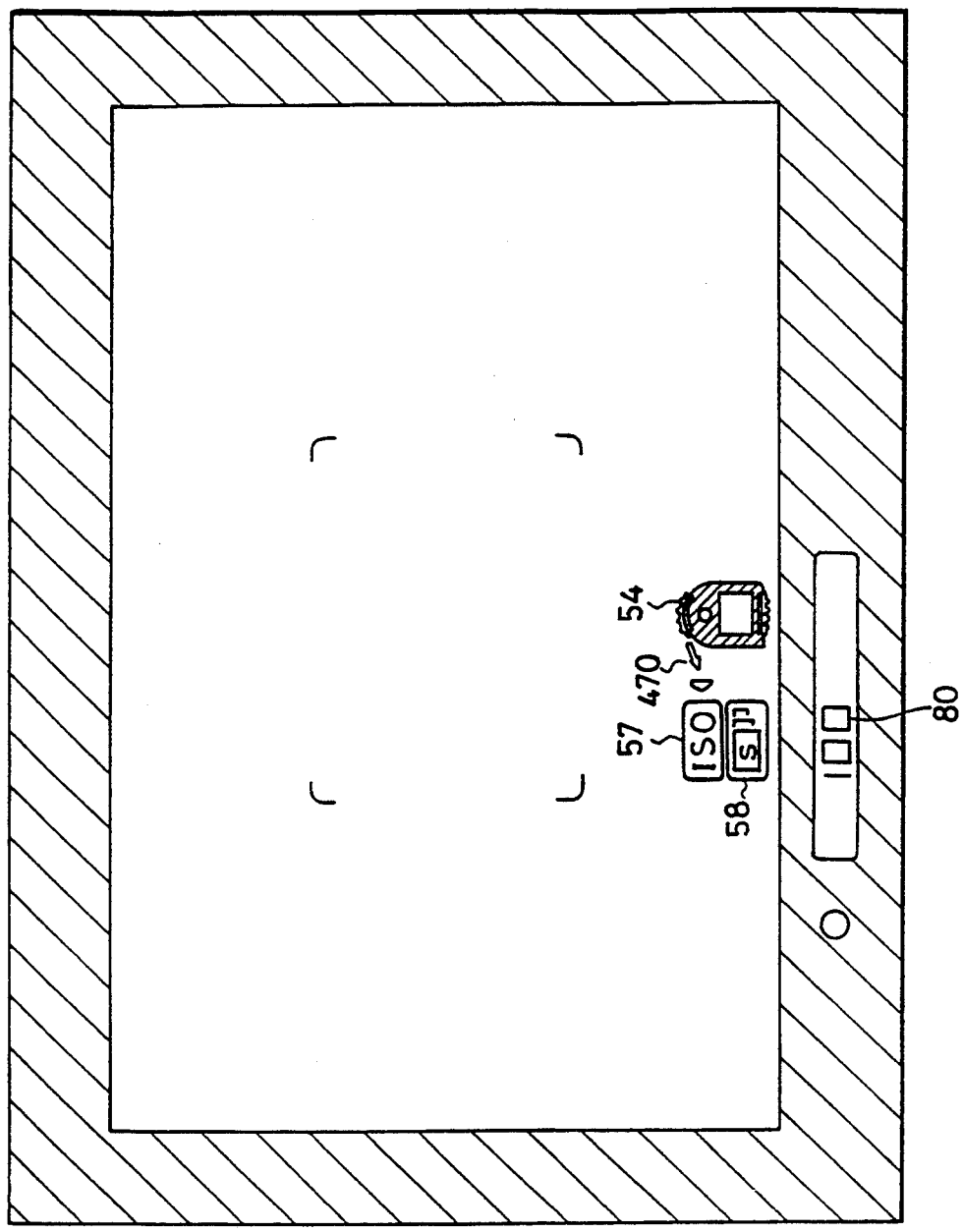

When the mode II is selected (NO in step S350), determination is made first of a rotation of the front up-down dial 11 (steps S400 and S404, see FIG. 34). More specifically, when the front up-down dial 51 is rotated rightward (YES in step S400), as an APEX value 0.5 is added to the film sensitivity compensation value ΔSV. Furthermore, the four-digit display portion 80 display the value SV obtained by adding, to the addition result (ΔSV), a sensitivity value $SV_{DX}$ (APEX value) read from a film cartridge as 100 (the APEX value 5) as shown in FIG. 34 (steps S402, S408 and S410). An APEX value is not adopted as a display value for a photographer's sake. Both can be used as display. Then, the display of the selection mark 480 is turned off in order to indicate that the function of single/continuous photographing drive is not in setting at preset and the selected area is displayed (steps S412 and S424). On the other hand, when the rear up-down dial 51 is rotated leftward (NO in step S400 and YES in step S404), the APEX value 0.5 is subtracted from the film sensitivity compensation value ΔSV. Furthermore, the two-digit display portion 81 displays the value SV obtained by adding the sensitivity value $SV_{DX}$ (APEX value) read from the film cartridge to the subtraction result as 100, for example, in the same manner as in the previous case (steps S406, S408 and S410). Subsequently, the display of the selection mark 480 is turned off in order to indicate that the function of single/continuous photographing drive is not in setting at preset and the selected area is displayed (steps S412 and S424).

Figure 35:
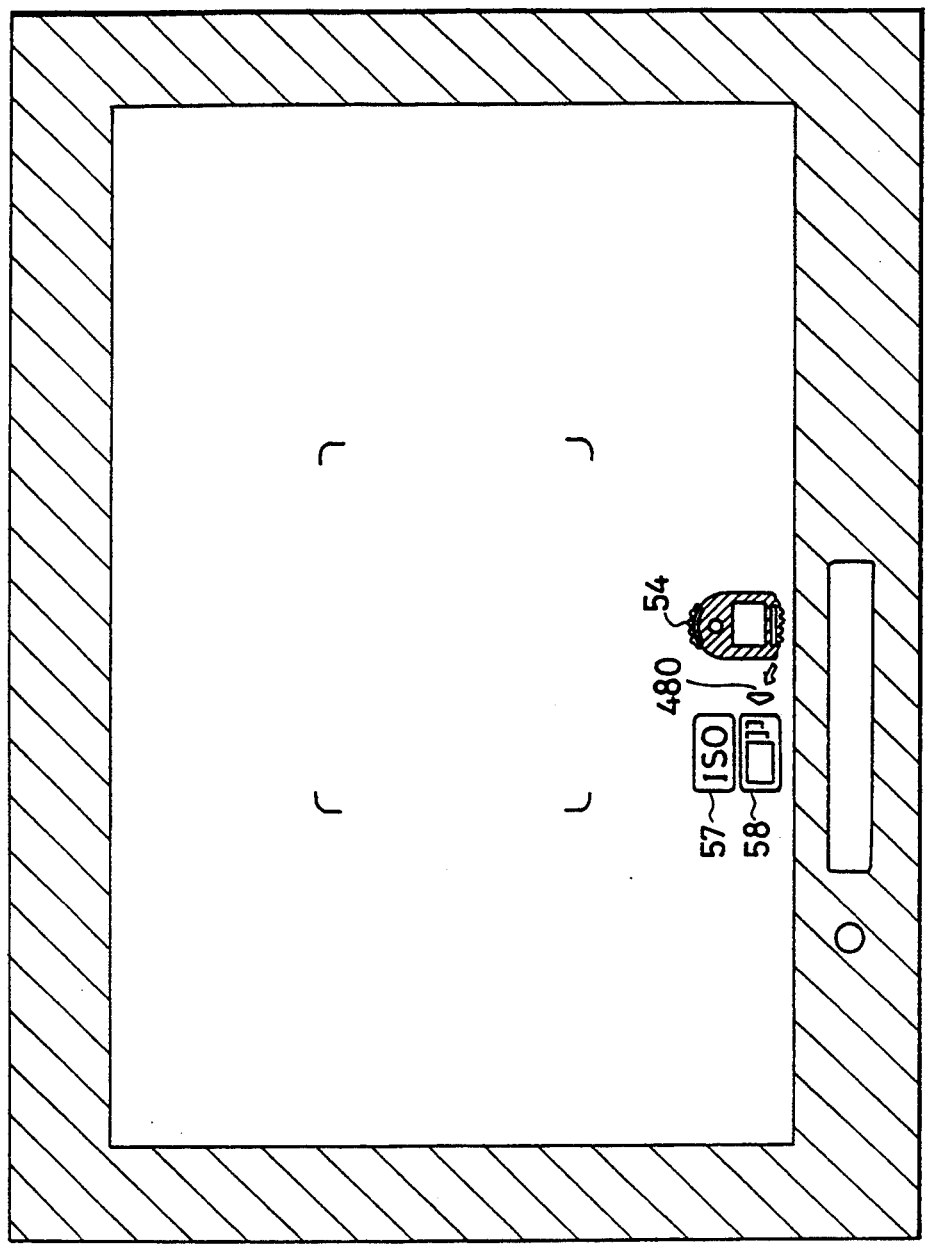

If the front up-down dial 51 is rotated neither rightward nor leftward, determination is made of a rotation of the rear up-down dial 52 (NO both in steps S400 and S404, step S414). Single photographing drive S and continuous photographing drive C are alternately set (step S416) every time the rear up-down dial 52 is rotated rightward or leftward (YES in step S414). With the single photographing drive being set, the character "S" is displayed in the S/C mark 58 as shown in FIG. 34, and with the continuous photographing drive being set, only the character "S" in the S/C mark 58 is erased as shown in FIG. 35 (step S418). Thereafter, the display of film sensitivity value and the selection mark 470 are turned off in order to indicate that the function of the film sensitivity compensation ISO is not in setting at present and the selected area is displayed (steps S420–S424).

Figure 36:
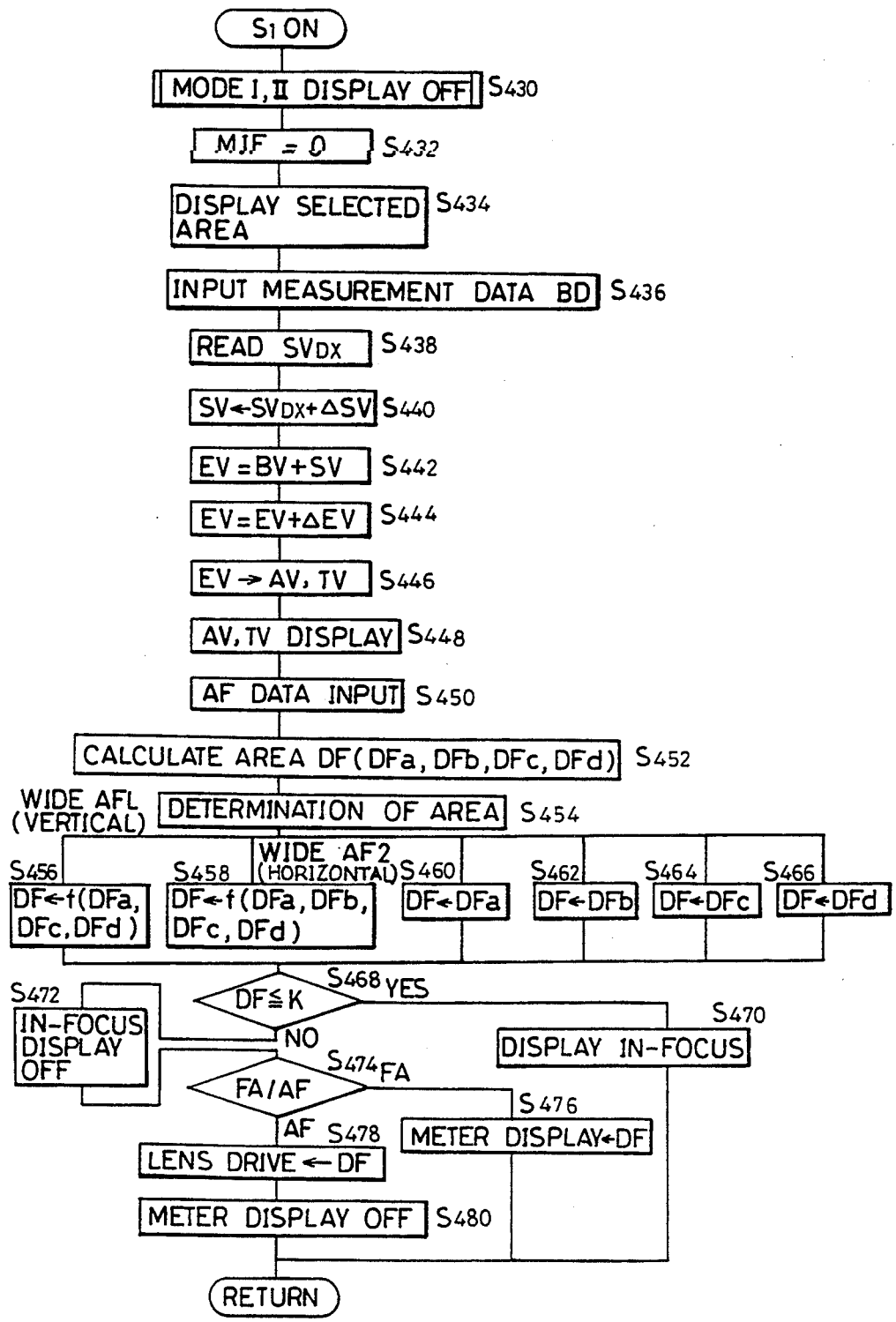
FIG. 36 is a flow chart explaining an operation when the photographing preparation switch is thrown.

FIG. 36 is a flow chart explaining an operation of the photographing preparation switch 49 at its stroke. The operation will be described in the following with reference to FIG. 37.

Upon a start of an interruption by throwing the photographing preparation switch 49, the display of the modes I and II, that is, the dial mark 54, the "±" mark 55, the AF mark 56, the ISO mark 57 and the S/C mark 58 and the other selection marks 450–480 are first turned off. The previously set area is displayed (steps S430 and S434).

At this time, the first mode flag MIF is reset to "0" (step S432). With the first mode flag MIF being reset, the processing of displaying the previous set contents is executed prior to the procedure of a setting operation at the interruption in response to the next turning-on of the function button 40 (NO in step S320 and steps S322–S346).

Figure 37:
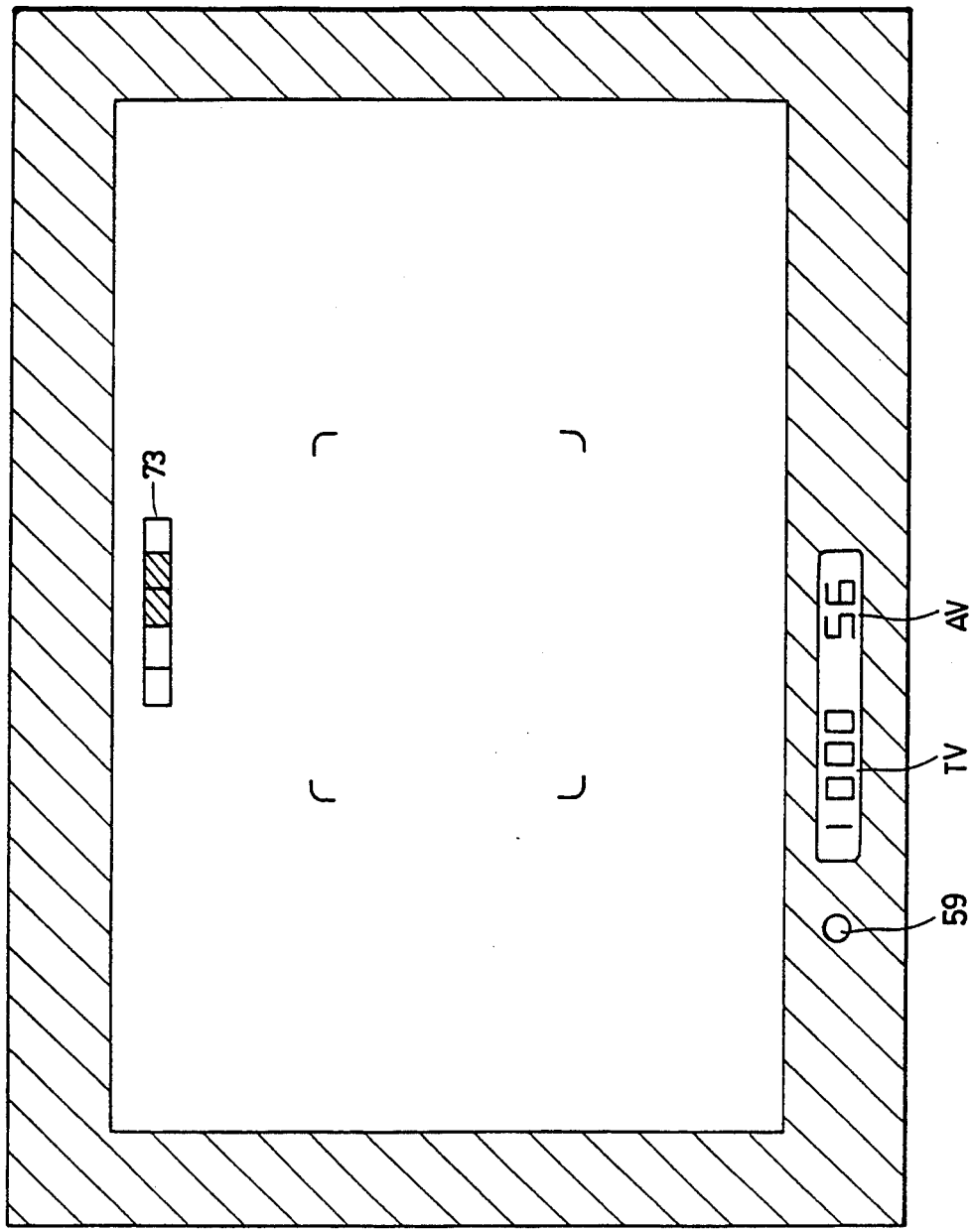
FIG. 37 is a diagram showing a display state of the finder image area at each step of FIG. 36.

Subsequently, the brightness BD of the object obtained in the light measuring circuit 26 is accepted and the film sensitivity value $SV_{DX}$ is read from a film cartridge (not shown), so that the film sensitivity compensation value ΔSV is added to the film sensitivity value $SV_{DX}$ (steps S436–S440). An exposure amount EV is obtained by adding the brightness BD of the object to the compensated film sensitivity value SV. Furthermore, an exposure compensation amount ΔEV is added to the obtained exposure amount EV. An aperture value Av and a shutter speed Tv are obtained based on the compensated exposure value EV in accordance with a relation between an aperture value Av and a shutter speed Tv with respect to a previously set exposure value (steps S442–S446). The aperture value Av and the shutter speed Tv are displayed in the out-of-frame display portion 62 as shown in FIG. 37 (step S448). The aperture value Av and the shutter speed Tv are also displayed in the on-body LCD 42.

Then, the AF data of the respective focus detecting area a–d obtained by the focus detection circuit 8 is accepted, based on which data defocus amounts DFa–DFd are calculated (steps S450 and S452). Then, determination is made of the area selected by the function of the AF area (steps S454). That is, when the wide area W1 is selected, a defocus amount is set as a defocus amount DF, by calculating an average value of the defocus amount DFa, DFc and DFd, or calculating an optimum defocus amount with the respective contrast states, or based on a defocus amount obtained by considering both the of the adore described values. When the wide area W2 is selected, a defocus amount obtained on the basis of DFa–DFd in a similar manner to the above-described case is set as a defocus amount DF (steps S456 and S458). When the area a, b, c and d are selected, respectively, the defocus amount DFa, the defocus amount DFb, the defocus amount DFc, and the defocus amount DFd are set as a defocus amount DF (steps S460, S462, S464 and S466).

When a defocus amount DF is set as described in the foregoing, the defocus amount DF and an allowable level value k are compared with each other (steps S468). More specifically, if the set defocus amount DF is equal to or less than the allowable value k, the determination is made that the camera is at an in-focus condition, which is displayed (step S470). This display of the in-focus is made by lighting of the in-focus display portion 59 as shown in FIG. 37, which can be easily acknowledged by a photographer. If the set defocus amount DF is more than the allowable value k, the determination is made that the camera is not at an in-focus condition, so that no display is made of in-focus condition, or the display is off when out of in-focus condition (step S472). Then, determination is made in this case whether the camera is in a FA mode or an AF mode (step S474). If in FA mode, the set defocus amount DF is displayed by using bars in the FA meter display portion 73 as shown in FIG. 37 (step S474). The photographer manually drives the lens while Looking at the bar display to set the camera in an in-focus condition. If the camera is set in the AF mode, the lens is automatically driven by the set defocus amount to set the camera in the in-focus condition. The FA meter display for use in the FA mode is not necessary and therefore is turned off (steps S478 and S480). Such Operation is repeated while the photographing preparation switch 49 is pressed (NO in step S312 in FIG. 27). Then, when the photographing preparation switch 49 is released (YES in step S312), the respective display contents is turned off (step S308).

FIGS. 38–42 show other examples of displays in the finder display area. As shown in the drawings, selection marks include indication marks 90 and 91 and selection marks 451–481 corresponding to the respective functions.

Figure 38:
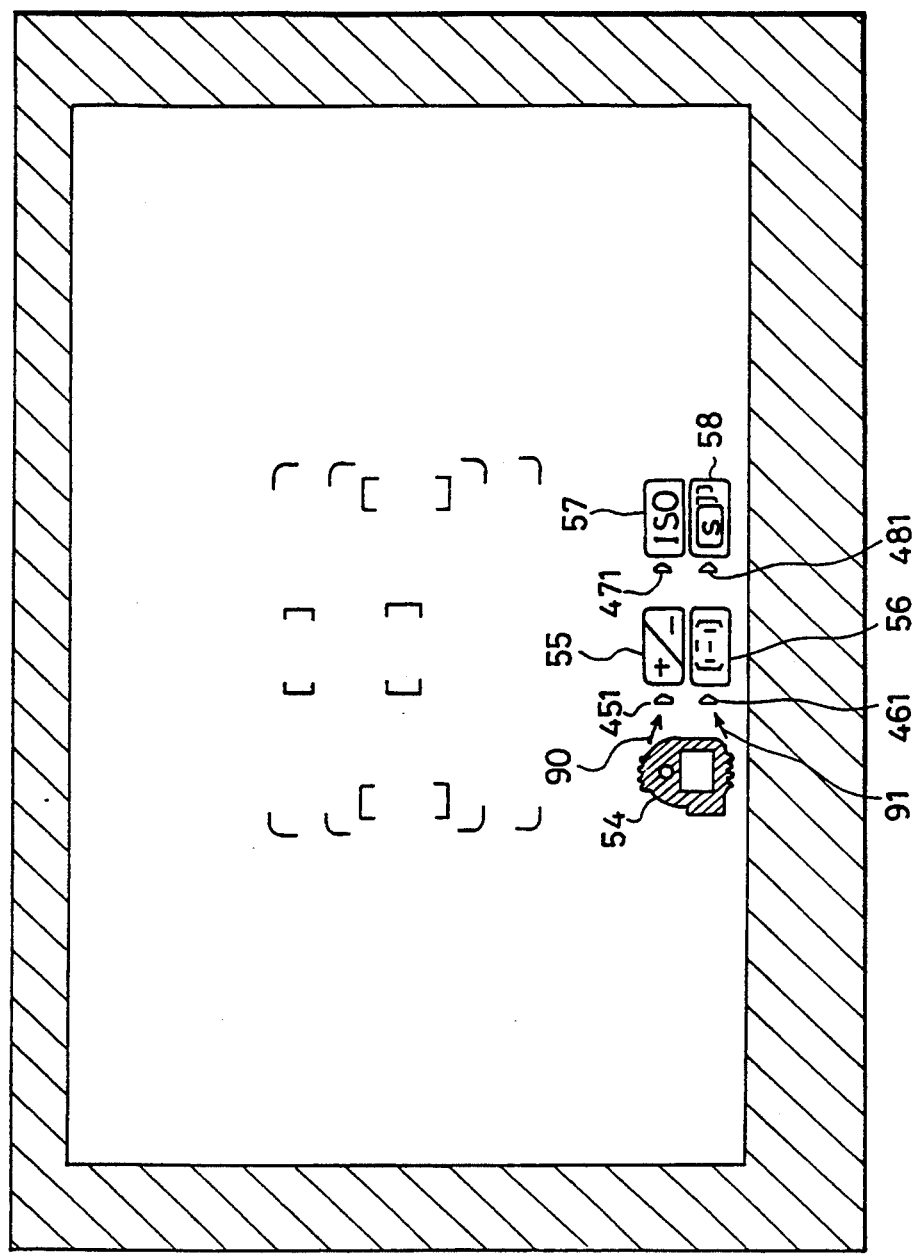
FIGS. 38-42 are diagrams showing the other examples of the displays in the finder image area.

FIG. 38 shows marks 57 and 58 indicative of the functions of the mode II at the same side of marks 55 and 56 indicative of the functions of the mode I.

Figure 39:
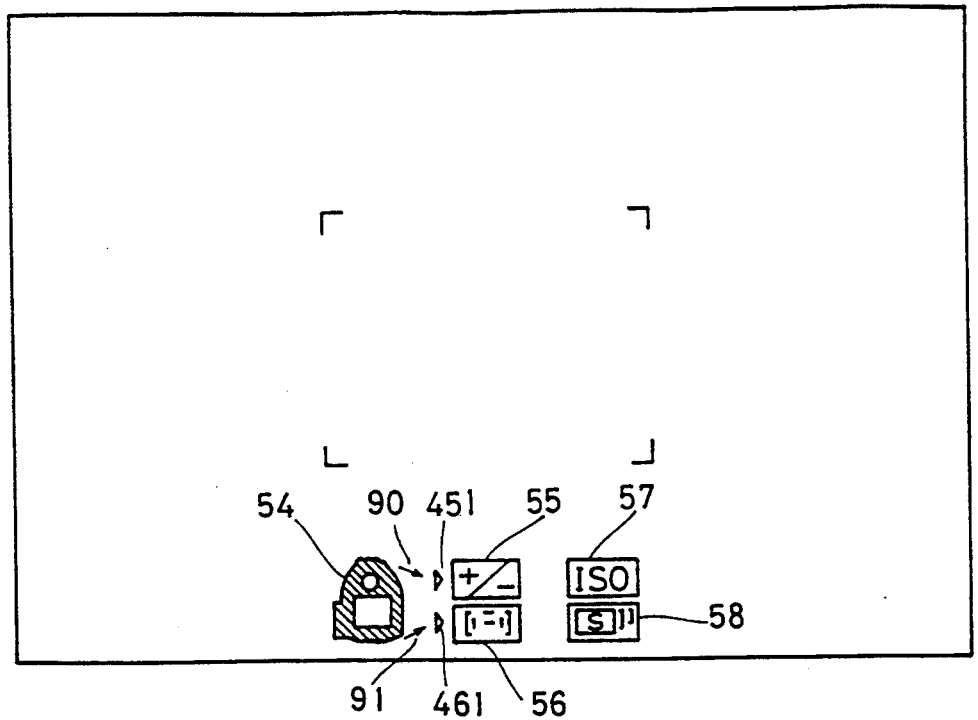
Figure 40:
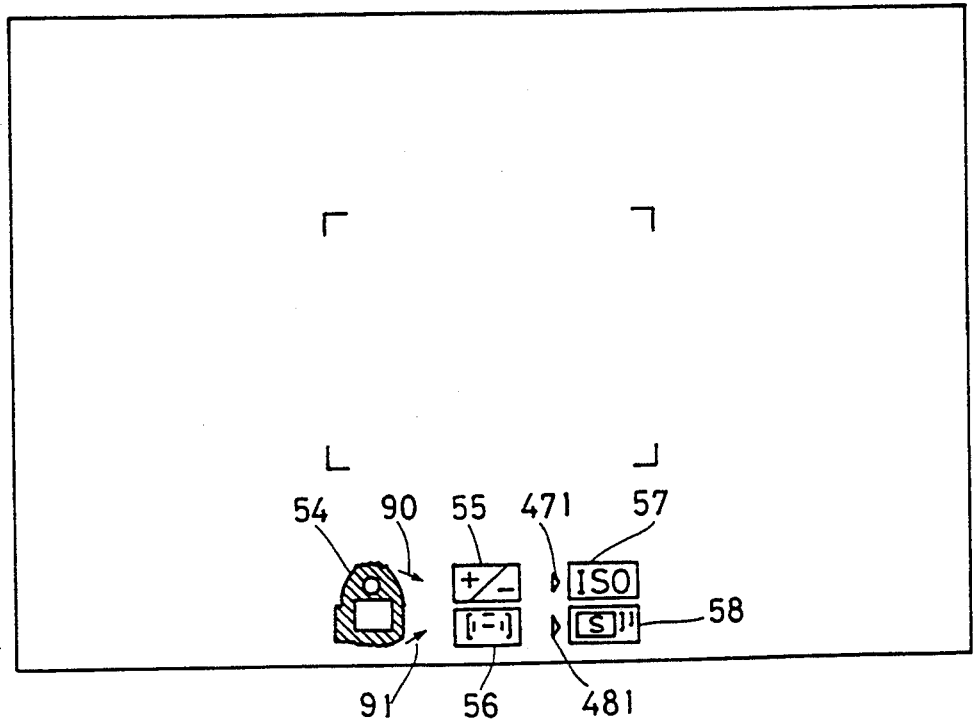
Figure 41:
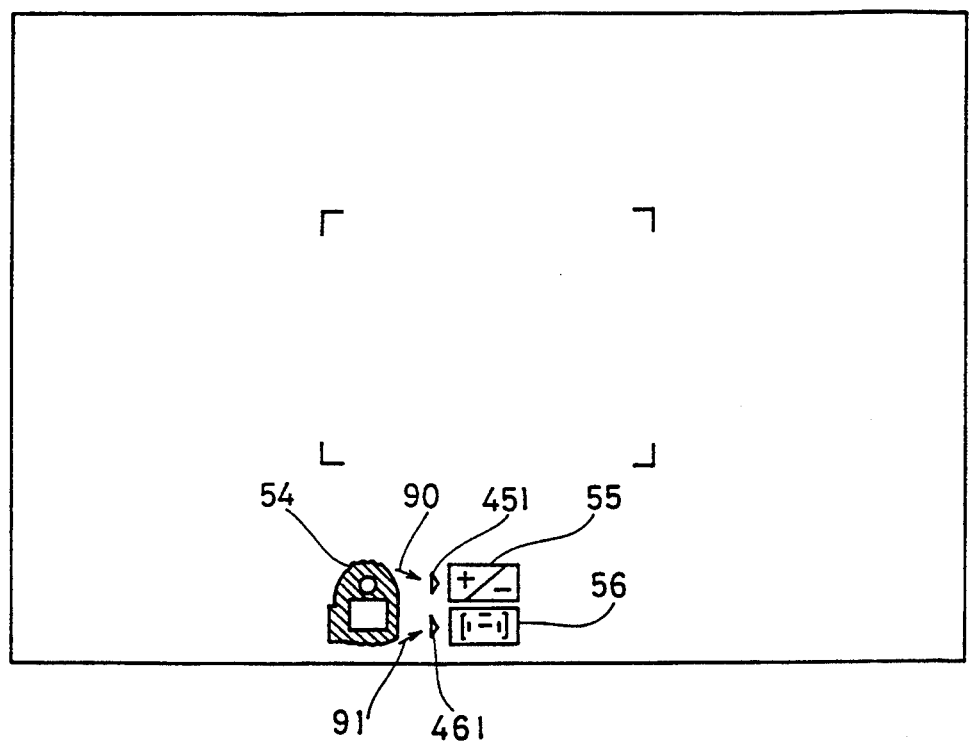
Figure 42:
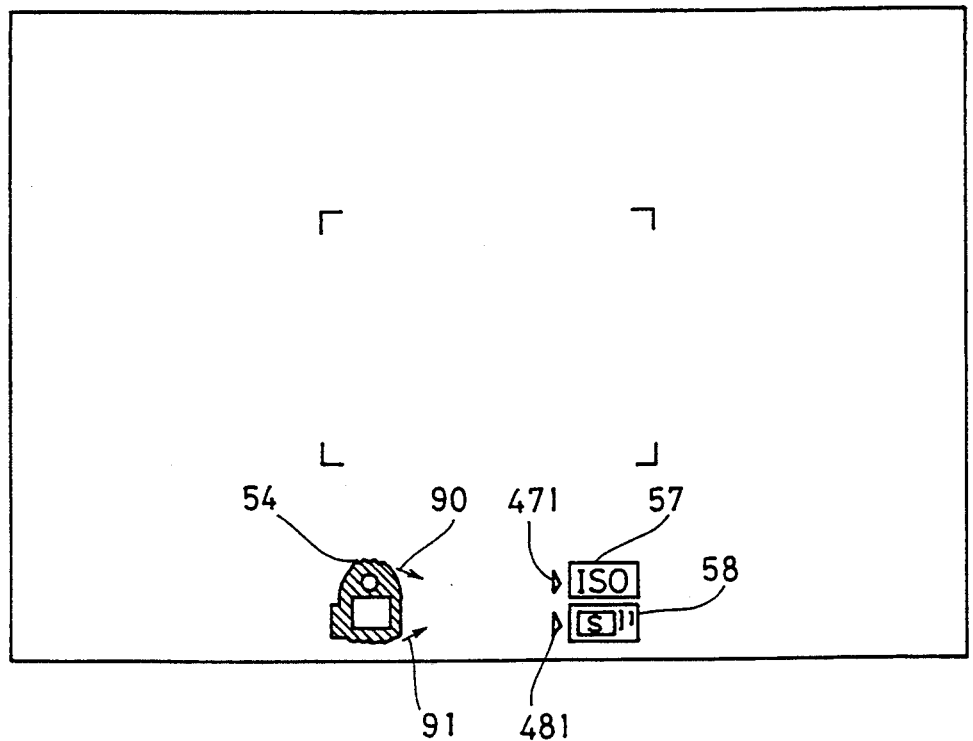

FIGS. 39 and 40 show a first method of indicating a mode selection in FIG. 38 and FIGS. 41 and 42 show a second method of indication.

The first indication method is performed by displaying the selection marks 451–481 or turning off the same. More specifically, when the mode I is selected, the displays of the selection marks 471 and 481 are turned off as shown in FIG. 39. When the mode II is selected, the displays of the selection marks 451 and 461 are turned off as shown in FIG. 40.

The second indication method is carried out by displaying or turning off the marks 55–58 of the respective functions and the selection marks 451–481 corresponding thereto in pair. More specifically, in the mode I, the displays of the ISO mark 57, the S/C mark 58 and the selection marks 471 and 481 corresponding thereto is turned off as shown in FIG. 41. In the mode II, the displays the "±" mark 55, the AF mark 56 and the corresponding selection marks 452 and 462 is turned off as shown in FIG. 42.

While display with lighting or display with blinking of the areas enables discrimination between the areas which can be selected and the selected area by using the function of the AF area in the present embodiment, the discrimination can be made by changing brightness of lighting or blinking period or the like. Color display can be also used for discrimination.

Four functions are provided which are divided into two groups in the present embodiment. The present embodiment is applicable to a camera having a lot of functions. For example, six functions are divided into three groups which can be cyclically changed. The functions can be divided into two groups, and an operation member for cyclic selection or selection on a group basis, and three setting operation members for setting the contents of the functions can be provided. A two-step selection operating member can be provided by roughly dividing the functions which are further divided into small groups. In this case, eight functions, for example, are divided into large groups each including four functions. Then, they are divided into small groups including two functions. Then, two selection operating member are enough by adopting a cyclic system. The number of operations is two at maximum, which is less than that in a case where two functions are simply selected cyclically (four times at maximum).

A more practical camera can be provided by grouping related functions. For example, in a continuous photographing drive mode wherein a moving object is often taken picture of, a wide area is appropriate as a focus detecting area which allows the object to be easily caught. In a single photographing drive mode, a focus detecting area is sometimes selected so as to focus on a desired part of a still object at a photographing thereof. Therefore, a change of a drive mode often requires a change of a focus detecting area-at the same time. Setting these functions in the same group reduces a time required for a setting operation.

An apparatus to which a selection operating member and a setting operation member are applied is not limited to a camera, but in general, any apparatus operable under setting of a plurality of functions.

As described above, the third embodiment has the following effects. The photographer changing a focus detecting area might be puzzled and make a mistake in selecting the focus detecting areas if only the area having been selected is displayed in the finder and not the areas which can be selected. The arrangement of the present embodiment wherein the focus detecting areas which can be selected and the selected focus detecting area are displayed in different modes, however, allows the photographer to smoothly and reliably perform the selecting operation of the areas. In addition, the focus detecting areas which can be selected and the selected focus detecting area, that is, the area made effective for focus detection in practice are displayed differently, so that the photographer is allowed to start photographing after acknowledging the displays indicating the effective area in the finder, resulting in prevention of malfunction of the camera. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera operable in one among a first photographing mode, a second photographing mode and a third photographing mode, said camera further being selectively operable in one of a plurality of photographing states when said camera operates in the first mode, said camera comprising:
 a first manual operation member,
 first means responsive to an operation of said first manual operation member for cyclically selecting one of the first, second and third photographing modes in this order,
 a second manual operation member,
 second means responsive to an operation of said second manual operation member for selecting one of the plurality of photographing states in the first photographing mode, and means responsive to the operation of said first manual operation member for changing a photographing mode of said camera from the first photographing mode to the third photographing mode without passing through the second photographing mode when said camera operates in the selected state in the first mode.

2. A camera operable in one of a first mode and a second mode for a predetermined function, said camera further being selectively operable in one of a plurality of states when said camera operates in the second mode, said camera comprising:

first means for selecting one of the two modes, second means for selecting one of the plurality of states in the second mode, means for storing the state selected in said second mode, means for controlling said second selecting means to first select the state stored by said storing means in response to said first selecting means selecting the second mode of said camera, first means for displaying first information at a first area, said first information indicating that said camera is operating in the first mode, and second means for displaying second information at a second area different from the first area, said second information indicating that said camera is operating in the second mode, wherein the state stored in said storing means has no influence on the function carried out in the first mode.

3. A camera comprising:

means for carrying out a measuring operation, said carrying means being operable in a first mode wherein the measuring operation is performed based on a predetermined measuring area and a second mode wherein the measuring operation is performed based on one of a plurality of measuring areas different from the predetermined measuring area, first means for selecting one of the two modes, second means for selecting one of the plurality of measuring areas in the second mode, means for storing the measuring area selected in said second mode, and means for controlling said second selecting means to first select the measuring area stored by said storing means in response to said first selecting means selecting the second mode.

4. The camera according to claim 3, wherein the camera further comprises:

first means for displaying the predetermined measuring area in the first mode, and second means for displaying the selected measuring area different from the predetermined measuring area in the second mode, wherein the selected measuring area has no influence on the measuring operation the first mode.

* * * * *